US 11,075,752 B2

(12) United States Patent
Wu et al.

(10) Patent No.: US 11,075,752 B2
(45) Date of Patent: Jul. 27, 2021

(54) NETWORK AUTHENTICATION METHOD, AND RELATED DEVICE AND SYSTEM

(71) Applicant: HUAWEI TECHNOLOGIES CO., LTD., Shenzhen (CN)

(72) Inventors: Rong Wu, Shenzhen (CN); Bo Zhang, Shenzhen (CN); Lu Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 381 days.

(21) Appl. No.: 16/248,778

(22) Filed: Jan. 16, 2019

(65) Prior Publication Data
US 2019/0149329 A1 May 16, 2019

Related U.S. Application Data

(63) Continuation of application No. PCT/CN2017/072253, filed on Jan. 23, 2017.

(30) Foreign Application Priority Data

| Jul. 16, 2016 | (CN) | 201610563016.2 |
| Aug. 4, 2016 | (CN) | 201610633776.6 |
| Sep. 9, 2016 | (CN) | 201610819335.5 |

(51) Int. Cl.
H04L 9/08 (2006.01)
H04L 9/32 (2006.01)
(Continued)

(52) U.S. Cl.
CPC .......... *H04L 9/0866* (2013.01); *H04L 9/0838* (2013.01); *H04L 9/14* (2013.01);
(Continued)

(58) Field of Classification Search
CPC ....... H04L 9/0866; H04L 9/0838; H04L 9/14; H04L 9/321; H04L 63/0428;
(Continued)

(56) References Cited

U.S. PATENT DOCUMENTS

| 6,640,304 B2 * | 10/2003 | Ginter | H04N 21/2543 |
| | | | 713/193 |
| 7,324,645 B1 * | 1/2008 | Juopperi | H04W 12/041 |
| | | | 380/247 |

(Continued)

FOREIGN PATENT DOCUMENTS

| CN | 1571409 A | 1/2005 |
| CN | 1694570 A | 11/2005 |

(Continued)

OTHER PUBLICATIONS

Chunyu Tang et al.: "Analysis of authentication and key establishment in inter-generational mobile telephony (with appendix Jul. 31, 2013)", Jul. 31, 2013, XP055579774, pp. 1-39.
(Continued)

*Primary Examiner* — Joseph P Hirl
*Assistant Examiner* — Thomas A Gyorfi
(74) *Attorney, Agent, or Firm* — Maier & Maier, PLLC

(57) ABSTRACT

Embodiments of the present invention disclose a network system. The system includes user equipment, a network authentication device, and a service authentication device. The service authentication device is configured to obtain reference information and generate a second shared key with reference to the reference information and a first shared key, where the first shared key is a shared key pre-configured between the user equipment and the service authentication device; the user equipment is configured to obtain the reference information and generate the second shared key with reference to the reference information and the first (Continued)

shared key; the service authentication device is configured to send the second shared key to the network authentication device; and the network authentication device is configured to receive the second shared key, where the second shared key is used by the user equipment and the network authentication device to generate a target shared key.

20 Claims, 33 Drawing Sheets

(51) Int. Cl.
  *H04L 9/14*  (2006.01)
  *H04L 29/06*  (2006.01)
  *H04W 4/70*  (2018.01)
  *H04W 12/041*  (2021.01)
  *H04W 12/069*  (2021.01)
  *H04W 12/69*  (2021.01)

(52) U.S. Cl.
  CPC .......... *H04L 9/321* (2013.01); *H04L 63/0428* (2013.01); *H04L 63/0892* (2013.01); *H04W 4/70* (2018.02); *H04W 12/041* (2021.01); *H04W 12/069* (2021.01); *H04W 12/69* (2021.01)

(58) Field of Classification Search
  CPC ............ H04L 63/0892; H04W 12/041; H04W 12/069; H04W 12/69; H04W 4/70
  See application file for complete search history.

(56) References Cited

U.S. PATENT DOCUMENTS

| | | | |
|---|---|---|---|
| 8,713,320 | B2 | 4/2014 | Xu et al. |
| 2008/0178004 | A1* | 7/2008 | Wei .................... H04W 12/0431 713/171 |
| 2008/0212783 | A1* | 9/2008 | Oba .................... H04L 63/0807 380/279 |
| 2009/0198999 | A1* | 8/2009 | Harkins ................ H04L 63/061 713/155 |
| 2011/0258477 | A1* | 10/2011 | Baker .................... G06F 1/324 713/600 |
| 2012/0331298 | A1 | 12/2012 | Xu et al. |
| 2014/0269520 | A1 | 9/2014 | Yi et al. |
| 2015/0271147 | A1* | 9/2015 | Tanizawa .............. H04L 9/0852 713/171 |
| 2015/0288483 | A1 | 10/2015 | Sun et al. |
| 2016/0183086 | A1 | 6/2016 | Sharaga et al. |
| 2019/0149329 | A1 | 5/2019 | Wu et al. |

FOREIGN PATENT DOCUMENTS

| | | |
|---|---|---|
| CN | 1859097 A | 11/2006 |
| CN | 101005326 A | 7/2007 |
| CN | 101030862 A | 9/2007 |
| CN | 101052033 A | 10/2007 |
| CN | 101141792 A | 3/2008 |
| CN | 100448196 C | 12/2008 |
| CN | 101156352 B | 11/2010 |
| CN | 102195906 A | 9/2011 |
| CN | 103023856 A | 4/2013 |
| CN | 103024735 A | 4/2013 |
| CN | 103051598 A | 4/2013 |
| CN | 104954125 A | 9/2015 |
| CN | 105191461 A | 12/2015 |
| CN | 107579948 A | 1/2018 |
| CN | 107623668 A | 1/2018 |
| CN | 107623670 A | 1/2018 |
| WO | 2013040957 A1 | 3/2013 |

OTHER PUBLICATIONS

Ericsson et al: "Update of Solution 12.1 for key issue 12 on Authentication and Security Architecture", 3GPP Draft; S2-164038, Jul. 14, 2016, XP051118563, 8 pages.
3GPP TR 45.820 V13.1.0 (Nov. 2015),3rd Generation Partnership Project;Technical Specification Group GSM/EDGE Radio Access Network;Cellular system support for ultra-low complexity and low throughput Internet of Things (CIoT) (Release 13),total 495 pages.
3GPP TR 45.820 V2.1.0 (Aug. 2015),3rd Generation Partnership Project; Technical Specification Group GSM/EDGE Radio Access Network,Cellular System Support for Ultra Low Complexity and Low Throughput Internet of Things; (Release 13),total 524 pages.
Dan Boneh et al., "Identity-Based Encryption from the Weil Paring ",Crypto 2001, vol. 2139 of Lecture Notes in Computer Science, pp. 213-229, Springer-Verlag, 2001.
3GPP TR 22.861 V14.0.0 (Jun. 2016),3rd Generation Partnership Project;Technical Specification Group Services and System Aspects;Feasibility Study on New Services and Markets Technology Enablers for Massive Internet of Things; Stage 1(Release 14),total 28 pages.
3GPP TR 23.799 V0.5.0 (May 2016),3rd Generation Partnership Project;Technical Specification Group Services and System Aspects;Study on Architecture for Next Generation Sysyem(Release 14),total 178 pages.
3GPP TR 33.899 V0.2.0 (May 2016),3rd Generation Partnership Project;Technical Specification Group Services and System Aspects;Study on the security aspects of the next generation system(Release 14),total 75 pages.
3GPP TR 22.864 V14.0.0 (Jun. 2016),3rd Generation Partnership Project;Technical Specification Group Services and System Aspects;Feasibiiity Study on New Services and Markets Technology Enablers—Network Operation;Stage 1 (Release 14),total 34 pages.
3GPP TR 33.899 V0.3.0 (Jul. 2016),3rd Generation Partnership Project;Technical Specification Group Services and System Aspects;Study on the security aspects of the next generation system(Release 14),dated Jul. 6, 2016, total 77 pages.

* cited by examiner

NETWORK AUTHENTICATION METHOD, AND RELATED DEVICE AND SYSTEM

CROSS-REFERENCE TO RELATED APPLICATIONS

This application is a continuation of International Application No. PCT/CN2017/072253, filed on Jan. 23, 2017, which claims priority to Chinese Patent Application No. 201610633776.6 and 201610819335.5, which are filed on Aug. 4, 2016 and Sep. 9, 2016, which claim priority to Chinese Patent Application No. 201610563016.2, filed on Jul. 16, 2016. The disclosures of the aforementioned applications are hereby incorporated by reference in their entireties.

TECHNICAL FIELD

Embodiments of the present invention relate to the field of computer technologies, and in particular, to a network authentication method, and a related device and system.

BACKGROUND

Internet of Things (IoT) is an important application scenario of 5th-Generation mobile communications technologies (5G). When user equipment in IoT accesses a 5G network, network authentication needs to be performed, thereby generating a shared key used to protect secure network data transmission. When the user equipment accesses a service by using a network, service authentication also needs to be performed, thereby generating a shared key used to protect secure service data transmission. A principle of ensuring secure data transmission based on a shared key is as follows:

A user 1 (User1) and a user 2 (User2) pre-share a symmetric key K that is also referred to as a shared key.

Manner 1: User1 encrypts a message m by using the shared key K, which may be, for example, expressed as ciphertext=En_K_(m); and then User1 sends the encrypted message to User2. User2 receives the message sent by User1 and restores the message m by using K and a ciphertext, which may be, for example, expressed as m=decrypt(K, ciphertext), and the process ensures transmission security of the message m. An encryption technology based on the shared key K may be an algorithm such as an advanced encryption standard (English: Advanced Encryption Standard, AES for short), a triple data encryption algorithm (English: Triple Data Encryption Algorithm, 3DES for short), Blowfish, Serpent, Snow 3G, ZUC, HC-256, or Grain.

Manner 2: User1 calculates a message authentication code (MAC) of a message m by using the shared key K, which may be, for example, expressed as MAC1=MAC_K_(m), that is, calculates a message authentication code MAC1 corresponding to the message m by using shared key K. Then, User1 sends the message m and the message authentication code MAC1 to User2. User2 receives the message m and the message authentication code MAC1, and verifies correctness of MAC1 by using K and m, and if MAC1 is verified to be correct, it indicates that the message m is not tampered, and the process ensures transmission security of the message m. A technology for generating a message authentication code based on the shared key K may be an algorithm such as a Hash-based message authentication code (HMAC), an OMAC, a CBC-MAC, a PMAC, a UMAC, or a VMAC.

How to improve network authentication efficiency and security in a massive IoT scenario is a problem that persons skilled in the art are exploring and discussing.

SUMMARY

Embodiments of the present invention provide a network authentication method, and a related device and system, to improve network authentication efficiency and security.

According to a first aspect, an embodiment of the present invention provides a network authentication system. The system includes user equipment, a network authentication device, and a service authentication device, where the service authentication device is configured to obtain reference information and generate a second shared key with reference to the reference information and a first shared key, where the first shared key is a shared key pre-configured between the user equipment and the service authentication device, and the reference information includes information pre-associated with at least one of the user equipment, the network authentication device, and the service authentication device;

the user equipment is configured to obtain the reference information and generate the second shared key with reference to the reference information and the first shared key;

the service authentication device is configured to send the second shared key to the network authentication device; and the network authentication device is configured to receive the second shared key, where the second shared key is used by the user equipment and the network authentication device to generate a target shared key, and the target shared key or a shared key derived from the target shared key is a shared key that protects secure data transmission and that is negotiated and agreed on by the network authentication device and the user equipment.

In the foregoing system, the user equipment and the service authentication device generate the second shared key based on the obtained information and the first shared key that is pre-shared, and then the service authentication device sends the second shared key to the network authentication device, so that the network authentication device obtains the target shared key based on the second shared key. That is, service related information and network related information are considered when the target shared key is generated, and this improves a security level of the target shared key.

With reference to the first aspect, in a first possible implementation of the first aspect, the network authentication device and the user equipment are configured to perform network authentication based on the second shared key or based on a shared key derived from the second shared key to generate the target shared key.

With reference to the first possible implementation of the first aspect, in a second possible implementation of the first aspect, the network authentication device and the user equipment are configured to perform network authentication to generate a third shared key; and that the network authentication device and the user equipment are configured to perform network authentication based on the second shared key or based on the shared key derived from the second shared key to generate the target shared key is specifically:

the network authentication device and the user equipment are configured to perform network authentication based on the second shared key to generate a fourth shared key; and both the network authentication device and the user equipment are configured to generate the target shared key based on the third shared key and the fourth shared key.

With reference to the first aspect, in a third possible implementation of the first aspect, the generating a second shared key with reference to the reference information and a first shared key is specifically:

performing, by the service authentication device and the user equipment, service authentication with reference to the reference information and the first shared key to generate the second shared key; and the network authentication device and the user equipment are configured to use the second shared key or a shared key derived from the second shared key as the target shared key.

With reference to the first possible implementation of the first aspect, the second possible implementation of the first aspect, or the third possible implementation of the first aspect, in a fourth possible implementation of the first aspect, the network authentication device is further configured to send the target shared key to the service authentication device;

the service authentication device is configured to receive the target shared key; and the service authentication device and the user equipment are configured to use the target shared key or the shared key derived from the target shared key as a shared key that protects secure data transmission and that is negotiated and agreed on by the service authentication device and the user equipment.

With reference to the first aspect, in a fifth possible implementation of the first aspect, the network authentication device and the user equipment are configured to perform network authentication to generate a third shared key; and the generating a second shared key with reference to the reference information and a first shared key is specifically:

performing, by the service authentication device and the user equipment, service authentication with reference to the reference information and the first shared key to generate the second shared key; and both the network authentication device and the user equipment are configured to generate the target shared key based on the second shared key and the third shared key; or respectively use the second shared key and the third shared key as target shared keys to protect different types of data.

With reference to the first aspect, in a sixth possible implementation of the first aspect, both the network authentication device and the user equipment are configured to generate the target shared key based on the second shared key and a fifth shared key; or respectively use the second shared key and a key derived from the fifth shared key as target shared keys for protecting different types of data, where the fifth shared key is a shared key pre-configured between the user equipment and the network authentication device.

With reference to the first aspect, in a seventh possible implementation of the first aspect, the reference information includes a network parameter of a cellular network in which the network authentication device is located; and the generating a second shared key with reference to the reference information and a first shared key is specifically:

performing service authentication based on the reference information and the first shared key to generate the second shared key; and the service authentication device is further configured to use the second shared key as the target shared key.

With reference to the first aspect, in an eighth possible implementation of the first aspect, the service authentication device is configured to obtain a fifth shared key pre-configured between the user equipment and the network authentication device;

the generating a second shared key with reference to the reference information and a first shared key is specifically:

performing service authentication with reference to the reference information, the first shared key, and the fifth shared key to generate the second shared key; and the network authentication device is configured to use the second shared key as the target shared key.

With reference to the first aspect, in a ninth possible implementation of the first aspect, the network authentication device is configured to obtain the first shared key from the service authentication device;

the network authentication device is configured to generate network-side information based on the first shared key and a fifth shared key, where the fifth shared key is a shared key pre-configured between the user equipment and the network authentication device;

the network authentication device is configured to send the network-side information to the service authentication device;

the service authentication device is configured to receive the network-side information and forward the network-side information to the user equipment;

the generating a second shared key with reference to the reference information and a first shared key is specifically:

performing service authentication with reference to a network parameter and the first shared key to generate the second shared key, where the network parameter includes the network-side information; and the network authentication device is configured to use the second shared key as the target shared key.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, or the ninth possible implementation of the first aspect, in a tenth possible implementation of the first aspect, the reference information includes at least one of the network parameter of the cellular network in which the network authentication device is located and a service parameter of a target service.

With reference to the tenth possible implementation of the first aspect, in an eleventh possible implementation of the first aspect, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

By implementing the embodiments of the present invention, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

DESCRIPTION OF EMBODIMENTS

The following describes the technical solutions in the embodiments of the present invention with reference to the accompanying drawings in the embodiments of the present invention.

Figure 1:
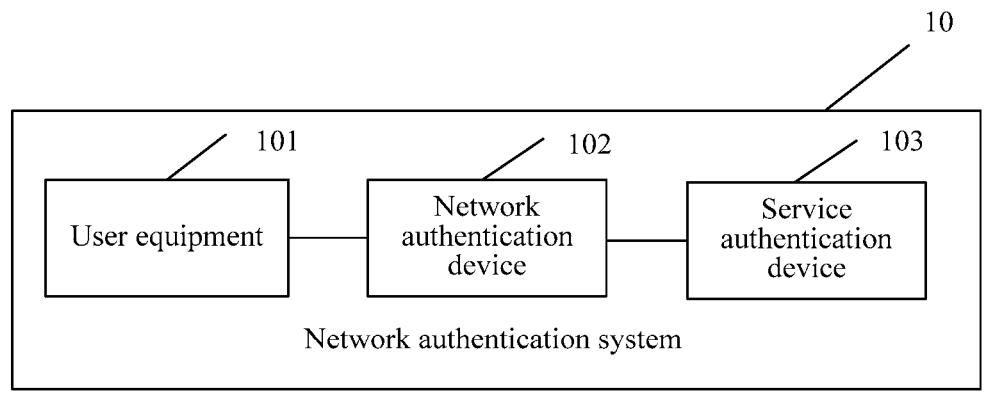
FIG. 1 is a schematic structural diagram of a network authentication system according to an embodiment of the present invention.

Referring to FIG. 1, FIG. 1 is a schematic architectural diagram of a network authentication system 10 according to an embodiment of the present invention. The network authentication system 10 includes user equipment 101, a service authentication device 103, and a network authentication device 102 through which an operator provides network access. In some embodiments, the service authentication device 103 is a device that the operator can control, that is, the network authentication device 102 of the operator can directly invoke data in the service authentication device 103. In some embodiments, the service authentication device 103 is a device that the operator cannot control, that is, the network authentication device 102 of the operator cannot directly invoke data in the service authentication device 103.

The network authentication device 102 may be at least one network-side device related when the user equipment 101 needs to access a cellular network, and when accessing the cellular network, the user equipment 101 needs to first perform network authentication with the network authentication device 102 to generate a target shared key, where the target shared key or a shared key derived from the target shared key is a shared key that protects secure data transmission and that is negotiated and agreed on by the network authentication device and the user equipment.

In some embodiments, the user equipment 101 may be a mobile phone, a tablet computer, a notebook computer, a palmtop computer, a mobile Internet device (English: mobile internet device, MID for short), a wearable device (for example, a smartwatch (for example, iWatch), a smart band, or a pedometer), or another terminal device that may access an operator network.

Figure 2:
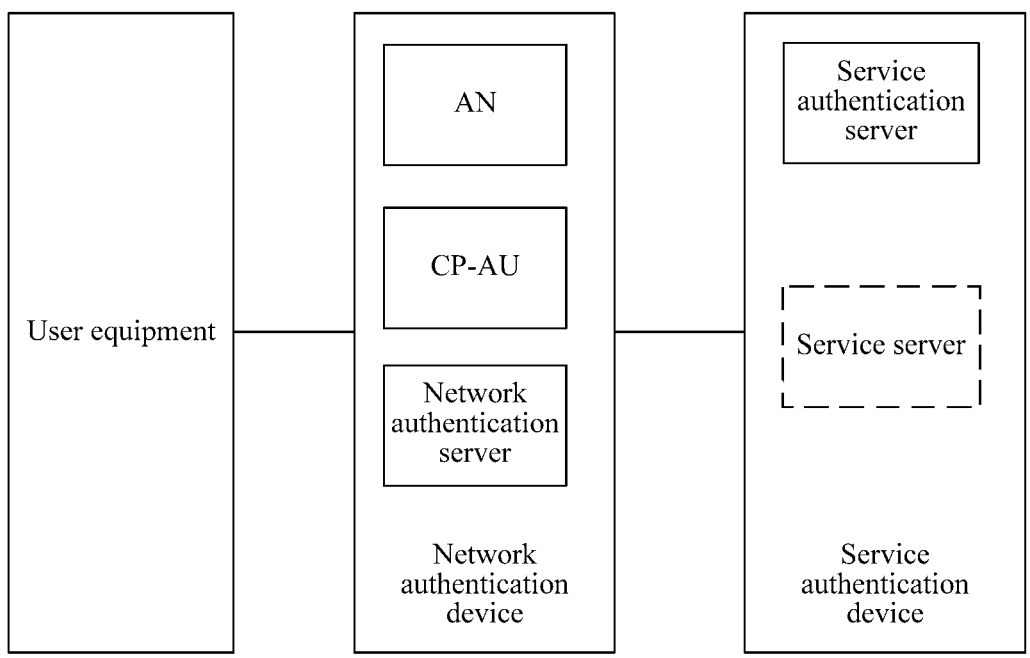
FIG. 2 is a schematic structural diagram of another network authentication system according to an embodiment of the present invention.

In some embodiments, the network authentication device 102 includes at least one of an access network (English: Access Network, AN for short), a mobility management (English: Mobility Management, MM for short) device, a session management (English: Session Management, SM for short) device, a slice selection function SSF (English: Slice Selection Function), an authentication function unit (English: Control Plane-Authentication Unit, CP-AU for short), a newly configured network-authentication related function device (which may be referred to as a network authentication server subsequently for convenience of description), and the like. An example in which the network authentication device includes a network authentication server, a CP-AU, and an AN is described below to facilitate understanding. When the network authentication device 102 includes only one device, all operations that are performed by the network authentication device 102 and that are subsequently described are completed by the one device. When the network authentication device 102 includes a plurality of devices, operations that are performed by the network authentication device 102 and that are subsequently described are collaboratively completed by the plurality of devices, that is, different devices of the plurality of devices respectively perform some operations, and both data and a parameter generated when the operations are performed may be transmitted among the plurality of devices based on a need. FIG. 2 is a schematic diagram of an optional detailed structure of the network authentication system.

The service authentication device 103 has at least the following two situations:

1. The service authentication device 103 is a device configured to manage service authentication. The service authentication device 103 includes at least one service related device. When using a service, the user equipment 101 needs to perform service authentication with the service authentication device 103 managing the service to generate a target shared key, where the target shared key or a shared key derived from the target shared key is a shared key that protects secure data transmission and that is negotiated and agreed on by the service authentication device and the user equipment.

In some embodiments, the service authentication device 103 may generate a certificate or an identity based secret key for a user, and finally send the certificate or the identity based secret key to the user equipment 101. When the certificate is generated, a certificate based method may be used when the user equipment 101 and the network authentication device 102 perform mutual authentication. When the identity-based secret key is generated, an identity based password mechanism method may be used when the user equipment 101 and the network authentication device 102 perform mutual authentication or when the user equipment 101 and the service authentication device 103 perform mutual authentication.

In an optional solution, a device configured to provide specific data of a service (which may be referred to as a service server subsequently for convenience of description) and a device configured to manage service authentication of the service (which may be referred to as a service authentication server subsequently for convenience of description) are a same device, that is, the service authentication device 103. In another embodiment, the service authentication device 103 includes a service authentication server, but includes no service management server. In another optional solution, the service authentication device 103 includes a service authentication server and a service server. When the service authentication device 103 includes a service server and a service authentication server, an operation that is performed by the service authentication device 103 and that is subsequently described may be collaboratively completed by the service authentication server and the service server, and both data and a parameter generated during an operation performed by the service authentication server and the service server may be mutually transmitted as required. In some embodiments, the foregoing service may include a service such as an instant messaging service, a news information service, a water meter service, a power meter service, a logistics service, or factory automation.

2. The service authentication device 103 is neither a device configured to provide specific data of a service nor a device configured to manage service authentication of the service, but a device only providing authentication, and may be a device sharing an authentication procedure for the network authentication device 102 and the service authentication device 103. In an IoT scenario, multiple numbers of user equipment 101 need to perform network authentication with the network authentication device 102, causing relatively high load of the network authentication device 102. Therefore, this embodiment of the present invention provides the service authentication device 103 to share some or all procedures of the network authentication device 102.

Figure 3A:
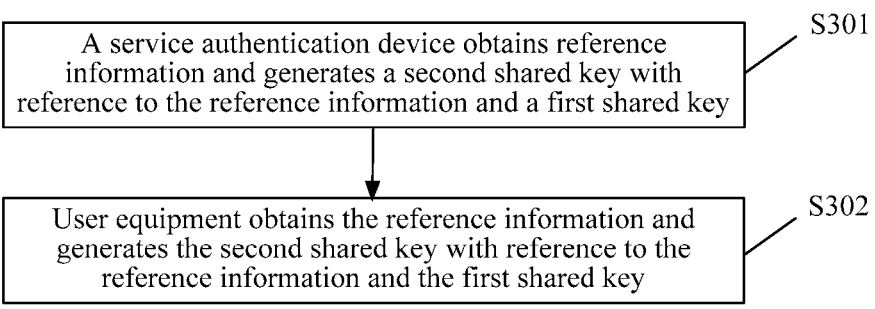
FIG. 3A is a schematic flowchart of a network authentication method according to an embodiment of the present invention.

Referring to FIG. 3A, FIG. 3A is a schematic flowchart of a network authentication method according to an embodiment of the present invention. The method may be implemented based on the network authentication system shown in FIG. 1, and the method includes but is not limited to the following steps.

Step S301: The service authentication device obtains reference information and generates a second shared key based on the reference information and a first shared key.

Specifically, the reference information includes information pre-associated with at least one of the user equipment, the network authentication device, and the service authentication device.

Information pre-associated with the user equipment may be an identity (UEID) of the user equipment, for example, information that can be used to distinguish between the user equipment and another terminal device within a range, such as an international mobile equipment identity (English: International Mobile Equipment Identity, IMEI for short), an international mobile subscriber identity (English: International Mobile Subscriber Identity, IMSI for short) Media Access Control (English: Media Access Control, MAC for short) address, or an Internet Protocol (English: Internet Protocol, IP for short) address.

Information pre-associated with the network authentication device may be a network parameter of a cellular network in which the network authentication device is located, for example, a public land mobile network identifier (PLMN ID), an operator identifier (Operator ID), an access network identifier (Access Network ID), a service network identifier (Serving Network ID), a network type identifier (Network Type ID), a network identifier of a local area network, a slice identifier, a bearer (bearer) ID, quality of service (English: Quality of Service, QoS for short), and a flow (flow) ID. The service parameter includes at least one of a service sequence number of the target service, an identifier of a key management center, a session identifier, a link identifier, an application identifier, a service identifier, a service level, a service data rate, a time delay, and a service server identifier.

Information pre-associated with the service authentication device may be information such as an identity of the service authentication device, or a parameter related to a feature of the service. When the service authentication device is a device managing a target service, the information pre-associated with the service authentication device may further include a service parameter of the target service, for example, a service sequence number SN, an identifier of a key management center, a session identifier (session ID), a link identifier, an application identifier (app ID), a slice identifier, a service identifier (service ID), a service level, a service data rate, a time delay, and a server identifier of a server in which the target service is located. What service the target service is specifically is temporarily not limited herein. In some embodiments, the target service is a service that the user equipment currently needs to access. The service parameter of the target service may be pre-stored in the service authentication device. For example, if the service authentication device is a device configured to manage a service authentication procedure of the target service, the service parameter of the target service may be pre-stored in the service authentication device. Alternatively, the service parameter of the target service may be sent by another device to the service authentication device immediately after a corresponding trigger operation is performed on the another device. For example, if the service authentication device is configured to perform service authentication on the user equipment, the network authentication device triggers a service server to send the service parameter of the target service to the service authentication device.

It may be understood that, a direct or an indirect connection relationship may be pre-established between the user equipment, the network authentication device, and the service authentication device, and therefore needed reference information may be obtained between each other. Alternatively, the reference information may be pre-configured in the user equipment, the network authentication device, and the service authentication device.

The first shared key is a shared key pre-configured between the user equipment and the service authentication device, and includes a shared key obtained by the user equipment and the service authentication device based on a manner such as a certificate (certificate), a user name and password, or an identity password mechanism. The service authentication device generates the second shared key with reference to the reference information and the first shared key, aiming to indicate that parameters used to calculate the second shared key include the reference information and the first shared key, but does not exclude other information.

Step S302: The user equipment obtains the reference information and generates the second shared key with reference to the reference information and the first shared key.

Specifically, the second shared key is used by the user equipment and the network authentication device to generate a target shared key, where the target shared key or a shared key derived from the target shared key is a shared key that protects secure data transmission and that is negotiated and agreed on by the network authentication device and the user equipment.

In an optional solution, the method may further include: sending, by the service authentication device, the second shared key to the network authentication device; receiving, by the network authentication device, the second shared key; and performing, by the network authentication device and the user equipment, network authentication based on the second shared key or based on a shared key derived from the second shared key to generate the target shared key. For convenience of understanding, specific description is given below with reference to FIG. 3B, FIG. 3C, and several different scenarios.

Figure 3B:
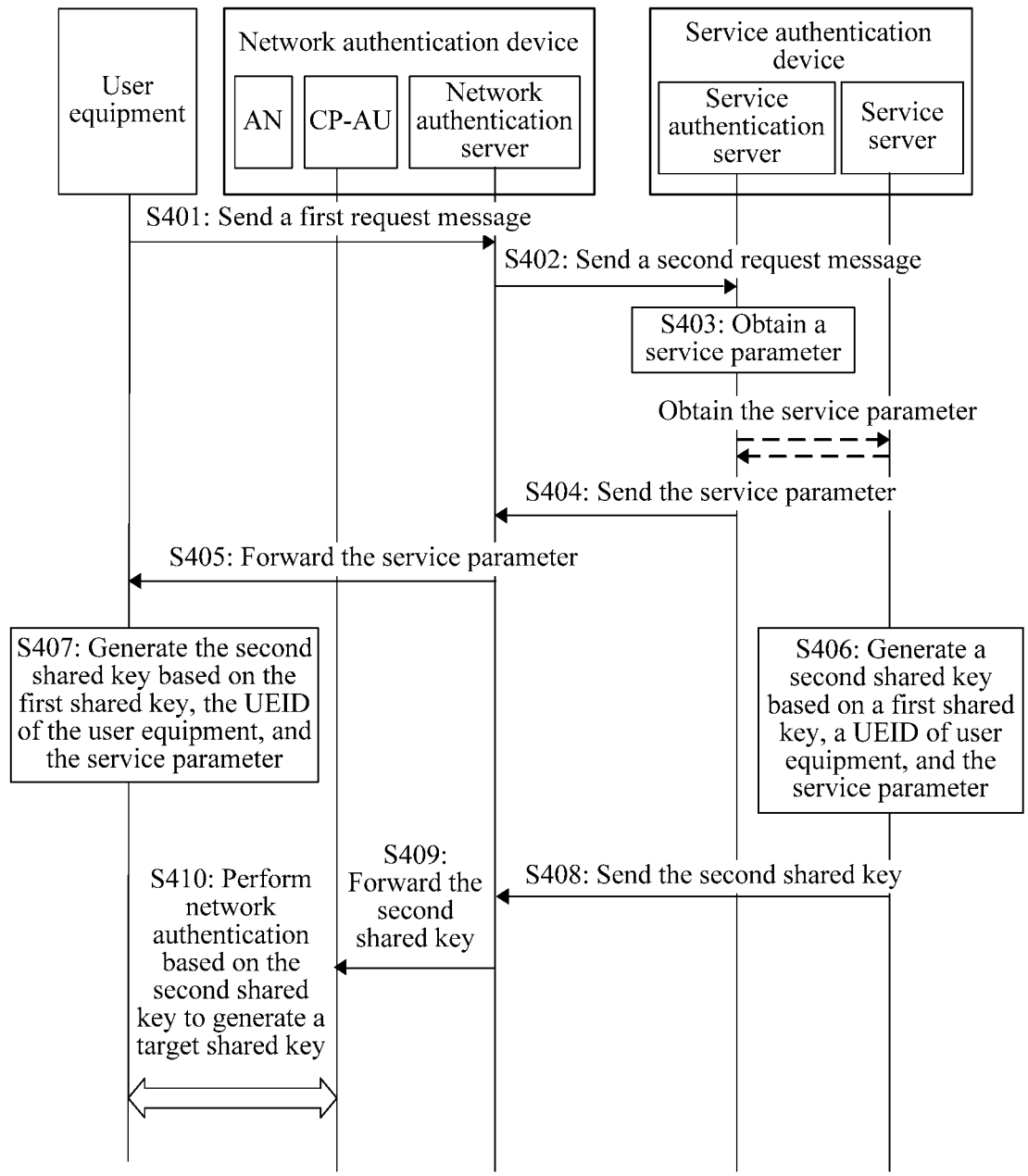
FIG. 3B is a schematic flowchart of another network authentication method according to an embodiment of the present invention.

Referring to FIG. 3B, FIG. 3B is a schematic flowchart of a network authentication method according to an embodiment of the present invention. The service authentication device may include a service authentication server and a service server. The user equipment and the service authentication device pre-share a first shared key, the method includes steps S401 to S410, and the steps are described in detail as follows:

Step S401: The user equipment sends a first request message to a network authentication server.

Step S402: The network authentication server receives the first request message, searches for a corresponding service authentication server based on the first request message, and then sends a second request message to the service authentication server.

Specifically, the first request message may include some identifier information to indicate a service that the user equipment intends to request; and after learning, based on the first request message, the service that the user equipment intends to request, the network authentication server sends a second request message to the service authentication server, and the second request message may include an identity (UEID) of the user equipment.

Step S403: The service authentication server receives the second request message, and obtains a service parameter based on the second request message, where the service parameter belongs to the foregoing reference information. In some embodiments, the service parameter is stored in storage space of the service authentication server, and the service authentication server obtains the service parameter by reading the storage space. In some embodiments, the service parameter is stored in the service server, and the service authentication server may request the service parameter from the service server.

Step S404: The service authentication server sends the service parameter to the network authentication server.

Step S405: The network authentication server is configured to receive the service parameter and forward the service parameter to the user equipment.

Step S406: The service authentication server generates a second shared key based on information such as the first shared key, the UEID of the user equipment, a network parameter, and the service parameter.

Step S407: The user equipment generates the second shared key based on the first shared key, the UEID of the user equipment, and the service parameter.

Step S408: The service authentication server sends the second shared key to the network authentication server.

Step S409: The network authentication server receives the second shared key and forwards the second shared key to the CP-AU. In some embodiments, the service authentication server may further directly send the second shared key to the CP-AU, and correspondingly, the CP-AU receives the second shared key sent by the service authentication server.

Step S410: The CP-AU receives the second shared key and performs network authentication with the user equipment based on the second shared key to generate a target shared key, where the network authentication may be implemented by using an authentication technology such as an Authentication and Key Agreement (AKA for short) protocol.

In some embodiments, when the network authentication device includes a plurality of devices, actions of receiving the first request message, authenticating the user equipment, searching for the service authentication server, sending the second request message to the service authentication server, and receiving the second shared key may be completed by any one of the plurality of devices or collaboratively completed by devices with a related function, for example, may be independently completed by one of a plurality of network elements such as an SM, an MM, an SSF, and the CP-AU, or collaboratively completed by at least two of the plurality of network elements.

In some embodiments, the network authentication server sends the network parameter to the user equipment, and the user equipment correspondingly receives the network parameter; both the network authentication server and the user equipment generate a new shared key based on the second shared key and the network parameter, and the network authentication server further sends the new shared key to the CP-AU; and the CP-AU performs network authentication with the user equipment based on the new shared key to generate the target shared key.

In some embodiments, each time the user equipment sends the first request message, a procedure of generating the target shared key is performed once, ensuring security and randomness.

In some embodiments, the network authentication device and the service authentication device pre-negotiate to obtain the service parameter, and only when the user equipment sends the first request message, the network authentication device sends the service parameter to the user equipment, so that the user equipment and the service authentication device may generate the target shared key based on the service parameter.

In some embodiments, the user equipment obtains a related parameter in advance (if the service parameter is obtained or written in advance), and correspondingly derives the second shared key based on the service parameter, and after the network authentication server obtains the second shared key, the UE and the network authentication server may further generate the target shared key based on the network parameter and the second shared key.

In some embodiments, the UE further includes a root key shared by the UE and the network authentication device, and after the network authentication device obtains the second shared key, the UE and the network authentication device perform mutual authentication based on the root key shared by the UE and the network authentication device and the second shared key to generate a target root key.

In the method shown in FIG. 3B, the user equipment and the service authentication device generate the second shared key based on an obtained reference parameter and the first shared key that is pre-shared, and then the service authentication device sends the second shared key to the network authentication device, so that the network authentication device performs network authentication based on the second shared key to generate the target shared key. That is, service related information and network related information are considered when the target shared key is generate, and this improves a security level of the target shared key.

Figure 3C:
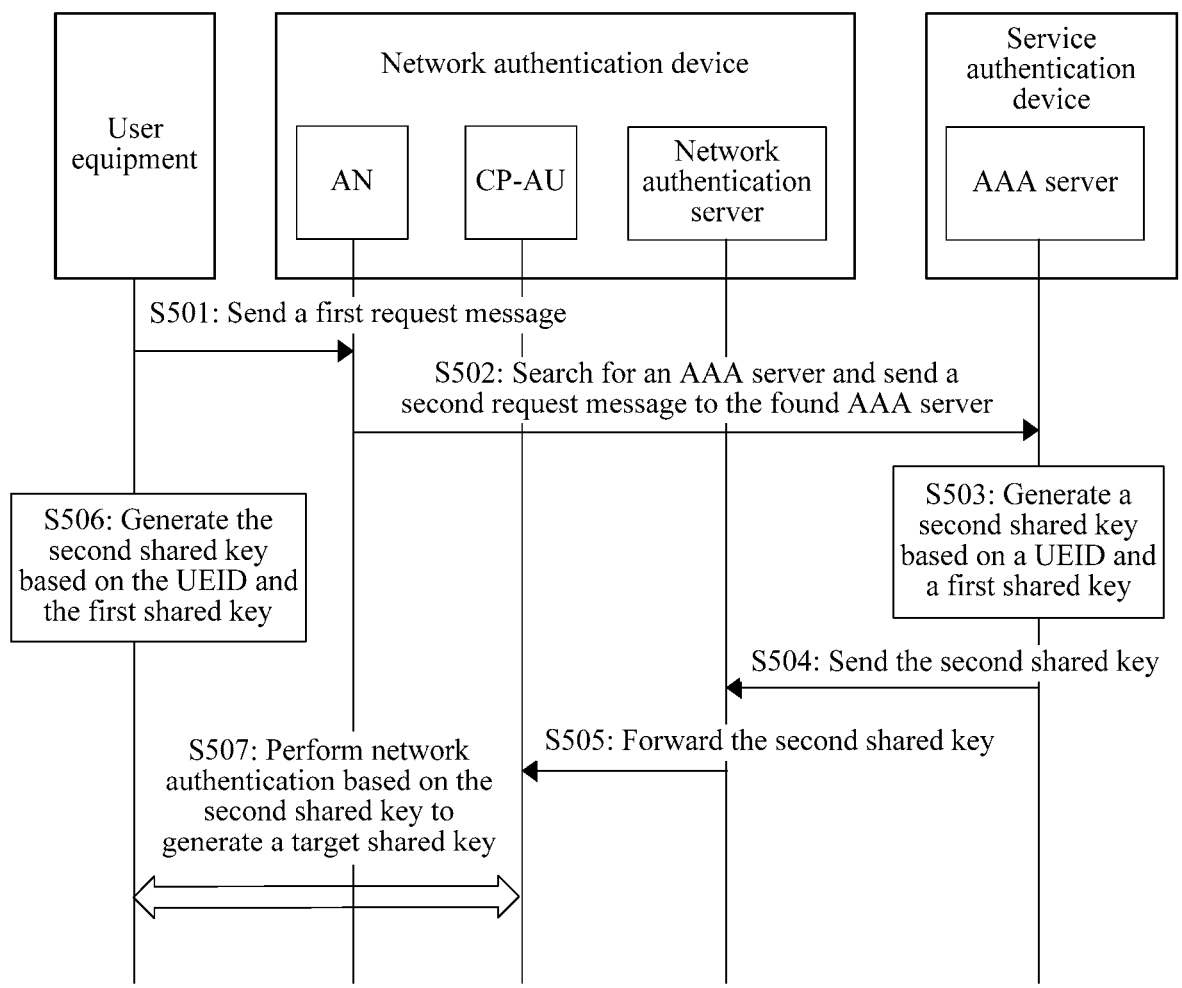
FIG. 3C is a schematic flowchart of another network authentication method according to an embodiment of the present invention.

Referring to FIG. 3C, FIG. 3C is a schematic flowchart of a network authentication method according to an embodiment of the present invention. The service authentication device may be a third party only with an authentication function, for example, an AAA server having an authentication, authorization and accounting (AAA for short) function. In the following embodiment, an example in which the service authentication device is the AAA server is used for description. The user equipment and the service authentication device pre-share a first shared key, the method includes steps S501 to S507, and the steps are described in detail as follows:

Step S501: The user equipment sends a first request message to an AN, where the first request message may carry an identity UEID of the user equipment, and may further include a service identifier of a target service, an AAA server identifier (for example, an AAA ID), and the like.

Step S502: The AN receives the first request message, searches for a corresponding AAA server based on the first request message, and sends a second request message to the found AAA server, where the second request message carries the identity UEID of the user equipment, and may further include information such as an operator identifier, the service identifier, a service parameter, and the AAA server identifier.

Step S503: The AAA server receives the second request message, and generates a second shared key based on the UEID and the first shared key, where other information may further be considered when the second shared key is generated. For example, the other information may include at least one of a network parameter, the service parameter, and the UEID, and the other information belongs to the reference information.

Step S504: The AAA server sends the second shared key to a network authentication server.

Step S505: The network authentication server receives the second shared key and sends the second shared key to a CP-AU. In some embodiments, the AAA server may further directly send the second shared key to the CP-AU, and correspondingly, the CP-AU receives the second shared key sent by the AAA server.

Step S506: The user equipment generates the second shared key based on the UEID and the first shared key. When other information is further needed to generate the second shared key, the user equipment may further obtain the other information from another device.

Step S507: The user equipment performs network authentication with the CP-AU based on the second shared key to generate a target shared key.

In some embodiments, after receiving the second shared key, the network authentication server generates a new shared key with reference to the second shared key and related information (for example, the network parameter), and sends the new shared key to the CP-AU; and the user equipment correspondingly obtains the related information from the network authentication device, and generates the new shared key with reference to the second shared key and the related information. Correspondingly, step S507 is adjusted, where network authentication is performed by using the new shared key.

In some embodiments, when the network authentication device includes a plurality of devices, actions of receiving the first request message, authenticating the user equipment, searching for the AAA server, sending the second request message to the AAA server, and receiving the second shared key may be completed by any one of the plurality of devices or collaboratively completed by devices with a related function, for example, may be independently completed by one of a plurality of network elements such as an SM, an MM, an SSF, and the CP-AU, or collaboratively completed by at least two of the plurality of network elements.

In some embodiments, the network authentication device may pre-store a correspondence between information such as the AAA server identifier or the service parameter and the AAA server, and therefore the corresponding AAA server may be searched for based on the information such as the AAA server identifier or the service parameter.

In some embodiments, the UE further includes a root key shared by the UE and the network authentication device, and after the network authentication device obtains the second shared key, the UE and the network authentication device perform mutual authentication based on the root key shared by the UE and the network authentication device and the second shared key to generate a target root key.

In the method shown in FIG. 3C, the user equipment and the service authentication device generate the second shared key based on an obtained reference parameter and the first shared key that is pre-shared, and then the service authentication device sends the second shared key to the network authentication device, so that the network authentication device performs network authentication based on the second shared key to generate the target shared key. That is, service related information and network related information are considered when the target shared key is generate, and this improves a security level of the target shared key.

In another optional solution, the generating a second shared key with reference to the reference information and a first shared key may comprise: performing, by the service authentication device and the user equipment, service authentication with reference to the reference information and the first shared key to generate the second shared key. The method may further include: sending, by the service authentication device, the second shared key to the network authentication device; receiving, by the network authentication device, the second shared key; and using, by the network authentication device and the user equipment, the second shared key or a shared key derived from the second shared key as the target shared key. For convenience of understanding, description is performed below with reference to FIG. 3D and a specific scenario.

Figure 3D:
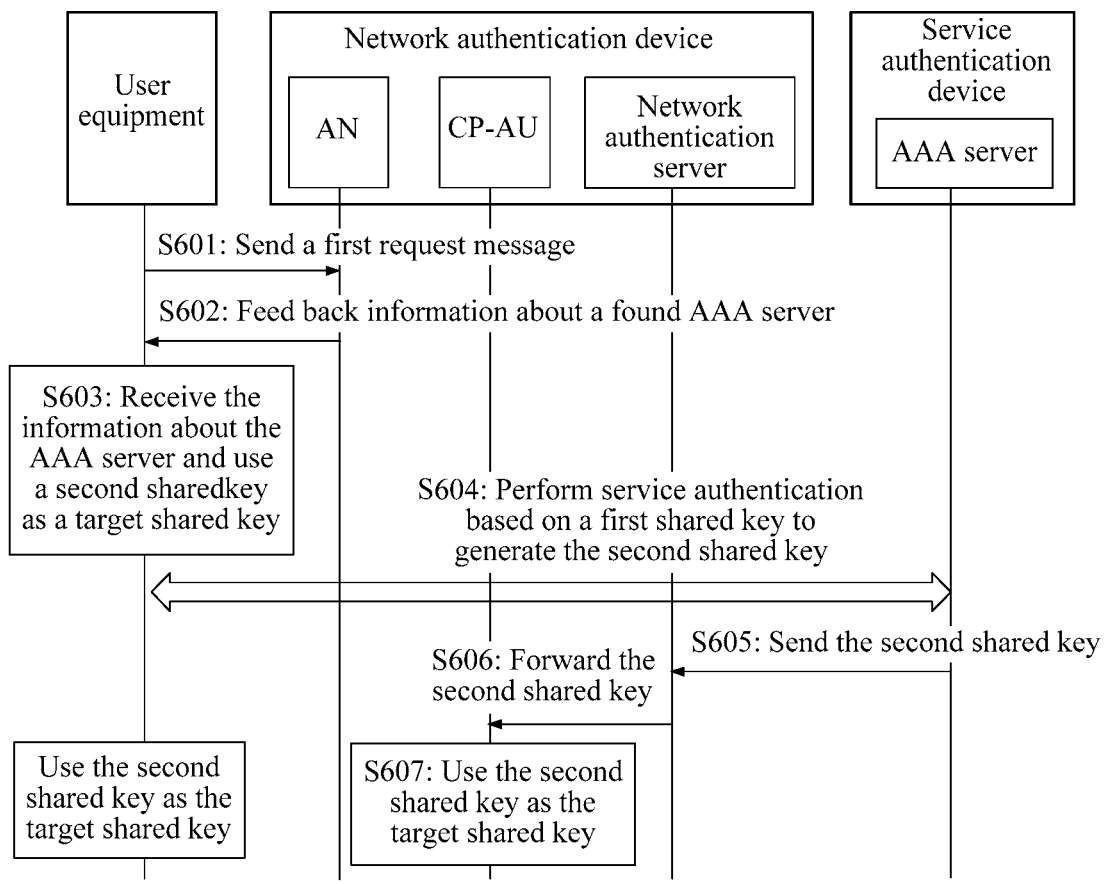
FIG. 3D is a schematic flowchart of another network authentication method according to an embodiment of the present invention.

Referring to FIG. 3D, FIG. 3D is a schematic flowchart of a network authentication method according to an embodiment of the present invention. The service authentication device may be a third party only with an authentication function, for example, an AAA server having an AAA function. In the following embodiment, an example in which the service authentication device is the AAA server is used for description. The user equipment and the service authentication device pre-share a first shared key, the method includes steps S601 to S607, and the steps are described in detail as follows:

Step S601: The user equipment sends a first request message to an AN, where the first request message may carry an identity UEID of the user equipment, and may further include a service identifier, an AAA server identifier (for example, an AAA ID), and the like.

Step S602: The AN receives the first request message, searches for information about the corresponding AAA server based on the first request message, for example, IP address information or MAC address information, and then sends the information about the AAA server to the user equipment.

Step S603: The user equipment receives the information about the AAA server.

Step S604: The user equipment performs service authentication with the AAA server based on the information about the AAA server to generate a second shared key, where the first shared key and reference information are used in a service authentication process, and the reference information may include an identity UEID of the user equipment, a network parameter sent by the network authentication device to the user equipment, a service parameter obtained by the service authentication device, and the like.

Step S605: The AAA server sends the second shared key to the network authentication server.

Step S606: The network authentication server receives the second shared key and forwards the second shared key to a CP-AU.

Step S607: The CP-AU receives the second shared key and uses the second shared key as a target shared key. The target shared key or a shared key derived from the target shared key can be used as a shared key that protects secure data transmission and that is negotiated and agreed on by the CP-AU and the user equipment. That is, the shared key that protects secure data transmission may be generated between the user equipment and the CP-AU without performing network authentication. In some embodiments, the second shared key may be shared with a network element such as an SM, an MM, an SSF, or the AN.

In some embodiments, when the network authentication device includes a plurality of devices, actions of receiving the first request message, authenticating the user equipment, searching for the information about the AAA server, sending the information about the AAA server to the user equipment, and receiving the second shared key may be completed by any one of the plurality of devices or collaboratively completed by devices with a related function, for example, may be independently completed by one of a plurality of network elements such as the SM, the MM, the SSF, and the CP-AU, or collaboratively completed by at least two of the plurality of network elements.

In some embodiments, after receiving the second shared key, the network authentication server generates a new shared key with reference to information such as the UEID of the user equipment and the network parameter; the user equipment correspondingly receives the network parameter sent by the network authentication device, and then generates the new shared key based on information such as the second shared key, the UEID, and the network parameter; and the network authentication server sends the new shared key to the CP-AU, and the CP-AU and the user equipment may use the new shared key as the target shared key. In some embodiments, the network authentication device and the user equipment may perform network authentication based on the second shared key (or the new shared key) to generate the target shared key.

In some embodiments, the UE further includes a root key shared by the UE and the network authentication device, and after the network authentication device obtains the second shared key, the UE and the network authentication device perform mutual authentication based on the root key shared by the UE and the network and the second shared key to generate a target root key.

In some embodiments, when both the network authentication device and the user equipment include the second shared key, the network authentication device may send the network parameter to the user equipment, and then generate the target shared key based on the second shared key and the network parameter.

In the method shown in FIG. 3D, the user equipment and the service authentication device perform mutual authentication based on an obtained reference parameter and the first shared key that is pre-shared to generate the second shared key, and then the service authentication device sends the second shared key to the network authentication device, so that the network authentication device and the user equipment use the second shared key as the target shared key. That is, the second shared key generated by the service authentication device and the user equipment is directly used as the target shared key of the network authentication device, and moreover the second shared key may further be used as the target shared key of the service authentication device. Performing the foregoing process is equivalent to completing authentications twice: network authentication and service authentication, improving authentication efficiency.

Further, the method may further include: performing, by the network authentication device and the user equipment, network authentication to generate a third shared key; and that the network authentication device and the user equipment perform network authentication based on the second shared key or based on the shared key derived from the second shared key to generate the target shared key may comprise: The network authentication device and the user equipment perform network authentication with reference to the second shared key to generate a fourth shared key, and generate the target shared key based on the third shared key and the fourth shared key. For convenience of understanding, description is performed below with reference to FIG. 3E, FIG. 3F, and a specific scenario.

Figure 3E:
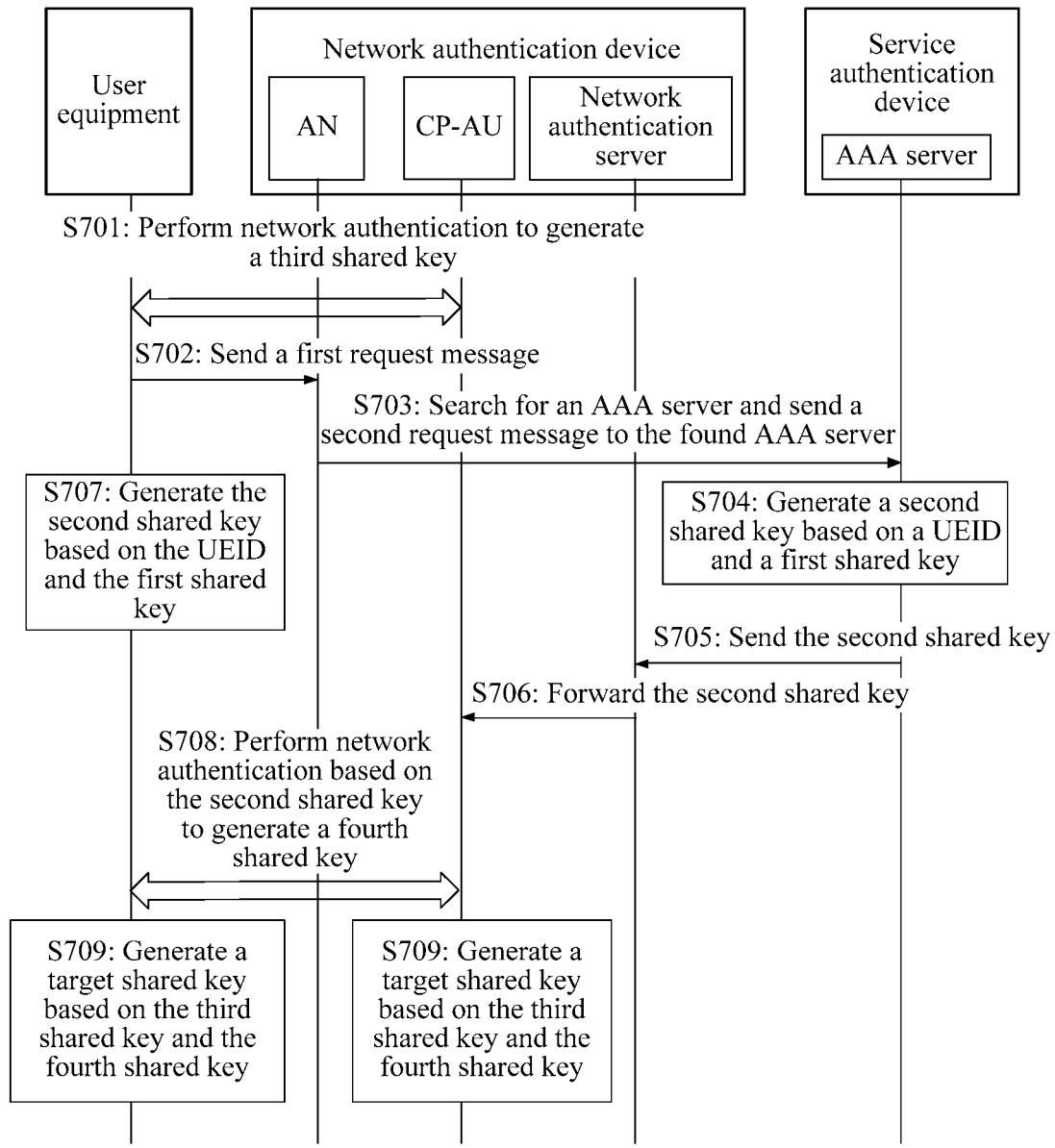
FIG. 3E is a schematic flowchart of another network authentication method according to an embodiment of the present invention.

Referring to FIG. 3E, FIG. 3E is a schematic flowchart of a network authentication method according to an embodiment of the present invention. The service authentication device may be a third party only with an authentication function, for example, an AAA server having an AAA function. In the following embodiment, an example in which the service authentication device is the AAA server is used for description. The user equipment and the service authentication device pre-share a first shared key, the method includes steps S701 to S709, and the steps are described in detail as follows:

Step S701: The CP-AU and the user equipment perform network authentication to generate a third shared key.

Step S702: The user equipment sends a first request message to an AN, where the first request message may carry an identity UEID of the user equipment, and may further include a service identifier, information about the AAA server, and the like.

Step S703: The AN receives the first request message, searches for a corresponding AAA server based on the first request message, and sends a second request message to the found AAA server, where the second request message carries the identity UEID of the user equipment, and may further include information such as a service parameter and a network parameter.

Step S704: The AAA server receives the second request message, and generates a second shared key based on the first shared key, where other information such as at least one of the UEID, the network parameter, and the service parameter may further be considered when the second shared key is generated, and the other information belongs to the reference information.

Step S705: The AAA server sends the second shared key to a network authentication server.

Step S706: The network authentication server receives the second shared key and forwards the second shared key to the CP-AU.

Step S707: The user equipment generates the second shared key based on the UEID and the first shared key. When other information is further needed to generate the second shared key, the user equipment may further obtain the other information from another device.

Step S708: The user equipment and the CP-AU perform network authentication based on the second shared key or a shared key derived from the second shared key to generate a fourth shared key.

Step S709: Both the user equipment and the CP-AU generate a target shared key based on the third shared key and the fourth shared key, where the target shared key or a shared key derived from the target shared key is a shared key that protects secure data transmission and that is negotiated and agreed on by the CP-AU and the user equipment.

In some embodiments, when the network authentication device includes a plurality of devices, actions of receiving the first request message, authenticating the user equipment, searching for the information about the AAA server, sending the second request message to the AAA server, and receiving the second shared key may be completed by any one of the plurality of devices or collaboratively completed by devices with a related function, for example, may be independently completed by one of a plurality of network elements such as an SM, an MM, an SSF, and the CP-AU, or collaboratively completed by at least two of the plurality of network elements.

In some embodiments, the user equipment and the CP-AU may further not perform authentication based on the second shared key, but respectively generate the target shared key based on the second shared key and the third shared key. The third shared key or a shared key derived from the third shared key is used to protect secure transmission of public data, and the second shared key or the shared key derived from the second shared key is used to protect secure transmission of particular service data.

In some embodiments, the user equipment and the CP-AU may further perform mutual authentication based on the third shared key and the second shared key, or perform mutual authentication based on the third shared key and the shared key derived from the second shared key.

In some embodiments, the UE further includes a root key shared by the UE and the network authentication device, and after the network authentication device obtains the second shared key, the UE and the network authentication device perform mutual authentication based on the root key shared by the UE and the network and the second shared key to generate the target shared key.

In some embodiments, the UE further includes a root key shared by the UE and the network authentication device, and network authentication between the user equipment and the CP-AU may be completed based on the shared root key to generate the third shared key.

Further, the method may further include: sending, by the network authentication device, the target shared key to the service authentication device; receiving, by the service authentication device, the target shared key; and using, by the service authentication device and the user equipment, the target shared key or the shared key derived from the target shared key as a shared key that protects secure data transmission and that is negotiated and agreed on by the service authentication device and the user equipment.

In the method shown in FIG. 3E, the network authentication device and the user equipment perform network authentication to generate the third shared key, the user equipment and the service authentication device generate the second shared key based on the obtained reference parameter and the first shared key that is pre-shared, then the service authentication device sends the second shared key to the network authentication device, and the network authentication device and the user equipment perform network authentication to generate the fourth shared key. Both the user equipment and the network authentication device generate the target shared key based on the third shared key generated in the first time of authentication and the fourth shared key generated in the second time of authentication. That is, service related information and network related information are considered when the target shared key is generate, and this improves a security level of the target shared key.

Figure 3F:
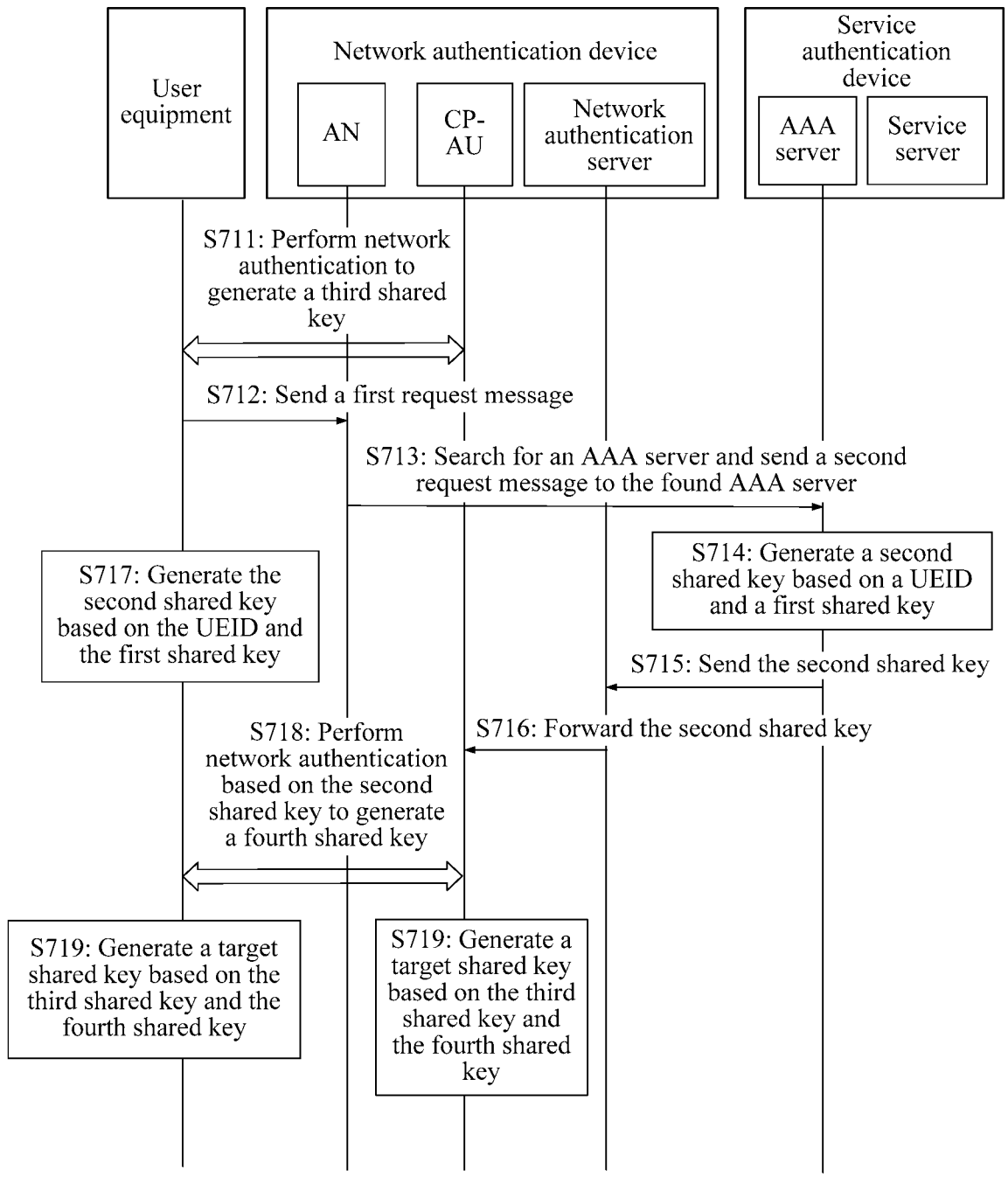
FIG. 3F is a schematic flowchart of another network authentication method according to an embodiment of the present invention.

Referring to FIG. 3F, FIG. 3F is a schematic flowchart of a network authentication method according to an embodiment of the present invention. The service authentication device may include a service authentication server and a service server. For example, the service authentication server may be an AAA server having an AAA function. In the following embodiment, an example in which the service authentication server is the AAA server is used for description. The user equipment and the service authentication device pre-share a first shared key, the method includes steps S711 to S719, and the steps are described in detail as follows:

Step S711: The CP-AU and the user equipment perform network authentication to generate a third shared key.

Step S712: The user equipment sends a first request message to an AN, where the first request message may carry an identity UEID of the user equipment, and may further include a service identifier and the like.

Step S713: The AN receives the first request message, searches for a corresponding AAA server based on the first request message, and sends a second request message to the found AAA server, where the second request message carries the identity UEID of the user equipment, and may further include information such as a service parameter and a network parameter.

Step S714: The AAA server receives the second request message, applies to the service server for obtaining the service parameter, the service server returns the service parameter, and the AAA server generates a second shared key based on the first shared key, where other information such as at least one of the UEID, the network parameter, and the service parameter may further be considered when the second shared key is generated, and the other information belongs to the reference information.

Step S715: The AAA server sends the second shared key to a network authentication server.

Step S716: The network authentication server receives the second shared key and forwards the second shared key to the CP-AU.

Step S717: The user equipment generates the second shared key based on the first shared key. The other information may further be considered when the second shared key is generated. When other information is further needed to generate the second shared key, the user equipment may further obtain the other information from another device.

Step S718: The user equipment performs network authentication with the CP-AU based on the second shared key to generate a fourth shared key.

Step S719: Both the user equipment and the CP-AU generate a target shared key based on the third shared key and the fourth shared key, where the target shared key or a shared key derived from the target shared key is a shared key that protects secure data transmission and that is negotiated and agreed on by the CP-AU and the user equipment.

In some embodiments, the user equipment and the CP-AU may further not perform authentication based on the second shared key, but respectively generate the target shared key based on the second shared key and the third shared key.

In some embodiments, the third shared key or a shared key derived from the third shared key is used to protect secure transmission of public data, and the second shared key or the shared key derived from the second shared key is used to protect secure transmission of particular service data. That is, the second shared key or the shared key derived from the second shared key is used as a type of target shared key, and the third shared key or the shared key derived from the third shared key is used as another shared key.

In some embodiments, the user equipment and the CP-AU may further perform mutual authentication based on the third shared key and the second shared key to generate the target shared key, or perform mutual authentication based on the third shared key and the shared key derived from the second shared key to generate the target shared key.

In some embodiments, the UE further includes a root key shared by the UE and the network authentication device, and after the network authentication device obtains the second shared key, the UE and the network authentication device perform mutual authentication based on the root key shared by the UE and the network and the second shared key to generate a target root key.

In some embodiments, the UE further includes a root key shared by the UE and the network authentication device, and the user equipment and the network authentication device perform mutual authentication based on the root key to obtain the third shared key.

In some embodiments, when the network authentication device includes a plurality of devices, actions of receiving the first request message, searching for the AAA server, sending the second request message to the AAA server, and performing mutual authentication with the user equipment may be completed by any one of the plurality of devices or collaboratively completed by devices with a related function, for example, may be independently completed by one of a plurality of network elements such as an SM, an MM, an SSF, the CP-AU, and the network authentication server or collaboratively completed by at least two of the plurality of network elements.

Further, the method may further include: the network authentication device is further configured to send the target shared key to the service authentication device; the service authentication device is configured to receive the target shared key; and the service authentication device and the user equipment are configured to use the target shared key or the shared key derived from the target shared key as a shared key that protects secure data transmission and that is negotiated and agreed on by the service authentication device and the user equipment.

In the method shown in FIG. 3F, the network authentication device and the user equipment perform network authentication to generate the third shared key, the user equipment and the service authentication device generate the second shared key based on the obtained reference parameter and the first shared key that is pre-shared, then the service authentication device sends the second shared key to the network authentication device, and the network authentication device and the user equipment perform network authentication to generate the fourth shared key. Both the user equipment and the network authentication device generate the target shared key based on the third shared key generated in the first time of authentication and the fourth shared key generated in the second time of authentication. That is, service related information and network related information are considered when the target shared key is generate, and this improves a security level of the target shared key.

In another optional solution, the method may further include: performing, by the network authentication device and the user equipment, network authentication to generate a third shared key; and the generating a second shared key with reference to the reference information and a first shared key is specifically: performing, by the service authentication device and the user equipment, service authentication with reference to the reference information and the first shared key to generate the second shared key. The service authentication device sends the second shared key to the network authentication device; the network authentication device receives the second shared key; and both the network authentication device and the user equipment generate the target shared key based on the second shared key and the third shared key; or respectively use the second shared key and the third shared key as target shared keys to protect different types of data. For example, the third shared key or a shared key derived from the third shared key is used to protect secure transmission of public data, and the second shared key or the shared key derived from the second shared key is used to protect secure transmission of particular service data. For convenience of understanding, description is performed below with reference to FIG. 3G and FIG. 3H and a specific scenario.

Figure 3G:
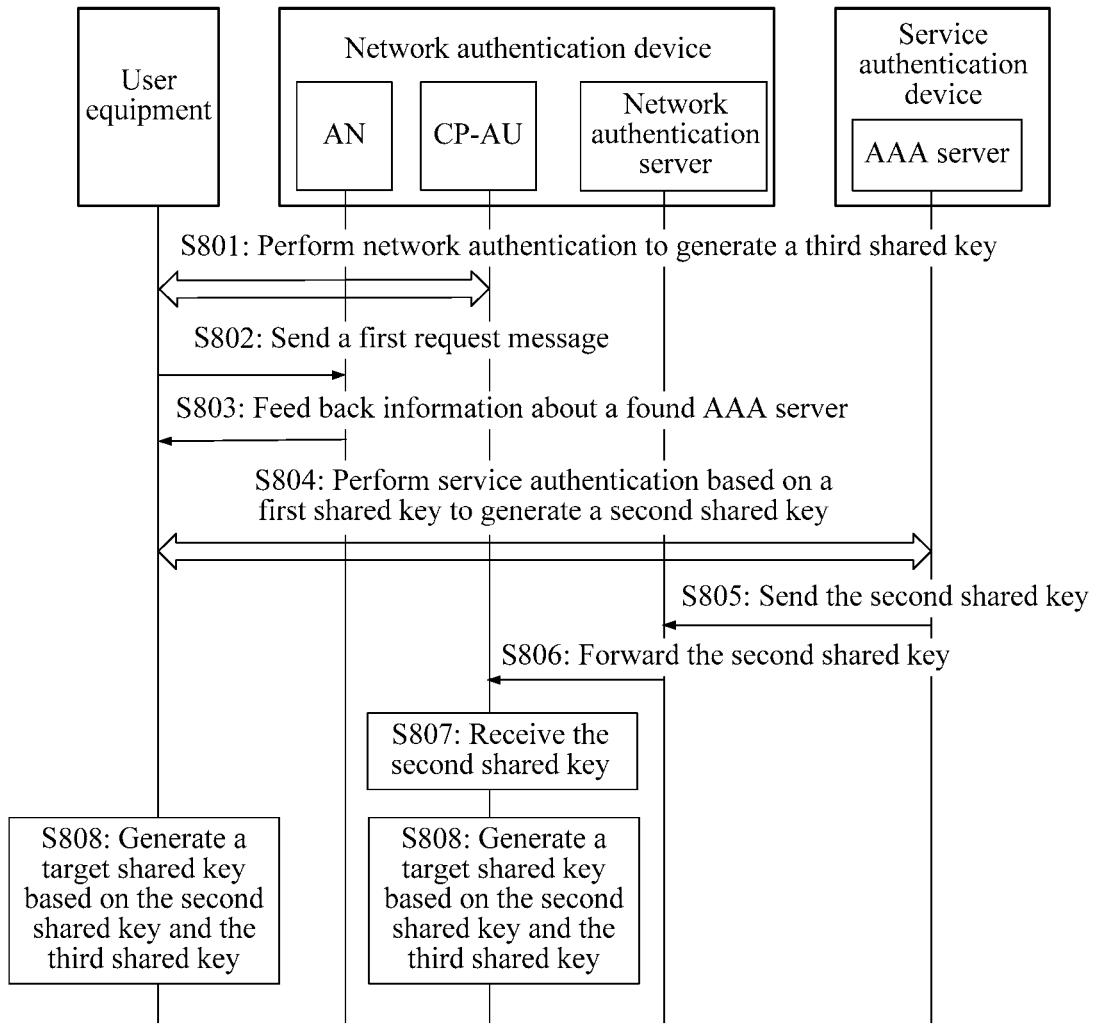
FIG. 3G is a schematic flowchart of another network authentication method according to an embodiment of the present invention.

Referring to FIG. 3G, FIG. 3G is a schematic flowchart of a network authentication method according to an embodiment of the present invention. The service authentication device may be a third party only with an authentication function, for example, an AAA server having an AAA function. In the following embodiment, an example in which the service authentication device is the AAA server is used for description. The user equipment and the service authentication device pre-share a first shared key, the method includes steps S801 to S808, and the steps are described in detail as follows:

Step S801: The CP-AU and the user equipment perform network authentication to generate a third shared key.

Step S802: The user equipment sends a first request message to an AN, where the first request message may carry an UEID of the user equipment, and may further include a service identifier and the like.

Step S803: The AN receives the first request message, searches for information about the corresponding AAA server based on the first request message, for example, IP address information or MAC address information, and then sends the information about the AAA server to the user equipment.

Step S804: The user equipment performs service authentication with the AAA server based on the information about the AAA server to generate a second shared key, where the first shared key and reference information are used in a service authentication process, and the reference information may include an UEID of the user equipment, a network parameter sent by the CP-AU to the user equipment, a service parameter, and the like.

Step S805: The AAA server sends the second shared key to the network authentication server.

Step S806: The network authentication server is configured to receive the second shared key and forward the second shared key to the CP-AU.

Step S807: The CP-AU receives the second shared key.

Step S808: Both the user equipment and the CP-AU generate a target shared key based on the second shared key and the third shared key, where the target shared key or a shared key derived from the target shared key is a shared key that protects secure data transmission and that is negotiated and agreed on by the CP-AU and the user equipment.

In some embodiments, when the user equipment and the network authentication server further include a pre-configured shared root key, network authentication between the user equipment and the CP-AU may be completed based on the shared root key to generate the third shared key.

In some embodiments, when the user equipment includes the information about the AAA server, the AN does not need to return the information about the AAA server to the user equipment.

In some embodiments, when the network authentication device includes a plurality of devices, actions of receiving the first request message, authenticating the user equipment, searching for the information about the AAA server, sending the information about the AAA server to the user equipment, and receiving the second shared key may be completed by any one of the plurality of devices or collaboratively completed by devices with a related function, for example, may be independently completed by one of a plurality of network elements such as the SM, the MM, the SSF, and the CP-AU, or collaboratively completed by at least two of the plurality of network elements. In some embodiments, the third shared key or a shared key derived from the third shared key is used to protect secure transmission of public data, and the second shared key or the shared key derived from the second shared key is used to protect secure transmission of particular service data. That is, the second shared key or the shared key derived from the second shared key is used as a type of target shared key, and the third shared key or the shared key derived from the third shared key is used as another type of target shared key.

In the method shown in FIG. 3G, the network authentication device and the user equipment perform network authentication to generate the third shared key, the user equipment and the service authentication device perform network authentication based on the obtained reference parameter and the first shared key that is pre-shared to generate the second shared key, and then the service authentication device sends the second shared key to the network authentication device; and both the user equipment and the network authentication device generate the target shared key based on the third shared key and the second shared key. That is, service related information and network related information are considered when the target shared key is generate, and this improves a security level of the target shared key.

Figure 3H:
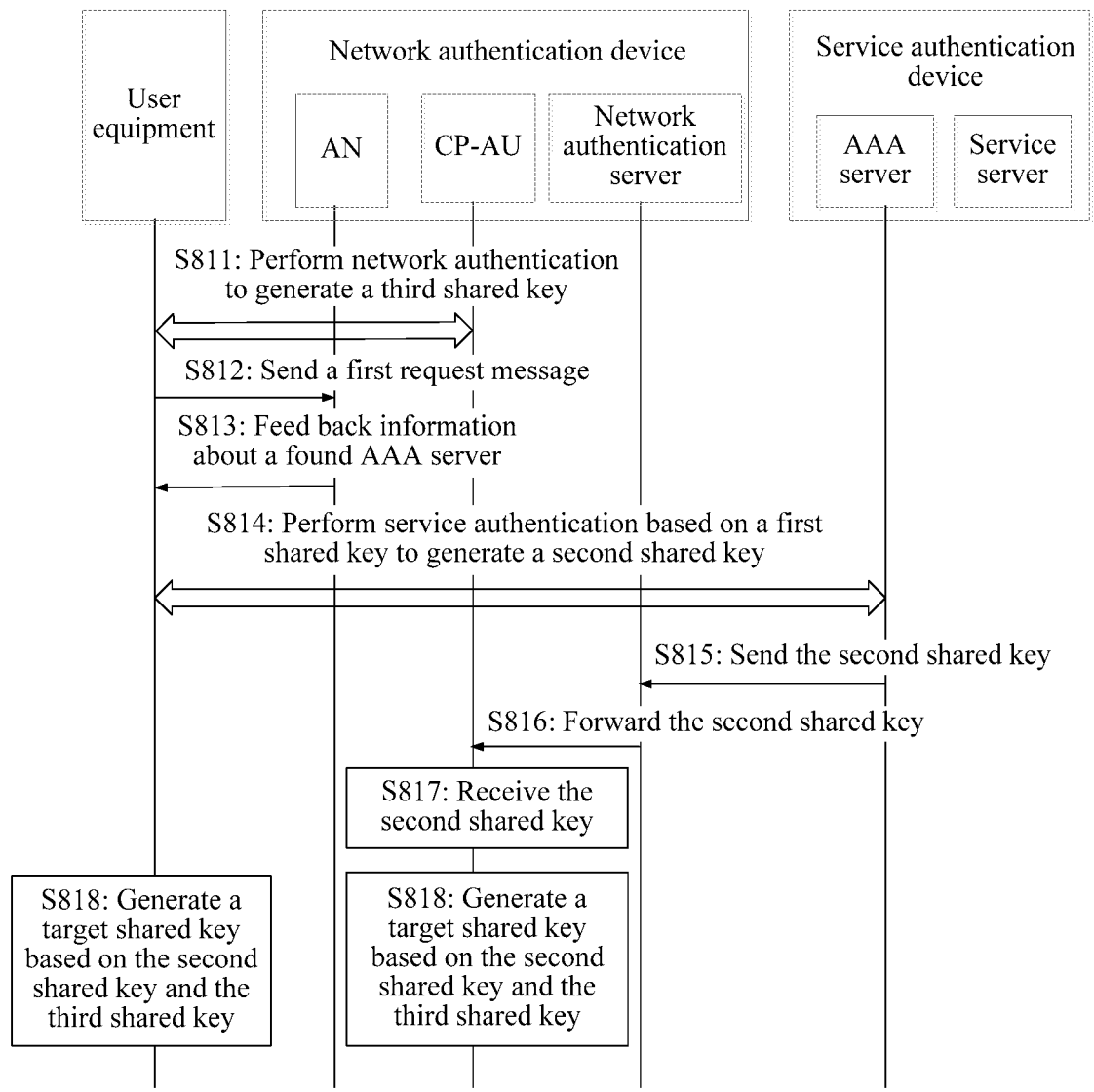
FIG. 3H is a schematic flowchart of another network authentication method according to an embodiment of the present invention.

Referring to FIG. 3H, FIG. 3H is a schematic flowchart of a network authentication method according to an embodiment of the present invention. The service authentication device may include a service authentication server and a service server. For example, the service authentication server may be an AAA server having an AAA function. In the following embodiment, an example in which the service authentication server is the AAA server is used for description. The user equipment and the service authentication device pre-share a first shared key, the method includes steps S811 to S818, and the steps are described in detail as follows:

Step S811: The CP-AU and the user equipment perform network authentication to generate a third shared key.

Step S812: The user equipment sends a first request message to an AN, where the first request message may carry an identity (UEID) of the user equipment, and may further include a service identifier and the like.

Step S813: The AN receives the first request message, searches for information about the corresponding AAA server based on the first request message, for example, IP address information or MAC address information, and then sends the information about the AAA server to the user equipment.

Step S814: The user equipment performs service authentication with the AAA server based on the information about the AAA server to generate a second shared key, where the first shared key and reference information are used in a service authentication process, and the reference information may include an identity UEID of the user equipment, a network parameter sent by the CP-AU to the user equipment, a service parameter, and the like.

Step S815: The AAA server sends the second shared key to the network authentication server.

Step S816: The network authentication server is configured to receive the second shared key and forward the second shared key to the CP-AU.

Step S817: The CP-AU receives the second shared key.

Step S818: Both the user equipment and the CP-AU generate a target shared key based on the second shared key and the third shared key, where the target shared key or a shared key derived from the target shared key is a shared key that protects secure data transmission and that is negotiated and agreed on by the CP-AU and the user equipment.

In some embodiments, the third shared key or a shared key derived from the third shared key is used to protect secure transmission of public data, and the second shared key or the shared key derived from the second shared key is used to protect secure transmission of particular service data. That is, the second shared key or the shared key derived from the second shared key is used as a type of target shared key, and the third shared key or the shared key derived from the third shared key is used as another type of target shared key.

In some embodiments, when the network authentication device includes a plurality of devices, actions of receiving the first request message, authenticating the user equipment, searching for the information about the AAA server, sending the information about the AAA server to the user equipment, and receiving the second shared key may be completed by any one of the plurality of devices or collaboratively completed by devices with a related function, for example, may be independently completed by one of a plurality of network elements such as the SM, the MM, the SSF, and the CP-AU, or collaboratively completed by at least two of the plurality of network elements. In some embodiments, the UE further includes a root key shared by the UE and the network authentication device, and the user equipment and the network authentication device perform mutual authentication based on the root key to obtain the third shared key.

In the method shown in FIG. 3H, the network authentication device and the user equipment perform network authentication to generate the third shared key, the user equipment and the service authentication device perform network authentication based on the obtained reference parameter and the first shared key that is pre-shared to generate the second shared key, and then the service authentication device sends the second shared key to the network authentication device; and both the user equipment and the network authentication device generate the target shared key based on the third shared key and the second shared key. That is, service related information and network related information are considered when the target shared key is generate, and this improves a security level of the target shared key.

In another optional solution, the method may further include: the reference information is a network parameter of a cellular network in which the network authentication device is located; and the generating a second shared key with reference to the reference information and a first shared key is specifically: performing, by the service authentication device and the user equipment, service authentication based on the reference information and the first shared key to generate the second shared key. The service authentication device sends the second shared key to the network authentication device; and the network authentication device receives the second shared key and uses the second shared key as the target shared key. For convenience of understanding, description is performed below with reference to FIG. 3I and a specific scenario.

Figure 3I:
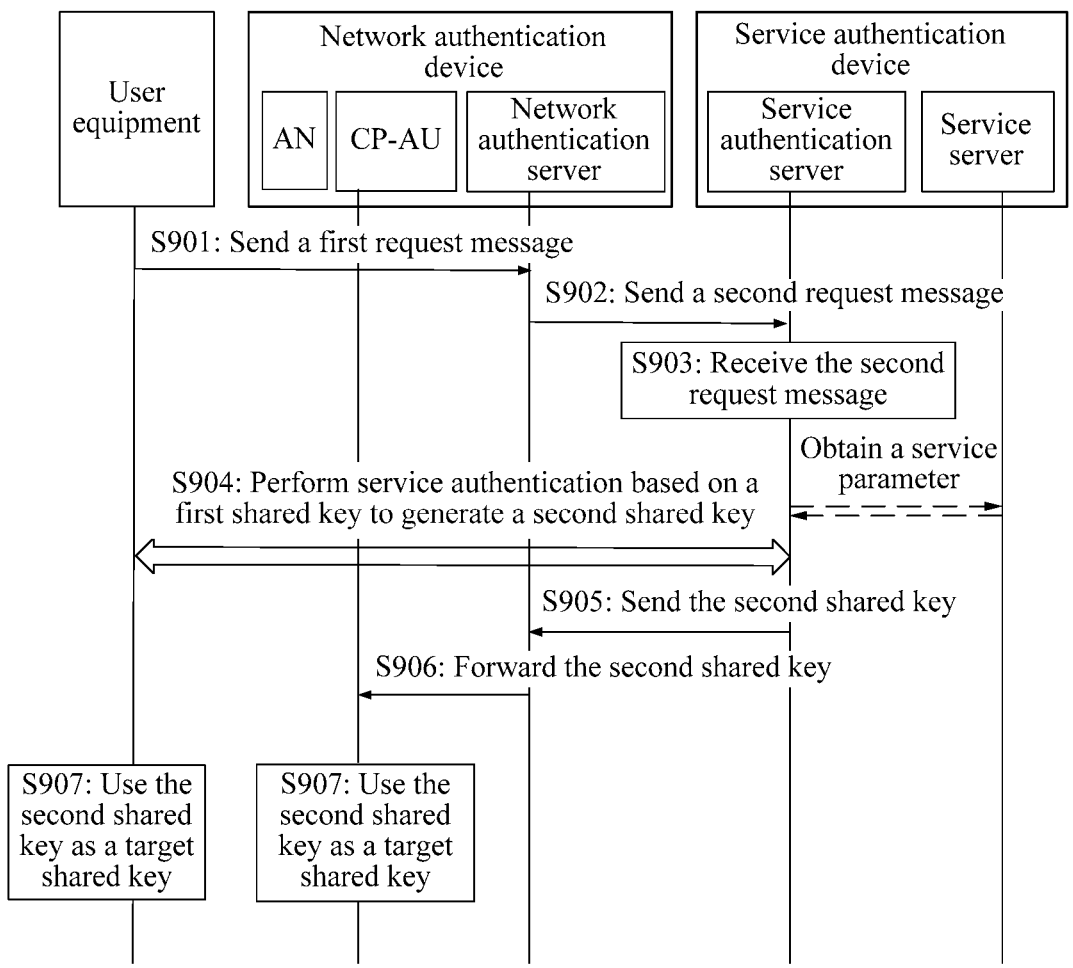
FIG. 3I is a schematic flowchart of another network authentication method according to an embodiment of the present invention.

Referring to FIG. 3I, FIG. 3I is a schematic flowchart of a network authentication method according to an embodiment of the present invention. The service authentication device may include a service authentication server and a service server, the service server is configured to provide service access, and in a service authentication process, if a service parameter needs to be used, the service parameter may be stored in the service authentication server or the service server. The user equipment and the service authentication device pre-share a first shared key, the method may include steps S901 to S907, and the steps are described in detail as follows:

Step S901: The user equipment sends a first request message to a network authentication server, where the first request message may include an identity UEID of the user equipment, and may further include information related to a target service.

Step S902: The network authentication server receives the first request message, and sends a second request message to the service authentication server based on the first request message.

Specifically, the first request message may include some identifier information to indicate a service that the user equipment intends to request; and after learning, based on the first request message, the service that the user equipment intends to request, the network authentication device sends a second request message to the service authentication device, the second request message may include an UEID of the user equipment, and the second request message may further include a network parameter of a cellular network in which the network authentication server is located.

Step S903: The service authentication server receives the second request message; and the service authentication server may further obtain a service parameter of the target service, where the service parameter may be stored in the service authentication server or the service server, and when the service parameter is stored in the service server, the service authentication server sends a request message for requesting the service parameter to the service server, and the service server correspondingly returns the service parameter to the service authentication server.

Step S904: The service authentication server and the user equipment perform service authentication based on the first shared key to generate a second shared key, where information such as the service parameter, a network parameter, and a UEID may further be used in the service authentication process, all used information except the first shared key may belong to the reference information, and the service parameter and the network parameter used by the user equipment may be sent by the network authentication server.

Step S905: The service authentication server sends the second shared key to the network authentication server.

Step S906: The network authentication server receives the second shared key and forwards the second shared key to the CP-AU.

Step S907: The CP-AU receives the second shared key. In this case, both the user equipment and the CP-AU have the second shared key. Therefore, the second shared key may be directly determined as a target shared key, the target shared key or a shared key derived from the target shared key is a shared key that protects secure data transmission and that is negotiated and agreed on by the CP-AU and the user equipment, and a process in which the user equipment performs network authentication with the CP-AU again may be omitted.

In some embodiments, when the network authentication device includes a plurality of devices, actions of receiving the first request message, sending the second request message to the service authentication server, and receiving the second shared key may be completed by any one of the plurality of devices or collaboratively completed by devices with a related function, for example, may be independently completed by one of a plurality of network elements such as an SM, an MM, an SSF, and the CP-AU, or collaboratively completed by at least two of the plurality of network elements.

In some embodiments, both the service authentication server and the user equipment may generate a new shared key based on the first shared key and with reference to some other information (for example, the network parameter, the service parameter, and the UEID). In this way, in step S904, the service authentication server specifically performs network authentication with the user equipment with reference to the new shared key to generate the second shared key.

In some embodiments, in a process in which the user equipment performs service authentication with the service server, exchanged information may be forwarded by the network authentication device or may be not forwarded by the network authentication device, for example, directly sent by a wired network.

In the method shown in FIG. 3I, the user equipment and the service authentication device perform service authentication based on an obtained reference parameter and the first shared key that is pre-shared to generate the second shared key, and then the service authentication device sends the second shared key to the network authentication device, so that the network authentication device uses the second shared key as the target shared key. That is, the second shared key generated by the service authentication device and the user equipment is directly used as the target shared key of the network authentication device, and moreover the second shared key may further be used as the target shared key of the service authentication device. Performing the foregoing process is equivalent to completing authentications twice: network authentication and service authentication, improving authentication efficiency.

Figure 3J:
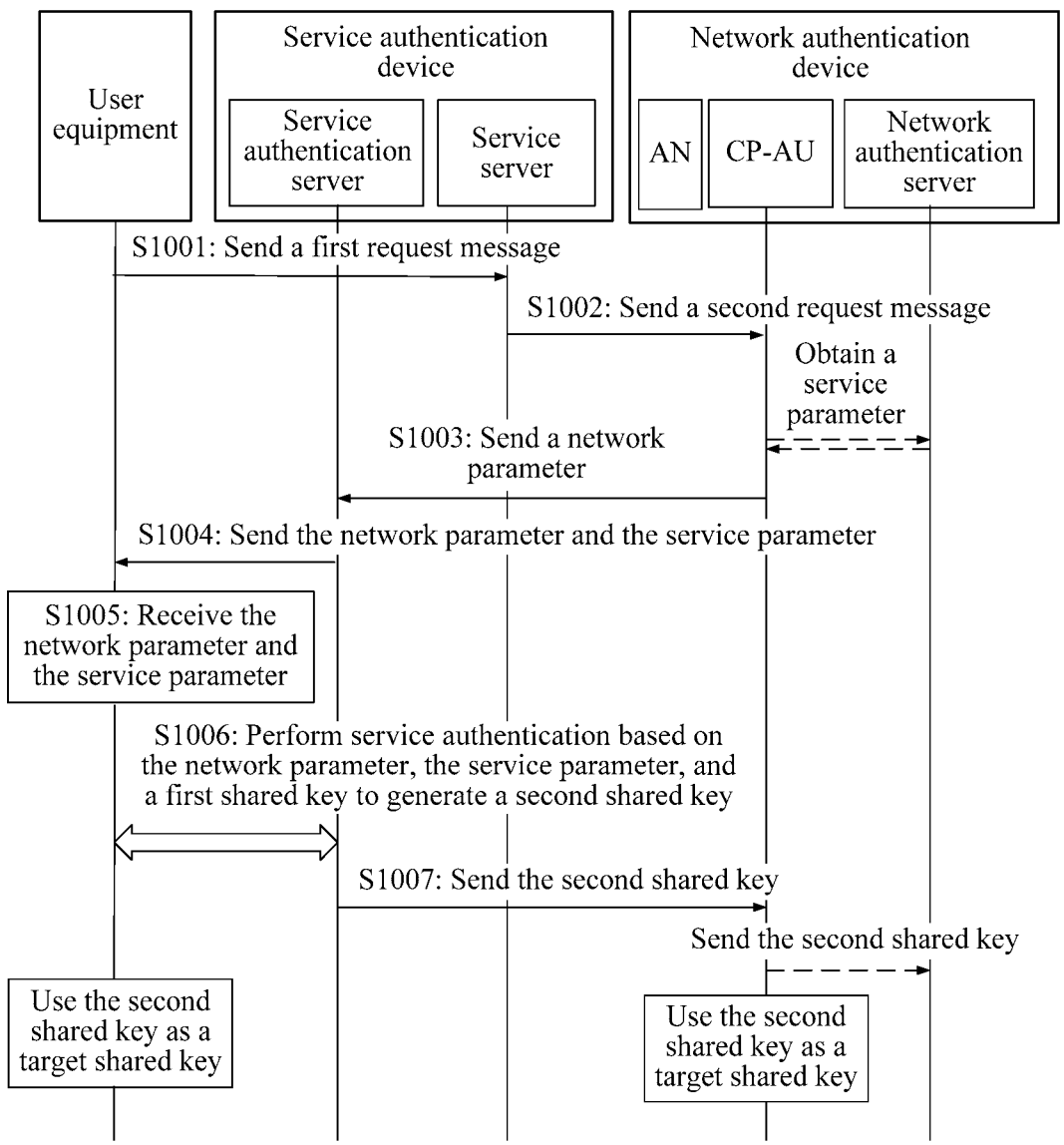
FIG. 3J is a schematic flowchart of another network authentication method according to an embodiment of the present invention.

Referring to FIG. 3J, FIG. 3J is a schematic flowchart of a network authentication method according to an embodiment of the present invention. The service authentication device may include a service authentication server and a service server, the service server is configured to provide service access, and in a service authentication process, if a service parameter needs to be used, the service parameter may be stored in the service authentication server or the service server. The user equipment and the service authentication device pre-share a first shared key, the method may include steps S1001 to S1007, and the steps are described in detail as follows:

Step S1001: The user equipment sends a first request message to the service server.

Step S1002: The service server receives the first request message, and sends a second request message to the CP-AU based on the first request message, where the second request message is used to request the CP-AU to feed back a network parameter of a network in which the CP-AU is located to the service authentication server.

Step S1003: The CP-AU sends the network parameter to the service authentication server.

Step S1004: The service authentication server receives the network parameter, and sends the network parameter and a service parameter of a target service to the user equipment.

Step S1005: The user equipment receives the network parameter and the service parameter.

Step S1006: The service authentication server and the user equipment perform service authentication based on the first shared key, the network parameter, and the service parameter to generate a second shared key, where all information used to generate the second shared key, except the first shared key, may belong to the reference information.

Step S1007: The service authentication server sends the second shared key to the CP-AU, where the CP-AU may further need to send the second shared key to the network authentication server for storage and later use. Both the CP-AU and the user equipment have the second shared key. Therefore, the second shared key is used as a target shared key, the target shared key or a shared key derived from the target shared key is a shared key that protects secure data transmission and that is negotiated and agreed on by the CP-AU and the user equipment, and performing, by the user equipment, network authentication with the CP-AU again may be omitted.

In some embodiments, a device for receiving and sending the first request message and the second request message may be the service server, the service authentication server, or another device included in the service authentication device.

In some embodiments, a device that is configured to receive the second request message and that is in the network authentication device may be the CP-AU, or another device such as the network authentication server, an MM, an SM, or an AN in the network authentication device.

In some embodiments, in addition to being sent by the service authentication server, the service parameter used by the user equipment may further be preset in the user equipment.

In some embodiments, the CP-AU and the user equipment may further generate a new shared key based on the second shared key, and then generate the target shared key based on the new shared key, the network parameter, and the service parameter.

In some embodiments, the CP-AU and the user equipment may further perform network authentication based on the second shared key to generate the target shared key.

In some embodiments, the service authentication device does not send the second shared key to the network authentication device, and the network authentication device only needs to learn that the user equipment is authenticated successfully.

In the method shown in FIG. 3J, the user equipment and the service authentication device perform service authentication based on an obtained reference parameter and the first shared key that is pre-shared to generate the second shared key, and then the service authentication device sends the second shared key to the network authentication device, so that the network authentication device uses the second shared key as the target shared key. That is, the second shared key generated by the service authentication device and the user equipment is directly used as the target shared key of the network authentication device, and moreover the second shared key may further be used as the target shared key of the service authentication device. Performing the foregoing process is equivalent to completing authentications twice: network authentication and service authentication, improving authentication efficiency.

In another optional solution, the method may further include: obtaining, by the service authentication device, a fifth shared key pre-configured between the user equipment and the network authentication device; and the generating a second shared key with reference to the reference information and a first shared key is specifically: performing service authentication with reference to the reference information, the first shared key, and the fifth shared key to generate the second shared key. The service authentication device sends the second shared key to the network authentication device; and the network authentication device receives the second shared key and uses the second shared key as the target shared key. For convenience of understanding, description is performed below with reference to FIG. 3K and a specific scenario.

Figure 3K:
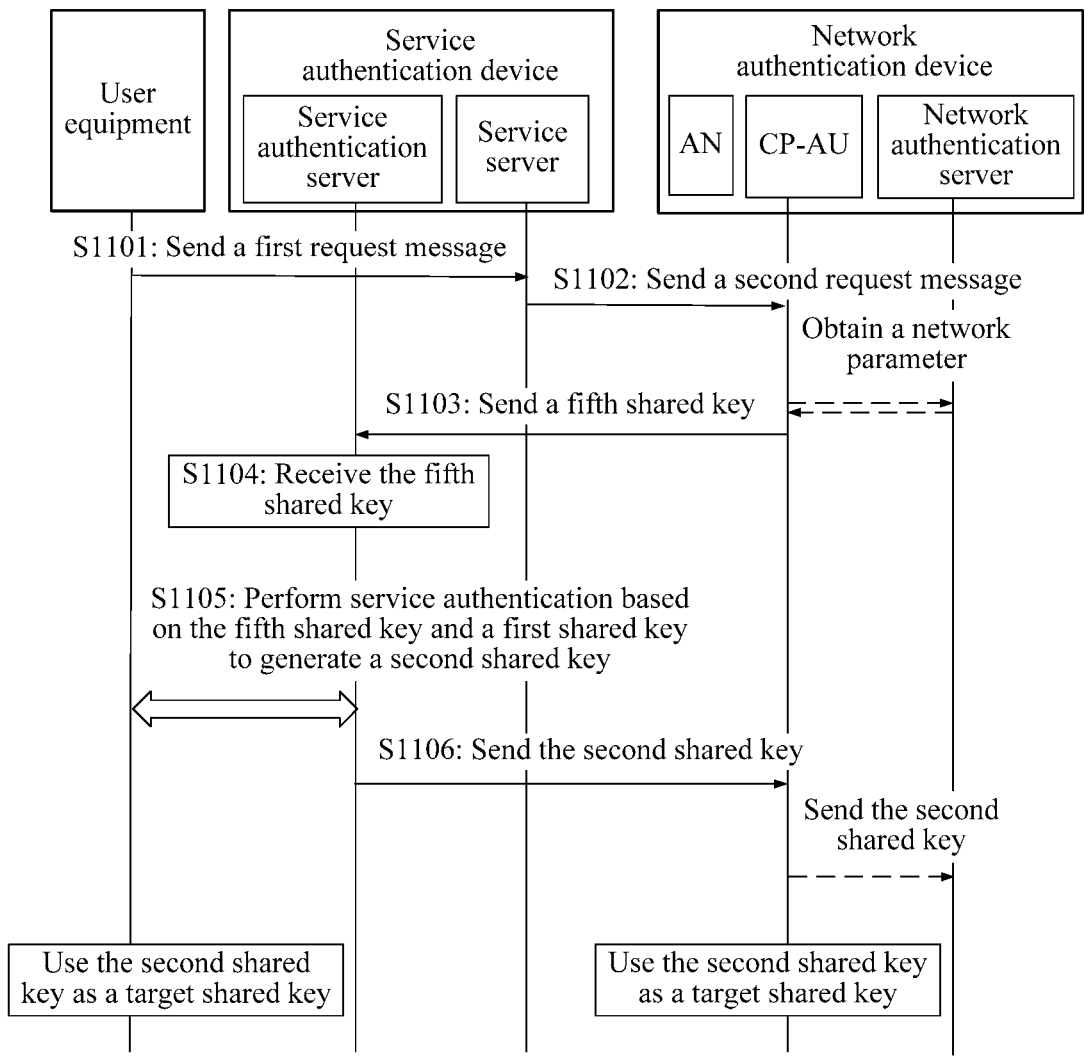
FIG. 3K is a schematic flowchart of another network authentication method according to an embodiment of the present invention.

Referring to FIG. 3K, FIG. 3K is a schematic flowchart of a network authentication method according to an embodiment of the present invention. The service authentication device may include a service authentication server and a service server. The user equipment and the service authentication device pre-share a first shared key, and the user equipment and the network authentication device pre-share a fifth shared key. The method may include steps S1101 to S1106, and the steps are described in detail as follows:

Step S1101: The user equipment sends a first request message to the service authentication server.

Step S1102: The service authentication server receives the first request message, and sends a second request message to the CP-AU based on the first request message, where the second request message is used to request the CP-AU to send the fifth shared key to the service authentication server.

Step S1103: The CP-AU receives the second request message, and sends the fifth shared key (or a key derived from the fifth shared key) to the service authentication server.

Step S1104: The service authentication server receives the fifth shared key, and may further receive a network parameter sent by the CP-AU.

Step S1105: The service authentication server and the user equipment perform service authentication based on the first shared key and the fifth shared key to generate a second shared key, or perform service authentication based on the first shared key and the key derived from the fifth shared key to generate a second shared key, where the second shared key or a shared key derived from the second shared key is a shared key that protects secure data transmission and that is negotiated and agreed on by the service authentication server and the user equipment.

Step S1106: The service authentication server sends the second shared key to the CP-AU, where the CP-AU may further need to send the second shared key to the network authentication server for storage and later use. Both the CP-AU and the user equipment have the second shared key. Therefore, the network authentication device and the user equipment use the second shared key as a target shared key, the target shared key or a shared key derived from the target shared key is a shared key that protects secure data transmission and that is negotiated and agreed on by the CP-AU and the user equipment, and a process in which the user equipment performs network authentication with the CP-AU again may be omitted.

In some embodiments, a device that is configured to receive the second request message and that is in the network authentication device may be the CP-AU, or another device such as the network authentication server, an MM, an SM, or an AN.

In some embodiments, in addition to being sent by the service authentication server, the service parameter used by the user equipment may further be preset in the user equipment.

In some embodiments, the CP-AU and the user equipment may further generate a new shared key based on the second shared key, and then generate the target shared key based on the new shared key, the network parameter, and the service parameter.

In some embodiments, the CP-AU and the user equipment may further perform network authentication based on the second shared key to generate the target shared key.

In some embodiments, the service authentication device does not send the second shared key to the network authentication device, and the network authentication device only needs to learn that the user equipment is authenticated successfully.

In another optional solution, the method further includes: sending, by the service authentication device, the second shared key to the network authentication device; receiving, by the network authentication device, the second shared key; and generating, by both the network authentication device and the user equipment, the target shared key based on the second shared key and a fifth shared key; or respectively using the second shared key and the fifth shared key as target shared keys for protecting different types of data, where the fifth shared key is a shared key pre-configured between the user equipment and the network authentication device.

In the method shown in FIG. 3K, the user equipment and the service authentication device generate the second shared key based on the first shared key and the fifth shared key, and then the service authentication device sends the second shared key to the network authentication device, so that the network authentication device uses the second shared key as the target shared key. That is, the second shared key generated by the service authentication device and the user equipment is directly used as the target shared key of the network authentication device, and moreover the second shared key may further be used as the target shared key of the service authentication device. Performing the foregoing process is equivalent to completing authentications twice: network authentication and service authentication, improving authentication efficiency.

In another optional solution, the method may further include: generating, by the network authentication device, network-side information based on a network parameter of a cellular network in which the network authentication device is located; sending, by the network authentication device, the network-side information to the service authentication device; and receiving, by the service authentication device, the network-side information and forward the network-side information to the user equipment; and the generating a second shared key with reference to the reference information and a first shared key is specifically: performing service authentication with reference to the network parameter and the first shared key to generate the second shared key, where the network parameter includes the network-side information. The service authentication device sends the second shared key to the network authentication device; and the network authentication device is configured to receive the second shared key and use the second shared key as the target shared key. For convenience of understanding, description is performed below with reference to FIG. 3L and a specific scenario.

Figure 3L:
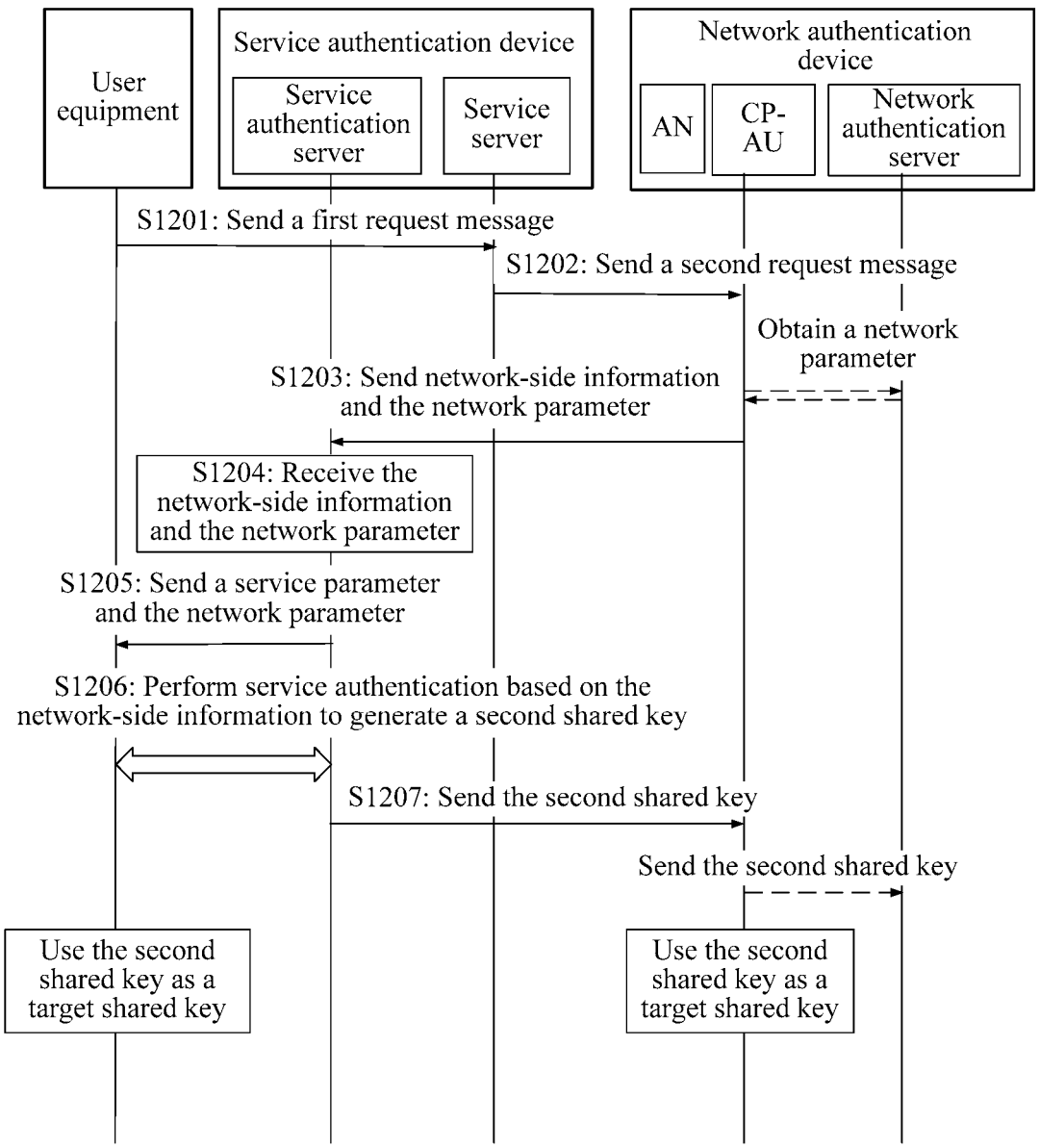
FIG. 3L is a schematic flowchart of another network authentication method according to an embodiment of the present invention.

Referring to FIG. 3L, FIG. 3L is a schematic flowchart of a network authentication method according to an embodiment of the present invention. The service authentication device may include a service authentication server and a service server. The user equipment and the service authentication device pre-share a first shared key, and the user equipment and the network authentication device pre-share a fifth shared key. The method may include steps S1201 to S1207, and the steps are described in detail as follows:

Step S1201: The user equipment sends a first request message to the service authentication server.

Step S1202: The service authentication server receives the first request message, and sends a second request message to the CP-AU based on the first request message, where the second request message includes the first shared key and a service parameter of a target service.

Step S1203: The CP-AU receives the second request message, and sends the network parameter and network-side information that is generated based on the network parameter, the service parameter, the first shared key, and the fifth shared key to the service authentication server.

Step S1204: The service authentication server receives the network-side information and the network parameter, and sends the network parameter and the service parameter to the user equipment.

Step S1205: The user equipment receives the network parameter and the service parameter, and generates the network-side information (for example, Kcombination) based on the first shared key, the fifth shared key, the network parameter, and the service parameter, where the network-side information belongs to the reference information.

Step S1206: The service authentication server and the user equipment perform service authentication based on the network-side information to generate a second shared key.

Step S1207: The service authentication server sends the second shared key to the CP-AU, where the CP-AU may further need to send the second shared key to the network authentication server for storage and later use. Both the CP-AU and the user equipment have the second shared key. Therefore, the CP-AU and the user equipment use the second shared key as a target shared key, the target shared key or a shared key derived from the target shared key is a shared key that protects secure data transmission and that is negotiated and agreed on by the CP-AU and the user equipment, and performing, by the user equipment, network authentication with the CP-AU again may be omitted.

In some embodiments, a device that is configured to receive the second request message and that is in the network authentication device may be the CP-AU, or another device such as the network authentication server, an MM, an SM, or an AN.

In some embodiments, in addition to being sent by the service authentication server, the service parameter used by the user equipment may further be preset in the user equipment.

In some embodiments, the CP-AU and the user equipment may further generate a new shared key based on the second shared key, and then generate the target shared key based on the new shared key, the network parameter, and the service parameter.

In some embodiments, the CP-AU and the user equipment may further perform network authentication based on the second shared key to generate the target shared key.

In some embodiments, the service authentication device does not send the second shared key to the network authentication device, and the network authentication device only needs to learn that the user equipment is authenticated successfully.

In the method shown in FIG. 3L, the user equipment and the service authentication device perform service authentication based on the obtained network-side information and the first shared key that is pre-shared to generate the second shared key, and then the service authentication device sends the second shared key to the network authentication device, so that the network authentication device uses the second shared key as the target shared key. That is, the second shared key generated by the service authentication device and the user equipment is directly used as the target shared key of the network authentication device, and moreover the second shared key may further be used as the target shared key of the service authentication device. Performing the foregoing process is equivalent to completing authentications twice: network authentication and service authentication, improving authentication efficiency.

Figure 4A:
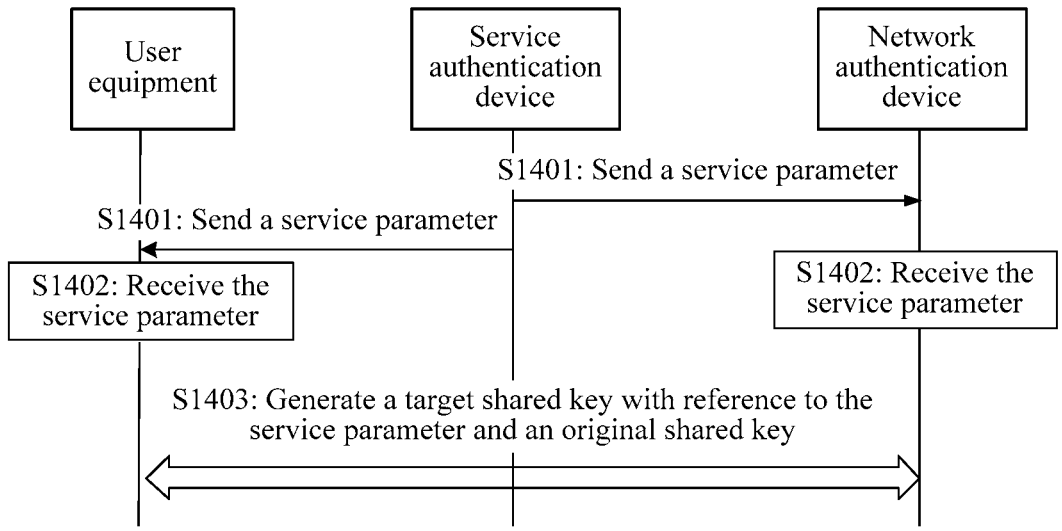
FIG. 4A is a schematic flowchart of another network authentication method according to an embodiment of the present invention.

Referring to FIG. 4A, FIG. 4A is a schematic flowchart of another network authentication method according to an embodiment of the present invention. The method may be implemented based on the network authentication system shown in FIG. 1, and the method includes but is not limited to the following steps.

Step S1401: The service authentication device sends a pre-stored service parameter of a target service to the network authentication device and the user equipment.

Specifically, the service authentication device pre-stores the service parameter of the target service. For a specific situation of the target service and the service parameter of the target service, refer to the description of the method embodiment shown in FIG. 3A. Details are not described herein.

In an optional solution, the user equipment is not connected to the service authentication device by using a network other than a cellular network; and after receiving the first request message that is sent by the user equipment and that is forwarded by using the network authentication device, the service authentication device may send the service parameter, and because the first request message is forwarded by the user equipment to the service authentication device by using the network authentication device, the service parameter may be sent to the network authentication device by using an opposite path, and then forwarded by the network authentication device to the user equipment. In some embodiments, the first request message carries an identity of the user equipment, and when the first request message is sent to the network authentication device, related information (for example, a network identifier) of a cellular network in which the network authentication device is located is added to the first request message by using the network authentication device. Therefore, the service authentication device may sequentially send the service parameter to the network authentication device and the user equipment based on the identity of the user equipment and the related information about the cellular network.

In another optional solution, the user equipment is not connected to the service authentication device by using a network other than a cellular network; and after receiving a second request message sent by the network authentication device, the service authentication device may send the service parameter, the service authentication device feeds back the service parameter to the network authentication device after the service authentication device receives the second request message sent by the network authentication device, and after receiving the service parameter, the network authentication device sends the service parameter to the user equipment.

In another optional solution, the user equipment establishes a communication connection to the service authentication device by using a network other than a cellular network, and after receiving a second request message sent by the network authentication device, the service authentication device may send the service parameter, where the second request message may carry related information (for example, a network identifier) of the network authentication device. In this way, the service authentication device may send the service parameter to the network authentication device based on the related information, and return the service parameter to the user equipment based on a path for receiving the first request message.

Step S1402: The network authentication device and the user equipment receive the service parameter.

Step S1403: The network authentication device and the user equipment perform network authentication with reference to the service parameter and an original shared key to generate a target shared key, where the target shared key or a shared key derived from the target shared key is a shared key that protects secure data transmission and that is negotiated and agreed on by the network authentication device and the user equipment. It should be noted that, the original shared key herein is equivalent to the foregoing fifth shared key, that is, the original shared key is a shared key pre-shared by the network authentication device and the user equipment.

In an optional solution, the method further includes: performing, by the network authentication device and the user equipment, network authentication with reference to the service parameter and the original shared key to generate the target shared key. The performing is specifically: generating, by the network authentication device and the user equipment, an authentication shared key with reference to the service parameter and an original shared key. The network authentication device and the user equipment network authentication perform based on the authentication shared key to generate the target shared key.

In the method shown in FIG. 4A, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 5A:
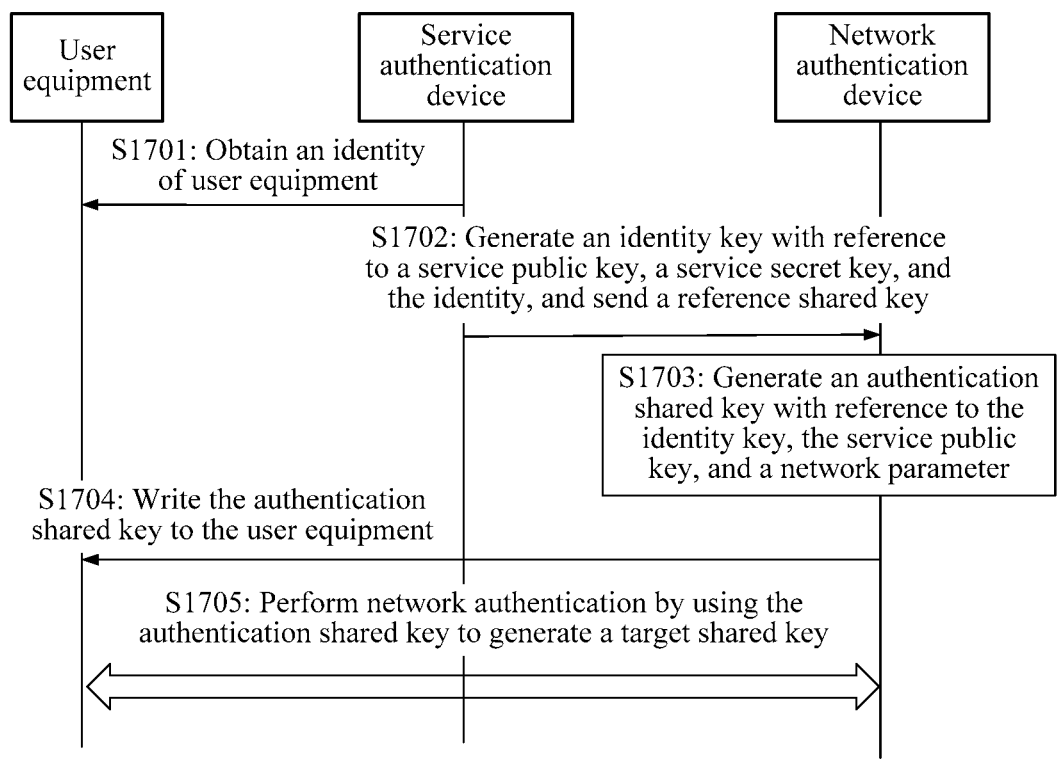
FIG. 5A is a schematic flowchart of another network authentication method according to an embodiment of the present invention.

Referring to FIG. 5A, FIG. 5A is a schematic flowchart of another network authentication method according to an embodiment of the present invention. The method may be implemented based on the network authentication system shown in FIG. 1, and the method includes but is not limited to the following steps.

Step S1701: The service authentication device obtains an identity of the user equipment.

Step S1702: The service authentication device generates an identity key with reference to a service public key and a service secret key of the service authentication device and the identity, and sends the identity key and the service public key to the network authentication device.

Step S1703: The network authentication device receives the identity key, and generates an authentication root key with reference to the identity key, the service public key, and the network parameter, where the network parameter is a parameter related to a cellular network in which the network authentication device is located. The network parameter is described above, and details are not described herein. The generating an authentication root key with reference to the identity key, the service public key, and the network parameter is specifically: Information that needs to be used to generate the authentication root key includes but is not limited to the identity key, the service public key, and the network parameter.

Step S1704: The network authentication device writes the authentication root key to the user equipment. For example, the network authentication device may write the authentication root key to a universal subscriber identity module (English: Universal Subscriber Identity Module, USIM for short) card, but the USIM card is configured for the user equipment. Therefore, it may be considered that the network authentication device writes the authentication root key to the user equipment. Additionally, the writing, by the network authentication device, the authentication root key to the user equipment includes directly writing, by the network authentication device, the authentication root key to the user equipment; also includes writing, by the network authentication device, the authentication root key to the user equipment by using another device; and further includes invoking, by another device, the authentication root key in the network authentication device and writing the authentication root key to the user equipment.

Step S1705: The network authentication device and the user equipment are configured to perform network authentication by using the authentication root key to generate a target shared key, where the target shared key or a shared key derived from the target shared key is a shared key that protects secure data transmission and that is negotiated and agreed on by the network authentication device and the user equipment. For convenience of understanding, description is performed below with reference to FIG. 5B and a specific scenario.

Figure 5B:
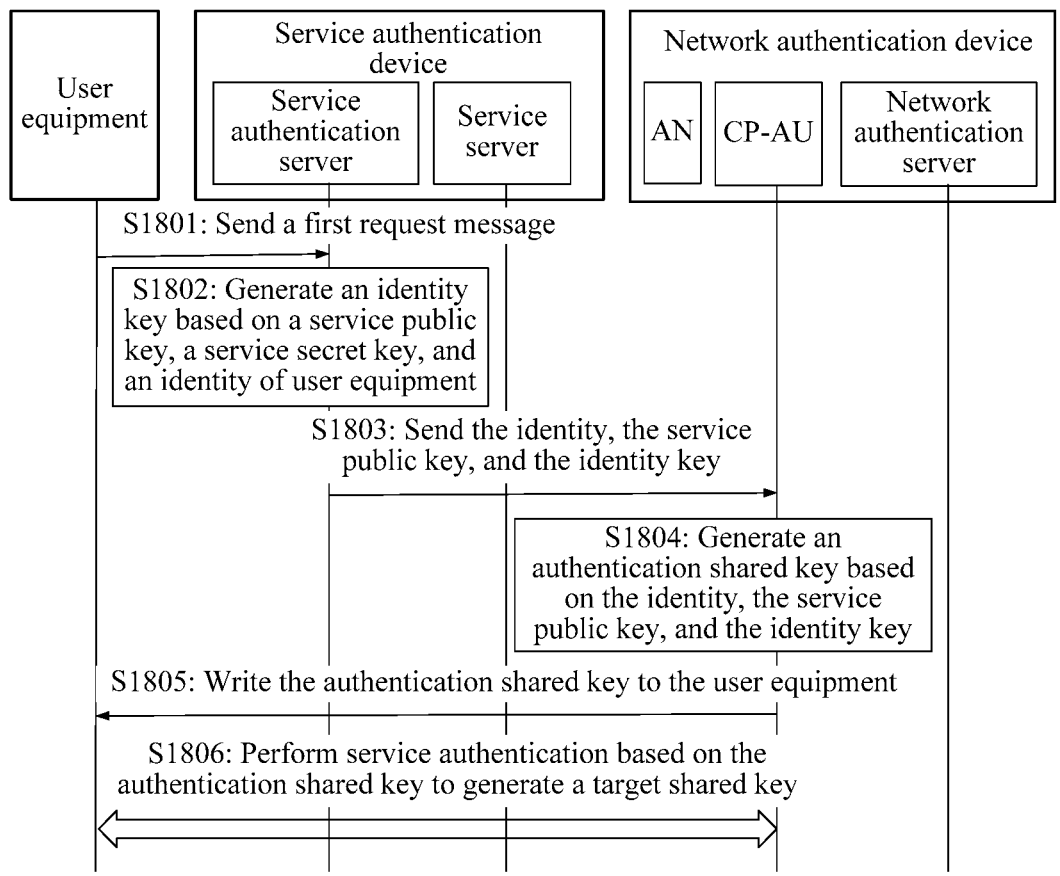
FIG. 5B is a schematic flowchart of another network authentication method according to an embodiment of the present invention.

Referring to FIG. 5B, FIG. 5B is a schematic flowchart of another network authentication method according to an embodiment of the present invention. The service authentication device may include a service authentication server and a service server. The user equipment and the network authentication device pre-share a first shared key, the method may include steps S1801 to S1806, and the steps are described in detail as follows:

Step S1801: The user equipment sends a first request message to the service authentication server, where the first request message includes an identity of the user equipment. The identity of the user equipment is described in the foregoing embodiment, and details are not described herein again. A service public key may be understood as an IBS-based global public key, and a service secret key may be understood as an IBS-based global secret key.

Step S1802: The service authentication server receives the first request message, and generates an identity key based on a service secret key (English: Secret Key, SK for short) and a service public key (English: public key, PK for short) of the service authentication server and the identity of the user equipment.

Step S1803: The service authentication server sends the identity key, the service public key, and the identity of the user equipment to the CP-AU.

Step S1804: The CP-AU receives the identity key, the service public key, and the identity of the user equipment, and generates an authentication root key with reference to the identity key, the service public key, and the identity of the user equipment.

Step S1805: The CP-AU writes the authentication root key to the user equipment. In some embodiments, the identity key and the service public key may be written to the user equipment, and if the identity key and the service public key are written, the user equipment and the network authentication device may subsequently perform mutual authentication based on an IBS and based on the identity key and the service public key.

Step S1806: The CP-AU and the user equipment perform network authentication based on the authentication root key to generate a target shared key.

In some embodiments, the CP-AU sends the generated target shared key to the service authentication server, so that the service authentication server and the user equipment use the target shared key, or a shared key derived from the target shared key as a shared key that protects secure data transmission and that is negotiated and agreed on by the service authentication server and the user equipment.

In some embodiments, the CP-AU may obtain an authentication vector from a network authentication server to perform network authentication with the user equipment.

In the method shown in FIG. 5B, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 6A:
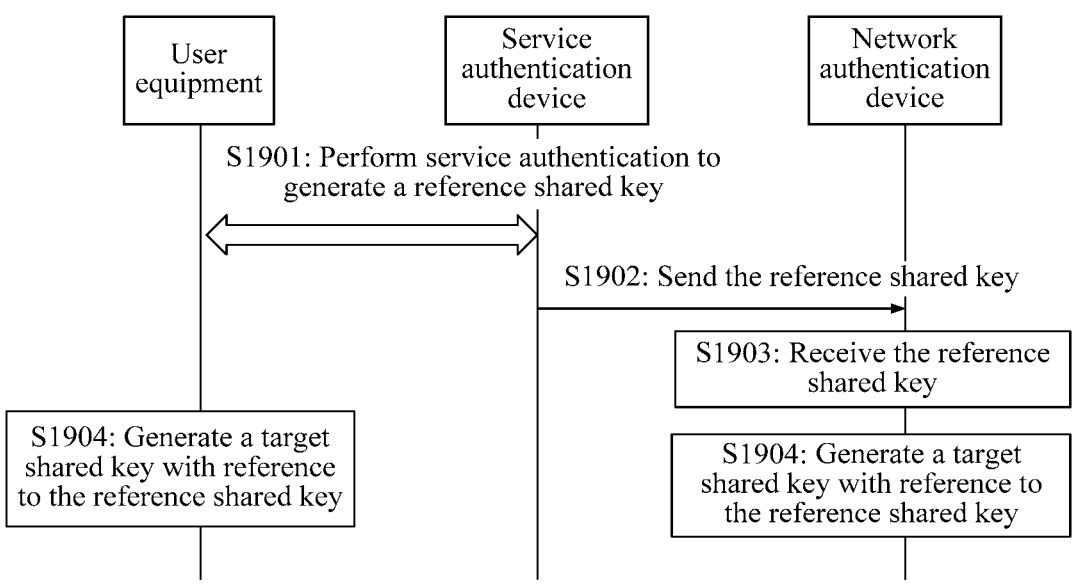
FIG. 6A is a schematic flowchart of another network authentication method according to an embodiment of the present invention.

Referring to FIG. 6A, FIG. 6A is a schematic flowchart of another network authentication method according to an embodiment of the present invention. The method may be implemented based on the network authentication system shown in FIG. 1, and the method includes but is not limited to the following steps.

Step S1901: The service authentication device and the user equipment perform service authentication to generate a reference shared key. In some embodiments, the user equipment establishes a communication connection to the service authentication device by using a network other than a cellular network, and the user equipment and the service authentication device may perform service authentication based on a certificate, a user name and a password, an identity-based password mechanism, and a preset shared key. The authentication shared key may be specifically generated based on information such as an identity UEID of the user equipment, and a service parameter of a target service managed by the service authentication device. Using the UEID as an example, the user equipment may send a request message to the service authentication device, where the request message carries the UEID.

Step S1902: The service authentication device sends the reference shared key to the network authentication device, where information sent by the service authentication device may further include related information about the user equipment, for example, the UEID, an IP address, and a MAC address. In this way, the service authentication device may learn user equipment with which the service authentication device subsequently needs to generate a target shared key based on the reference shared key.

Step S1903: The network authentication device receives the reference shared key.

Step S1904: The network authentication device and the user equipment generate a target shared key with reference to the reference shared key, where the target shared key or a shared key derived from the target shared key is a shared key that protects secure data transmission and that is negotiated and agreed on by the network authentication device and the user equipment. Information to which the user equipment and the network authentication device need to refer for generating the target shared key includes at least the reference shared key.

In an optional solution, the method may further include: sending, by the network authentication device, a network parameter of a cellular network in which the network authentication device is located to the user equipment; and the generating, by the network authentication device and the user equipment, the target shared key with reference to the reference shared key is specifically: generating, by both the network authentication device and the user equipment, the authentication shared key based on the network parameter and the reference shared key; and performing, by the network authentication device and the user equipment, network authentication based on the authentication shared key to generate the target shared key. For convenience of understanding, description is performed below with reference to FIG. 6B and a specific scenario.

Figure 6B:
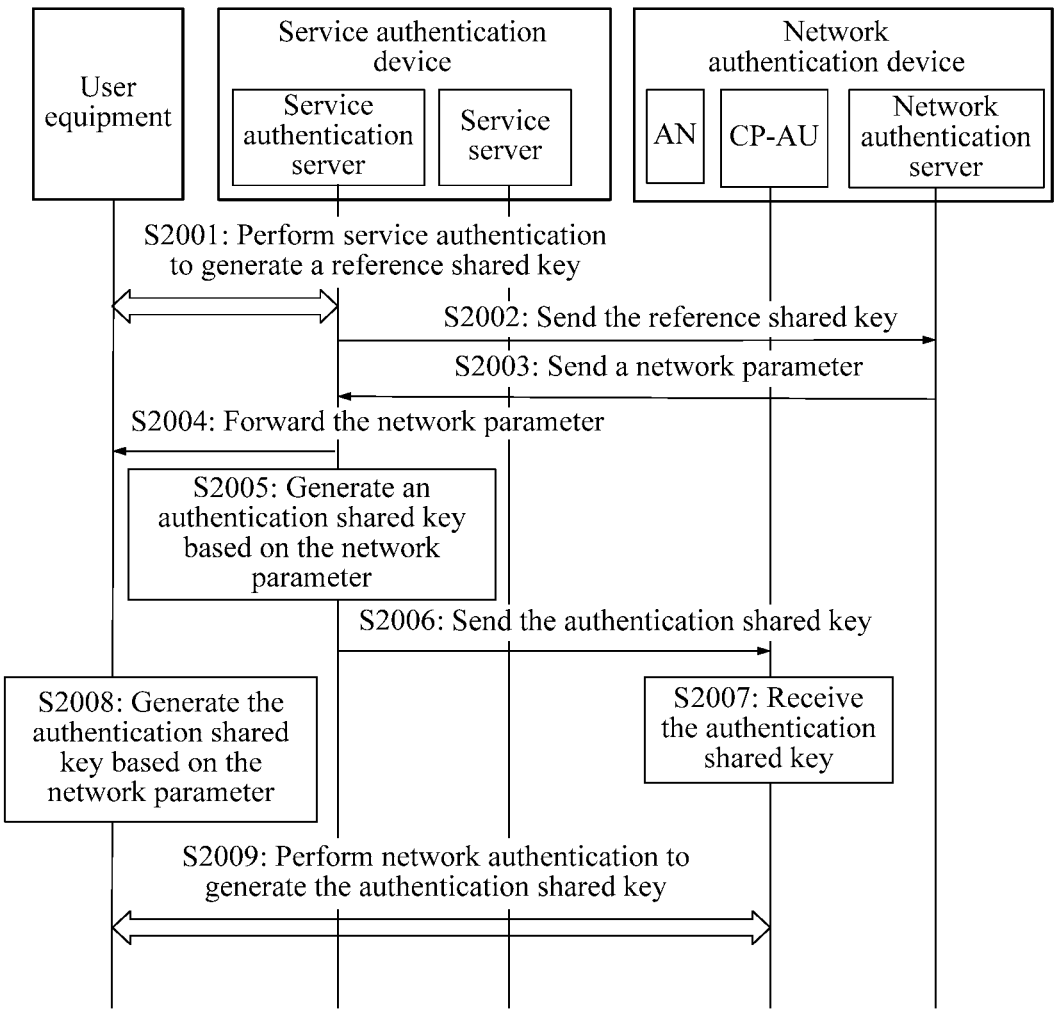
FIG. 6B is a schematic flowchart of another network authentication method according to an embodiment of the present invention.

Referring to FIG. 6B, FIG. 6B is a schematic flowchart of another network authentication method according to an embodiment of the present invention. The service authentication device may include a service authentication server and a service server. The method may include steps S2001 to S2009, and the steps are described in detail as follows:

Step S2001: The user equipment and the service authentication server perform service authentication to generate a reference shared key, or the service authentication device and the user equipment directly pre-configure a reference shared key, where the reference shared key is a root key pre-shared between the user equipment and the service authentication device.

Step S2002: The service authentication server sends the reference shared key to the network authentication server.

Step S2003: The network authentication server receives the reference shared key and sends a network parameter to the service authentication server.

Step S2004: The service authentication server receives the network parameter and forwards the network parameter to the user equipment. In some embodiments, the network authentication server may further directly send the network parameter to the user equipment.

Step S2005: The network authentication server generates an authentication shared key based on the reference shared key and the network parameter.

Step S2006: The network authentication server sends the authentication shared key to the CP-AU.

Step S2007: The CP-AU receives the authentication shared key.

Step S2008: The user equipment generates the authentication shared key based on the reference shared key and the network parameter.

Step S2009: The CP-AU and the user equipment are configured to perform network authentication based on the authentication shared key to generate a target shared key.

In some embodiments, a fifth shared key may further be pre-shared between the network authentication device and the user equipment. In this way, the network authentication device and the user equipment may perform mutual authentication based on the fifth shared key and the reference shared key to generate a target root key.

In another optional solution, the method may further include: sending, by the network authentication device, the target shared key to the service authentication device; receiving, by the service authentication device, the target shared key; and using, by the service authentication device and the user equipment, the target shared key or a shared key derived from the target shared key as a shared key that protects secure data transmission and that is negotiated and agreed on by the service authentication device and the user equipment. That is, after the network authentication device and the user equipment perform network authentication, the network authentication device sends a result of the network authentication to the service authentication device, and the service authentication device may directly use the result of the network authentication, and does not need to perform service authentication again with the user equipment to generate a shared key for encrypting and transmitting data.

In the method shown in FIG. 6B, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 6C:
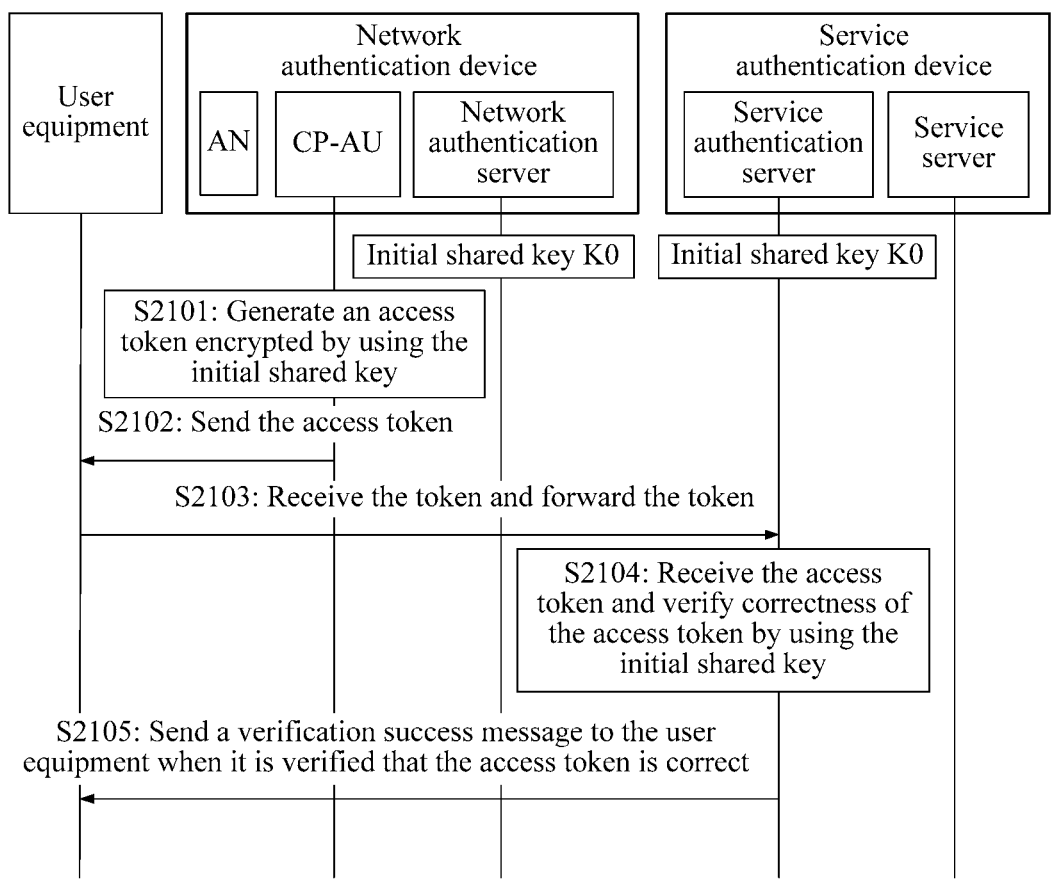
FIG. 6C is a schematic flowchart of another network authentication method according to an embodiment of the present invention.

Referring to FIG. 6C, FIG. 6C is a schematic flowchart of a network authentication method according to an embodiment of the present invention. The method may be implemented based on the network authentication system shown in FIG. 1, and the method includes but is not limited to the following steps.

Step S2101: A network authentication device generates an access token encrypted by using an initial shared key, where the initial shared key is a key pre-shared by the network authentication device and a service authentication device.

Step S2102: The network authentication device sends the access token to the user equipment.

Step S2103: The user equipment receives the access token and sends the access token to the service authentication device.

Step S2104: The service authentication device receives the access token and verifies correctness of the access token by using the initial shared key.

Step S2105: The service authentication device sends a verification success message to the user equipment when the service authentication device verifies that the access token is correct, so as to notify the user equipment that service authentication is successfully completed between the service authentication device and the user equipment.

In an optional solution, the access token includes a target shared key, and the user equipment and the service authentication device are configured to: when service authentication is successfully completed between the user equipment and the service authentication device, use the target shared key in the access token or a shared key derived from the target shared key as a shared key that protects secure data transmission and that is negotiated and agreed on by the service authentication device and the user equipment. In some embodiments, the target shared key is a shared key obtained by performing network authentication by the network authentication device and the user equipment.

In another optional solution, the access token includes at least one of a network parameter, a service parameter, an identity of the user equipment, and a fresh parameter nonce. In some embodiments, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

Further, the access token may further include a message authentication code that is directed to at least one of the network parameter, the service parameter, the identity of the user equipment, and the fresh parameter nonce and that is generated by using the initial shared key. When the access token includes the message authentication code, in step S2104, correctness of the message authentication code further needs to be verified based on the initial shared key, and in step S2105, that the service authentication device sends a verification success message to the user equipment when the service authentication device verifies that the access token is correct is specifically: The service authentication device sends a verification success message to the user equipment when the service authentication device verifies that the access token is correct and verifies that the message authentication code is correct.

For convenience of understanding, description is performed separately below with reference to specific scenarios of FIG. 6D and FIG. 6E.

Figure 6D:
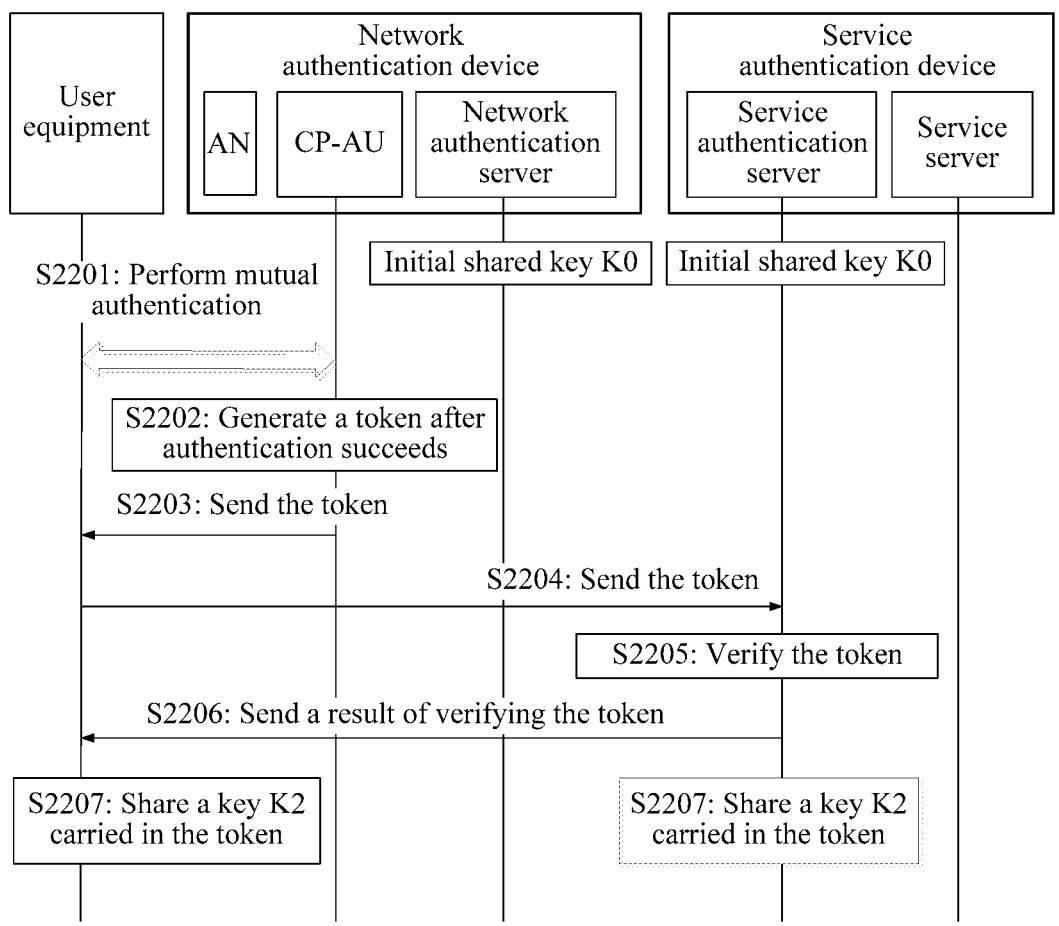
FIG. 6D is a schematic flowchart of another network authentication method according to an embodiment of the present invention.

Referring to FIG. 6D, FIG. 6D is a schematic flowchart of another network authentication method according to an embodiment of the present invention. The service authentication device may include a service authentication server and a service server. The method may include steps S2201 to S2207, and the steps are described in detail as follows:

Step S2201: User equipment UE and a network authentication device perform network authentication, where a shared key generated based on network authentication is a network shared key K1; and the UE may send related information about the service authentication device to the network authentication device before, after, or during network authentication, so as to indicate that the UE needs to perform authentication with the service authentication device.

Step S2202: The network authentication device determines, based on the related information about the service authentication device, an initial shared key K0 pre-shared by the network authentication device and the service authentication device; and generates an access token based on at least one of a network parameter, a service parameter, an identity of the user equipment, and a fresh parameter nonce. In some embodiments, token=Enc_K0_(K2, basic information, MAC), that is, the access token is generated by encrypting K2, the basic information, and MAC by using the initial shared key K0, where K2 is determined by the network authentication device and may be used as a shared key for protecting data transmission between the user equipment and the service authentication device, the basic information includes at least one of the network parameter, the service parameter, the identity of the user equipment, and the fresh parameter nonce, and MAC=MAC_K0_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated by using the initial shared key K0.

It should be noted that, if the fresh parameter nonce is used in the foregoing derivation formula, the network authentication device further needs to send the used fresh parameter to the UE, the UE sends the used fresh parameter to the service authentication device, and subsequently the service authentication device may verify freshness of the token by using the fresh parameter.

Further, a shared key K2 may be a configured random parameter, may be the network shared key K1, or may be a shared key derived from the network shared key K1. For example, K2=KDF(K1, basic information), that is, the shared key K2 is calculated based on the network shared key K1 and the basic information by using a preset algorithm.

Further, the related information about the service authentication device is information that can be used to distinguish between the service authentication device and another device within a specific range, for example, may be an IP address of the service authentication device or a service ID.

Step S2203: The network authentication device sends K2 and the token to the UE, and may further send related information about the network authentication device, where the related information about the network authentication device may include the network parameter.

Step S2204: The UE receives K2 and the token and sends the token and the related information about the network authentication device to the service authentication device. The UE may generate the related information about the network authentication device, or may receive, when, before, or after the UE and the network authentication device perform network authentication, the related information about the network authentication device sent by the network authentication device. Preferably, the UE receives, in step S2203, the related information about the network authentication device sent by the network authentication device.

Step S2205: The service authentication device receives the token and the related information about the network authentication device, determines, based on the related information about the network authentication device, the initial shared key K0 pre-shared by the service authentication device and the network authentication device, and decrypts the token by using K0 to obtain the shared key K2, the basic information, and the message authentication code MAC; and then verifies correctness of MAC based on K0, where after MAC is verified successfully, it indicates that the service authentication device verifies the token successfully. Therefore, the service authentication device uses K2 as a shared key used to protect data transmission between the service authentication device and the UE.

Step S2206: The service authentication device sends a message to the UE to notify the UE that the token is verified successfully, and correspondingly, the UE receives the message.

Step S2207: The service authentication device and the UE use the shared key K2 as a shared key used to protect secure data transmission between the UE and the service authentication device.

In some embodiments, the UE and the service authentication device further derive a shared key K3 based on K2. For example, K3=KDF(K2, basic information), that is, K3 is calculated based on K2 and the basic information by using a preset algorithm, and K3 is used to protect secure data transmission between the UE and the service authentication device.

In some embodiments, when the shared key K2 is the network shared key K1, both the UE and the service authentication device may derive the shared key K3 based on K1.

In some embodiments, a shared key for encrypting the token is K1 other than K0, and after receiving the token, the service authentication device forwards the token and related information about the UE to the network authentication device based on the related information about the network authentication device; and the network authentication device determines, based on the related information about the UE, the shared key K1 generated based on authentication with the UE, then decrypts the token based on K1, and verifies correctness of MAC in the token. If MAC is verified successfully, it indicates that authentication between the UE and the service authentication device succeeds. Therefore, K2 is sent to the service authentication device, so that the UE and the service authentication device use K2 as a shared key that protects secure data transmission. In some embodiments, the related information about the UE may be sent by the UE to the service authentication device, and then sent by the service authentication device to the network authentication device, and the related information about the UE may be the identity of the UE.

Figure 6E:
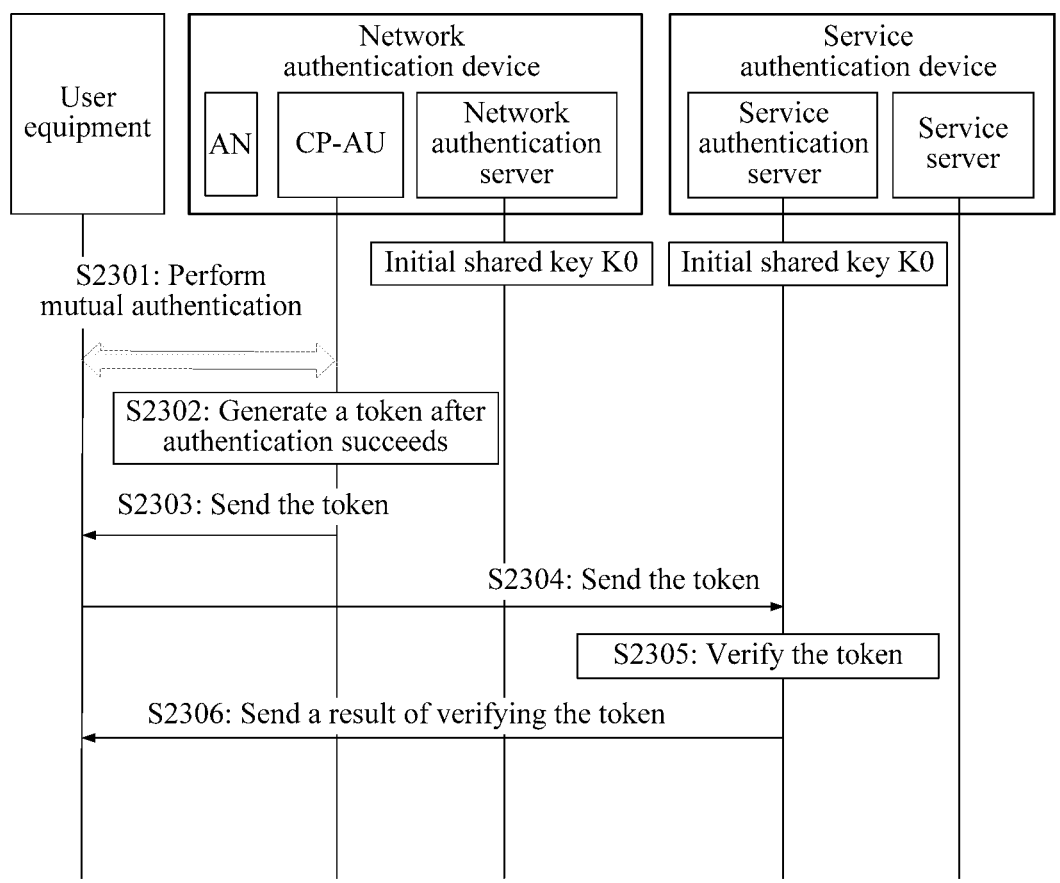
FIG. 6E is a schematic flowchart of another network authentication method according to an embodiment of the present invention.

Referring to FIG. 6E, FIG. 6E is a schematic flowchart of another network authentication method according to an embodiment of the present invention. The service authentication device may include a service authentication server and a service server. The method may include steps S2301 to S2305, and the steps are described in detail as follows:

Step S2301: User equipment UE and a network authentication device perform network authentication, where a shared key generated based on network authentication is a network shared key K1; and the UE may send related information about the service authentication device to the network authentication device before, after, or during network authentication, so as to indicate that the UE needs to perform authentication with the service authentication device.

Step S2302: The network authentication device determines, based on the related information about the service authentication device, an initial shared key K0 pre-shared by the network authentication device and the service authentication device; and generates an access token based on at least one of a network parameter, a service parameter, an identity of the user equipment, and a fresh parameter nonce, and encrypts the access token by using the initial shared key K0. In some embodiments, the token may be a message authentication code, and the message authentication code MAC=MAC_K_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the basic information includes at least one of the network parameter, the service parameter, the identity of the user equipment, and the fresh parameter nonce; and the message authentication code MAC is further encrypted by using the initial shared key K0.

It should be noted that, if the fresh parameter nonce is used in the foregoing derivation formula, the network authentication device further needs to send the used fresh parameter to the UE, the UE sends the used fresh parameter to the service authentication device, and subsequently the service authentication device may verify freshness of the token by using the fresh parameter.

Step S2303: The network authentication device sends the token to the UE, and may further send related information about the network authentication device, where the related information about the network authentication device may include the network parameter.

Step S2304: The UE receives the token and sends the token and the related information about the network authentication device to the service authentication device.

Step S2305: The service authentication device receives the token and the related information about the network authentication device, determines, based on the related information about the network authentication device, the initial shared key K0 pre-shared by the service authentication device and the network authentication device, and then verifies correctness of MAC based on K0, where after MAC is verified successfully, it indicates that the service authentication device verifies the token successfully. So far, authentication is successfully completed between the UE and the service authentication device.

In some embodiments, a shared key for generating the token is K1 other than K0, and after receiving the token, the service authentication device forwards the token and related information about the UE to the network authentication device based on the related information about the network authentication device; and the network authentication device determines, based on the related information about the UE, the shared key K1 generated based on authentication with the UE, and then verifies correctness of MAC in the token. If MAC is verified successfully, it indicates that authentication between the UE and the service authentication device succeeds. Therefore, a notification message is sent to the UE and the service authentication device to notify the UE and the service authentication device that authentication between the UE and the service authentication device succeeds.

Figure 6F:
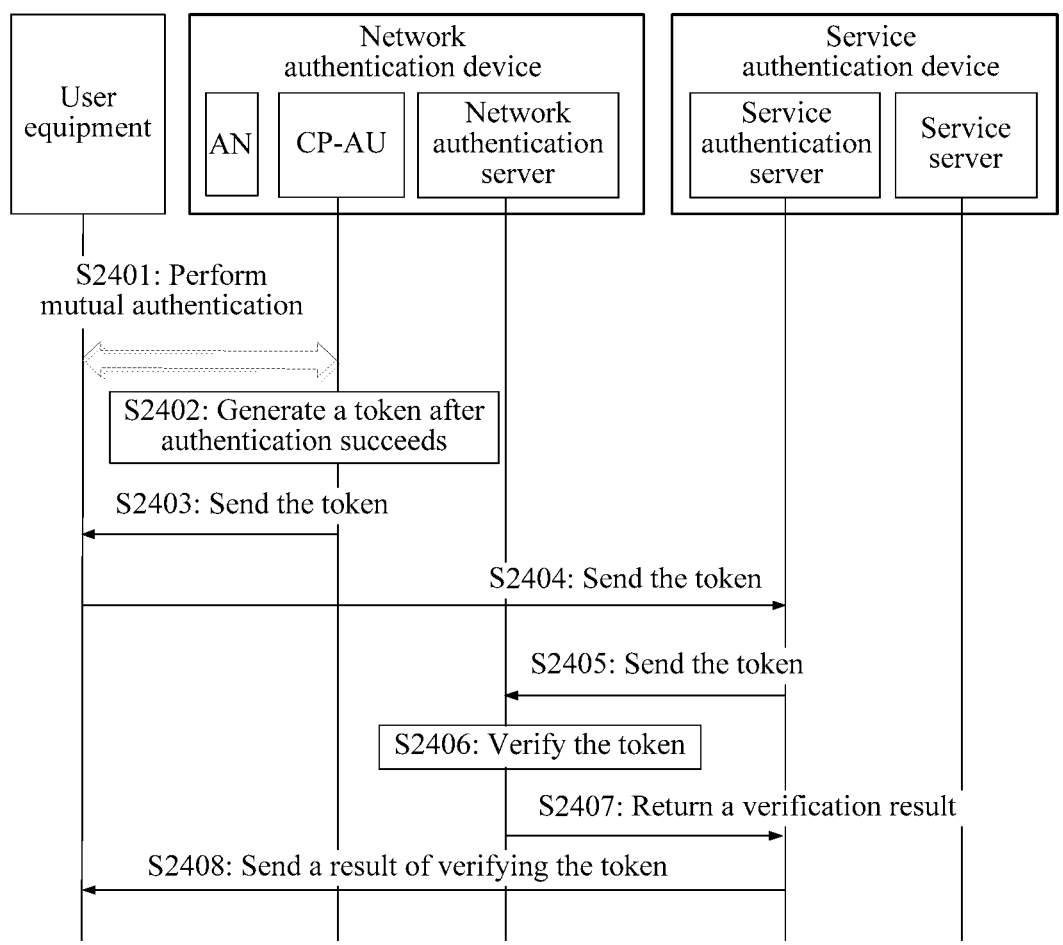
FIG. 6F is a schematic flowchart of another network authentication method according to an embodiment of the present invention.

Referring to FIG. 6F, FIG. 6F is a schematic flowchart of another network authentication method according to an embodiment of the present invention. The service authentication device may include a service authentication server and a service server. The method may include steps S2401 to S2408, and the steps are described in detail as follows:

Step S2401: User equipment UE and a network authentication device perform network authentication.

Step S2402: The network authentication device generates an authentication token and expiration information of the token after network authentication succeeds, where the expiration information is used to indicate when the token expires; and may further generate range information, where the range information is used to indicate which service authentication device may use the token; or the range information is used to indicate which user equipment may use the token.

Step S2403: The network authentication device sends the token to the UE; and may further send related information about the network authentication device, where the related information about the network authentication device is used to indicate that the token is from the network authentication device.

Step S2404: The user equipment sends the token to the service authentication device and the related information about the network authentication device.

Step S2405: The service authentication device receives the token and the related information about the network authentication device, and sends the token to the network authentication device based on the related information about the network authentication device, where a sent message may further include at least one of a UE ID and related information about the service authentication device.

Step S2406: The network authentication device receives the token, determines whether the token is a token generated by the network authentication device, and if the token is a token generated by the network authentication device, further determines whether the token expires based on the expiration information where if the token does not expire, it indicates that the token is verified successfully. In some embodiments, when the network authentication device generates range information, the network authentication device further needs to determine, based on the range information, whether the service authentication device sending the token is a service authentication device allowed in the range information, where if the service authentication device sending the token is an allowed service authentication device and the token does not expire, it indicates that the token is verified successfully. In some embodiments, when the range information is used to indicate which user equipment may use the token, the network authentication device further needs to determine, based on the range information, whether the user equipment is user equipment allowed in the range information, where if the user equipment is allowed user equipment, the service authentication device is an allowed service authentication device, and the token does not expire, it indicates that the token is verified successfully.

In some embodiments, the related information about the service authentication device is not included in step S2405, and the network authentication device may determine the related information about the service authentication device based on a source from which the token is received.

In some embodiments, the user equipment may send, to the service authentication device, related information about the user equipment used when whether the user equipment is user equipment allowed in the range information is determined, and then the service authentication device sends the related information about the user equipment and the token together to the network authentication device in step S2405.

Step S2407: If the token is verified successfully, the network authentication device sends a message to the service authentication device to notify the service authentication device that the token is verified successfully.

Step S2408: The service authentication device sends a message to the UE to notify the UE that the token is verified successfully. Both the service authentication device and the UE learn that the token is verified successfully, it indicates that authentication between the service authentication device and the UE succeeds.

Figure 6G:
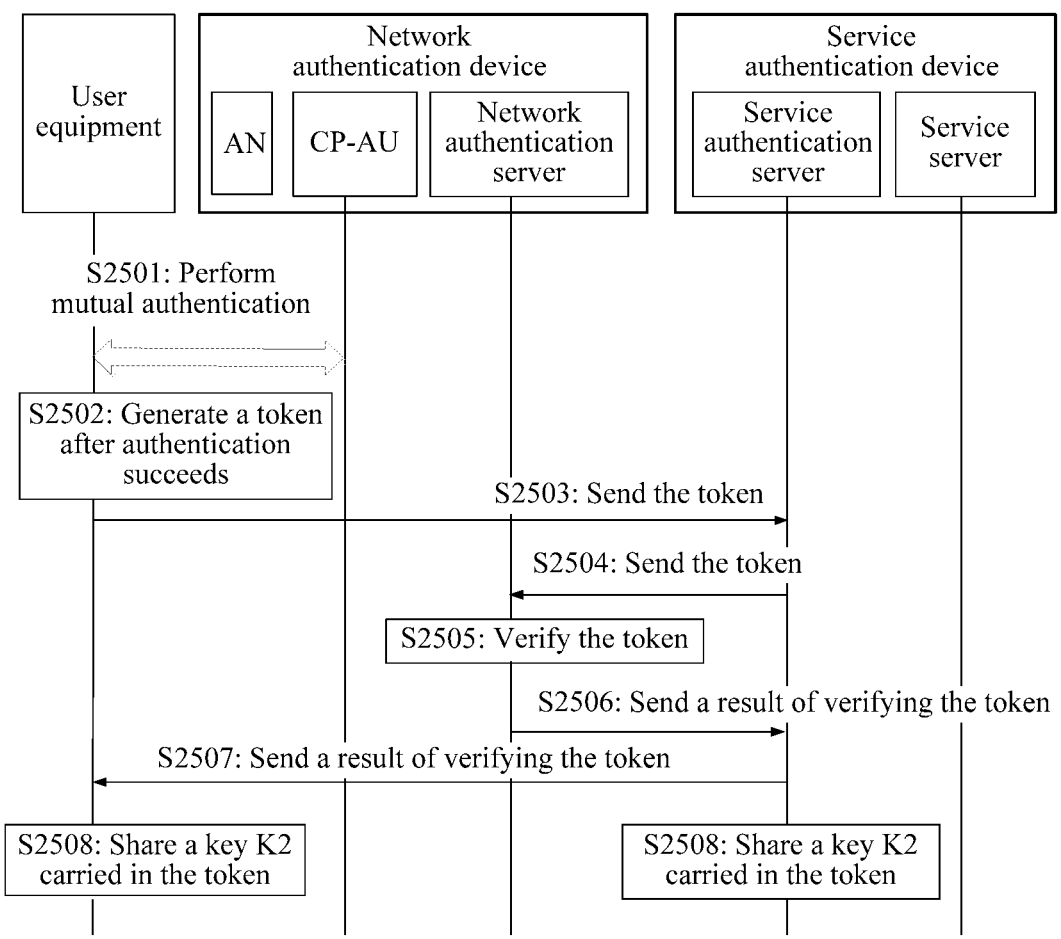
FIG. 6G is a schematic flowchart of another network authentication method according to an embodiment of the present invention.

Referring to FIG. 6G, FIG. 6G is a schematic flowchart of another network authentication method according to an embodiment of the present invention. The service authentication device may include a service authentication server and a service server. The method may include steps S2501 to S2508, and the steps are described in detail as follows:

Step S2501: User equipment UE and a network authentication device perform network authentication, where a shared key generated based on network authentication is a network shared key K1.

Step S2502: The UE generates an access token based on at least one of a network parameter, a service parameter, an identity of the user equipment, and a fresh parameter nonce, and encrypts the access token by using the network shared key K1. In some embodiments, token=Enc_K1_(K2, basic information, MAC), that is, the access token is generated by encrypting K2, the basic information, and MAC by using K1, where K2 is determined by the UE and may be subsequently used as a shared key for protecting data transmission between the user equipment and the service authentication device. The basic information includes at least one of the network parameter, the service parameter, the identity of the user equipment, and the fresh parameter nonce. In some embodiments, the user equipment may pre-obtain, from the network authentication device and the service authentication device, information that needs to be used; and MAC=MAC_K1_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated based on the network shared key K1.

It should be noted that, if the fresh parameter nonce is used in the foregoing derivation formula, the UE further needs to send the used fresh parameter to the service authentication device, the service authentication device forwards the fresh parameter to the network authentication device, and subsequently the network authentication device may verify freshness of the token by using the fresh parameter.

Further, a shared key K2 may be a configured random parameter, may be the network shared key K1, or may be a shared key derived from the network shared key K1. For example, K2=KDF(K1, basic information), that is, the shared key K2 is calculated based on the network shared key K1 and the basic information by using a preset algorithm.

Step S2503: The UE sends the token to the service authentication device.

Step S2504: The service authentication device receives the token sent by the UE and forwards the token the network authentication device, and the service authentication device may further send related information (which includes but is not limited to the UE ID) about the UE to the network authentication device, where the related information may be sent by the UE to the service authentication device, and the related information may be used to distinguish between the UE and another device within a range.

Step S2505: The network authentication device receives the token and the related information about the UE; finds, based on the related information about the UE, the network shared key K1 generated by performing network authentication with the UE, and decrypts the token by using K1 to obtain the shared key K2, the basic information, and the message authentication code MAC; and then verifies correctness of MAC based on K1, where if MAC is verified correctly, it indicates that the token is verified successfully.

Step S2506: If the token is verified successfully, the network authentication device sends a message to the service authentication device to notify the service authentication device that the token is verified successfully, where the notification message further includes the shared key K2 obtained from the token.

Step S2507: The service authentication device sends a message to the UE to notify the UE that the token is verified successfully. Both the service authentication device and the UE learn that the token is verified successfully, it indicates that authentication between the service authentication device and the UE succeeds.

Step S2508: The UE and the service authentication device use K2 as a shared key used to protect secure data transmission between the UE and the service authentication device.

In some embodiments, the UE and the service authentication device further derive a shared key K3 based on K2. For example, K3=KDF(K2, basic information), that is, K3 is calculated based on K2 and the basic information by using a preset algorithm, and K3 is used to protect secure data transmission between the UE and the service authentication device.

Figure 6H:
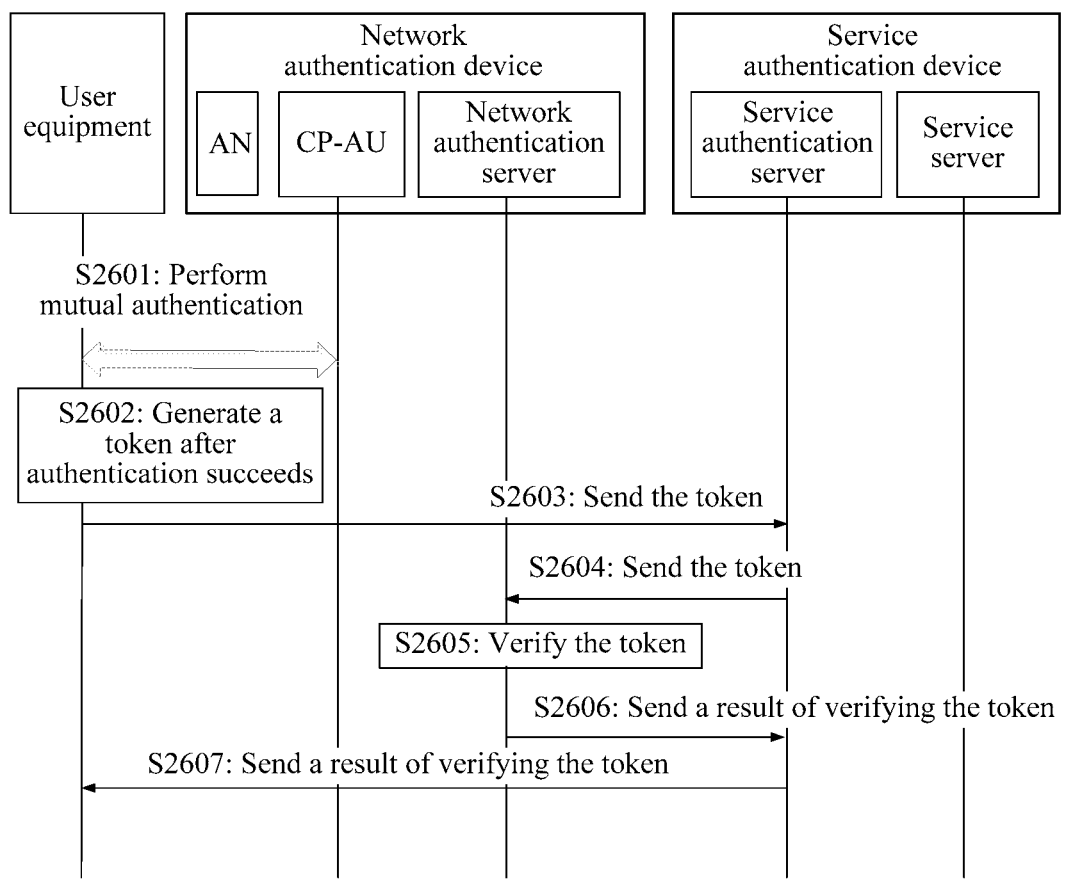
FIG. 6H is a schematic flowchart of another network authentication method according to an embodiment of the present invention.

Referring to FIG. 6H, FIG. 6H is a schematic flowchart of another network authentication method according to an embodiment of the present invention. The service authentication device may include a service authentication server and a service server. The method may include steps S2601 to S2607, and the steps are described in detail as follows:

Step S2601: User equipment UE and a network authentication device perform network authentication, where a shared key generated based on network authentication is a network shared key K1.

Step S2602: The UE generates an access token based on at least one of a network parameter, a service parameter, an identity of the user equipment, and a fresh parameter nonce. In some embodiments, the token is a message authentication code MAC, and MAC=MAC_K1_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated based on the network shared key K1.

It should be noted that, if the fresh parameter nonce is used in the foregoing derivation formula, the UE further needs to send the used fresh parameter to the service authentication device, the service authentication device sends the fresh parameter to the network authentication device, and subsequently the network authentication device may verify freshness of the token by using the fresh parameter.

Step S2603: The UE sends the token to the service authentication device.

Step S2604: The service authentication device receives the token sent by the UE and forwards the token the network authentication device, and the service authentication device may further send related information about the UE to the network authentication device, where the related information may be sent by the UE to the service authentication device, and the related information may be used to distinguish between the UE and another device within a range. For example, the related information about the user equipment may be the identity (UEID) of the user equipment.

Step S2605: The network authentication device receives the token and the related information about the UE; and finds, based on the related information about the UE, the network shared key K1 generated by performing network authentication with the UE, and verifies correctness of MAC based on K1, where if MAC is verified correctly, it indicates that the token is verified successfully.

Step S2606: If the token is verified successfully, the network authentication device sends a message to the service authentication device to notify the service authentication device that the token is verified successfully.

Step S2607: The service authentication device sends a message to the UE to notify the UE that the token is verified successfully. Both the service authentication device and the UE learn that the token is verified successfully, it indicates that authentication between the service authentication device and the UE succeeds.

It should be noted that, the following solution may further be derived readily based on the foregoing solution. That is, UE first establishes bidirectional authentication with a service authentication device, and the UE or the service authentication device generates a token; and after the UE sends the token to a network authentication device, the network authentication device may verify correctness of the token, or may send the token to the service authentication device, and the service authentication device verifies correctness of the token, and sends a verification result to the network authentication device. This is equivalent to that the service authentication device and the network authentication device related to FIG. 6C and FIG. 6H are interchanged. Additionally, the token includes but is not limited to the following two situations. Situation 1: token=Enc_K0_(K2, basic information, MAC_K0_(basic information and/or nonce)), and situation 2: token=MAC_K0_(basic information and/or nonce). For understanding of the two situations, refer to the above description. Details are not described herein again.

For convenience of understanding, an example in which a token is generated by a service authentication device is described below. For a situation in which a token is generated by UE, refer to the descriptions of FIG. 6D to FIG. 6I.

Figure 6I:
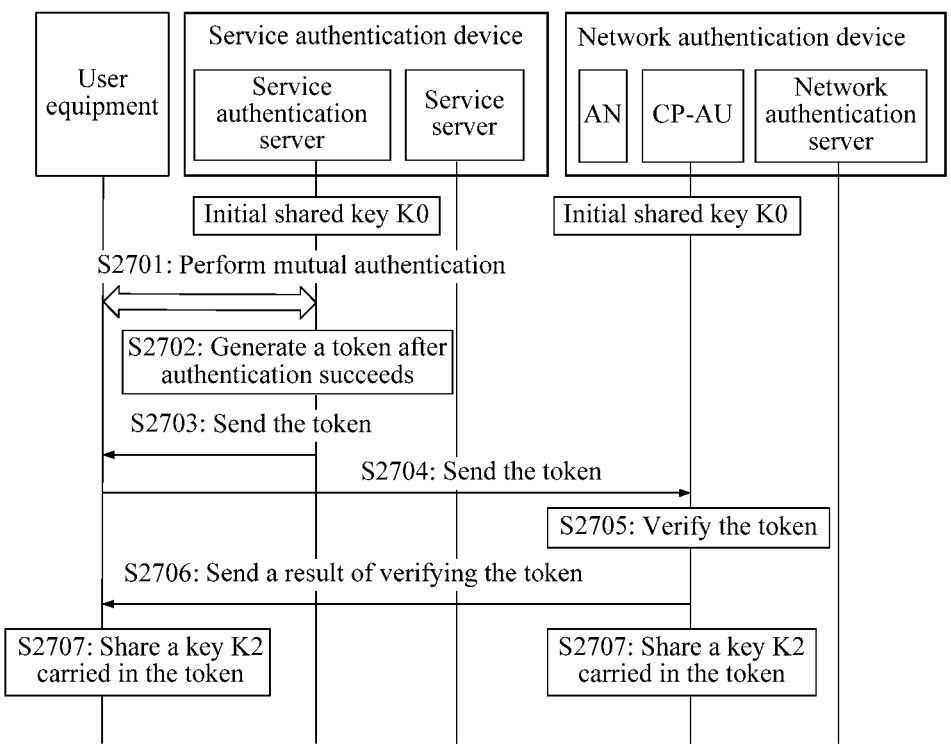
FIG. 6I is a schematic flowchart of another network authentication method according to an embodiment of the present invention.

Referring to FIG. 6I, FIG. 6I is a schematic flowchart of another network authentication method according to an embodiment of the present invention. The service authentication device may include a service authentication server and a service server. The method may include steps S2708 to S2707, and the steps are described in detail as follows:

Step S2701: User equipment UE and the service authentication device perform service authentication, where a generated shared key is a service shared key K1; and the UE may send related information about a network authentication device to the service authentication device before, after, or during service authentication, so as to indicate that the UE needs to perform authentication with the network authentication device.

Step S2702: The service authentication device determines, based on the related information about the network authentication device, an initial shared key K0 pre-shared by the network authentication device and the service authentication device; and generates an access token based on at least one of a network parameter, a service parameter, an identity of the user equipment, and a fresh parameter nonce. In some embodiments, token=Enc_K0_(K2, basic information, MAC), that is, the access token is generated by encrypting K2, the basic information, and MAC by using the initial shared key K0, where K2 is determined by the service authentication device and may be used as a shared key for protecting data transmission between the user equipment and the network authentication device, the basic information includes at least one of the network parameter, the service parameter, the identity of the user equipment, and the fresh parameter nonce, and MAC=MAC_K0_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated by using the initial shared key K0.

It should be noted that, if the fresh parameter nonce is used in the foregoing derivation formula, the service authentication device further needs to send the used fresh parameter to the UE, the UE sends the used fresh parameter to the network authentication device, and subsequently the network authentication device may verify freshness of the token by using the fresh parameter.

Further, a shared key K2 may be a configured random parameter, may be the service shared key K1, or may be a shared key derived from the service shared key K1. For example, K2=KDF(K1, basic information), that is, the shared key K2 is calculated based on the service shared key K1 and the basic information by using a preset algorithm.

Further, the related information about the network authentication device is information that can be used to distinguish between the network authentication device and another device within a range, for example, may be an IP address of the network authentication device.

Step S2703: The service authentication device sends K2 and the token to the UE, and may further send related information about the service authentication device, where the related information about the service authentication device may include the service parameter.

Step S2704: The UE receives K2 and the token and sends the token and the related information about the service authentication device to the network authentication device. The UE may generate the related information about the service authentication device, or may receive, when, before, or after the UE and the service authentication device perform service authentication, the related information about the service authentication device sent by the service authentication device. Preferably, the UE receives, in step S2703, the related information about the service authentication device sent by the service authentication device.

Step S2705: The network authentication device receives the token and the related information about the service authentication device, determines, based on the related information about the service authentication device, the initial shared key K0 pre-shared by the service authentication device and the service authentication device, and decrypts the token by using K0 to obtain the shared key K2, the basic information, and the message authentication code MAC; and then verifies correctness of MAC based on K0, where after MAC is verified successfully, it indicates that the network authentication device verifies the token successfully. Therefore, the network authentication device uses K2 as a shared key used to protect data transmission between the network authentication device and the UE.

Step S2706: The network authentication device sends a message to the UE to notify the UE that the token is verified successfully, and correspondingly, the UE receives the message.

Step S2707: The network authentication device and the UE use the shared key K2 as a shared key used to protect secure data transmission between the UE and the network authentication device.

In some embodiments, the UE and the network authentication device further derive a shared key K3 based on K2. For example, K3=KDF(K2, basic information), that is, K3 is calculated based on K2 and the basic information by using a preset algorithm, and K3 is used to protect secure data transmission between the UE and the network authentication device.

In some embodiments, a shared key for encrypting the token is K1 other than K0, and after receiving the token, the network authentication device forwards the token and related information about the UE to the service authentication device based on the related information about the service authentication device; and the service authentication device determines, based on the related information about the UE, the shared key K1 generated based on authentication with the UE, then decrypts the token based on K1, and verifies correctness of MAC in the token. If MAC is verified successfully, it indicates that authentication between the UE and the network authentication device succeeds. Therefore, K2 is sent to the network authentication device, so that the UE and the network authentication device use K2 as a shared key that protects secure data transmission. In some embodiments, the related information about the UE may be sent by the UE to the service authentication device, and the related information about the UE may be the identity of the UE.

It should be noted that, the embodiments shown in FIG. 6C to FIG. 6I may further be correspondingly developed as follows:

K1 is a shared key between the UE and the network authentication device, including but not limited to at least one Kasme, a cipher key (English: cipher key, CK for short), and an integrity key (English: integrity key, IK for short).

Additionally, a token may also be calculated by using a form of an asymmetric password. For example, token=Enc_PK_service_(K2, (nonce1, basic information), signature=MAC_SK_network_(nonce2, basic information)). PK_service indicates a public key parameter of a service provided by the service authentication device, and SK_network indicates a secret key parameter of an operator network in which the network authentication device is located. In this case, the service authentication device may perform decryption based on a secret key SK_service of the service authentication device to decipher the token; and verify correctness of a signature in the token by using a public key PK_network of the operator network in which the network authentication device is located. In this case, the token is verified more flexibly, and verification may be completed without performing network authentication and interaction with the network authentication device. Additionally, an encryption and signature algorithm herein may be an asymmetric password technology based on public key infrastructure (English: Public key infrastructure, PKI for short) or the like, or may be an identity-based password technology.

It should be noted that, a sequence of steps listed in the foregoing embodiments is not limited herein, and whether some steps are earlier performed or later performed does not essentially affect the implementation on the embodiments. Therefore, based on the sequence of the steps listed above, a solution formed by adjusting the sequence of performing the steps still falls within the protection scope of the present invention.

Methods of the embodiments of the present invention are described in detail above. For convenience of better implementing the foregoing solutions of the embodiments of the present invention, correspondingly, apparatuses of the embodiments of the present invention are provided below.

Figure 7:
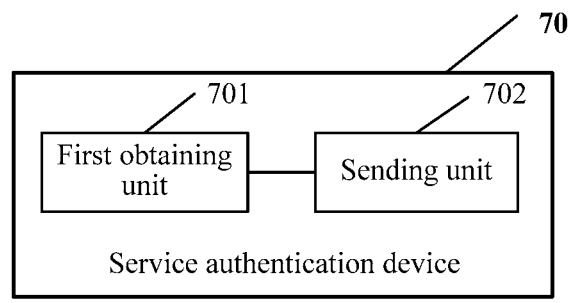
FIG. 7 is a schematic structural diagram of a service authentication device according to an embodiment of the present invention.

Referring to FIG. 7, FIG. 7 is a schematic structural diagram of a service authentication device 70 according to an embodiment of the present invention. The service authentication device 70 may include a first obtaining unit 701 and a sending unit 702, where each unit is described in detail as follows:

The first obtaining unit 701 is configured to obtain reference information and generate a second shared key with reference to the reference information and a first shared key, where the first shared key is a shared key pre-configured between user equipment and the service authentication device, the user equipment is configured to obtain the reference information and generate the second shared key with reference to the reference information and the first shared key, and the reference information includes information pre-associated with at least one of the user equipment, a network authentication device, and the service authentication device.

The sending unit 702 is configured to send the second shared key to the network authentication device, where the second shared key is used by the user equipment and the network authentication device to generate a target shared key, and the target shared key or a shared key derived from the target shared key is a shared key that protects secure data transmission and that is negotiated and agreed on by the network authentication device and the user equipment.

By running the foregoing units, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the first obtaining unit 701 generates the second shared key with reference to the reference information and the first shared key is specifically:

the first obtaining unit and the user equipment perform service authentication with reference to the reference information and the first shared key to generate the second shared key.

In another optional solution, the service authentication device further includes:

a first receiving unit, configured to receive the target shared key sent by the network authentication device; and a generating unit, configured to use the target shared key or the shared key derived from the target shared key as a shared key that protects secure data transmission and that is negotiated and agreed on by the service authentication device and the user equipment.

In another optional solution, the service authentication device further includes:

a generating unit, configured to use the second shared key or a shared key derived from the second shared key as a shared key that protects secure data transmission and that is negotiated and agreed on by the service authentication device and the user equipment.

In another optional solution, the service authentication device further includes:

a second obtaining unit, configured to obtain a fifth shared key pre-configured between the user equipment and the network authentication device; and that the first obtaining unit 701 generates the second shared key with reference to the reference information and the first shared key is specifically:

performing network authentication with reference to the reference information, the first shared key, and the fifth shared key to generate the second shared key.

In another optional solution, the service authentication device further includes:

a second receiving unit, configured to receive network-side information generated by the network authentication device based on a network parameter of a cellular network in which the network authentication device is located, and forward the network-side information to the user equipment, where that the first obtaining unit 701 generates the second shared key with reference to the reference information and the first shared key is specifically:

performing service authentication with reference to the network parameter and the first shared key to generate the second shared key, where the network parameter includes the network-side information.

In another optional solution, the reference information includes at least one of the network parameter of the cellular network in which the network authentication device is located and a service parameter of a target service.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further refer to the corresponding description of the foregoing method embodiment.

In the service authentication device shown in FIG. 7, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 8:
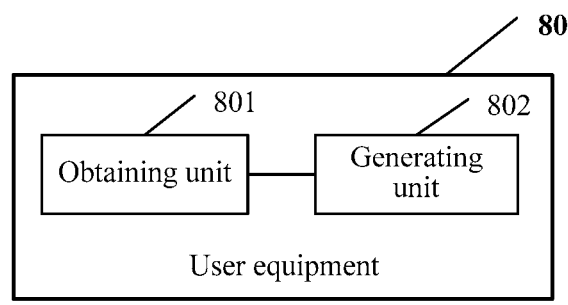
FIG. 8 is a schematic structural diagram of user equipment according to an embodiment of the present invention.

Referring to FIG. 8, FIG. 8 is a schematic structural diagram of user equipment 80 according to an embodiment of the present invention. The user equipment 80 may include an obtaining unit 801 and a generating unit 802, where each unit is described in detail as follows:

The obtaining unit 801 is configured to obtain reference information and generate a second shared key with reference to the reference information and a first shared key, where the first shared key is a shared key pre-configured between the user equipment and a service authentication device, the service authentication device is configured to obtain the reference information and generate the second shared key with reference to the reference information and the first shared key, and the service authentication device is further configured to send the second shared key to a network authentication device.

The generating unit 802 is configured to generate a target shared key based on the second shared key, where the target shared key or a shared key derived from the target shared key is a shared key that protects secure data transmission and that is negotiated and agreed on by the network authentication device and the user equipment.

By running the foregoing units, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the obtaining unit generates the target shared key based on the second shared key is specifically:

using the second shared key or a shared key derived from the second shared key as the target shared key.

In another optional solution, that the obtaining unit generates the target shared key based on the second shared key is specifically:

the obtaining unit and the network authentication device perform network authentication based on the second shared key or based on a shared key derived from the second shared key to generate the target shared key.

In another optional solution, the user equipment further includes:

an authentication unit, configured to perform network authentication with the network authentication device to generate a third shared key, where that the obtaining unit and the network authentication device perform network authentication based on the second shared key or based on the shared key derived from the second shared key to generate the target shared key is specifically:

the obtaining unit and the network authentication device perform network authentication based on the second shared key to generate a fourth shared key; and generate the target shared key based on the third shared key and the fourth shared key.

In another optional solution, that the generating unit 802 generates the target shared key based on the second shared key is specifically:

the generating unit and the network authentication device perform network authentication to generate a third shared key; and generate the target shared key based on the second shared key and the third shared key; or respectively use the second shared key and the third shared key as target shared keys to protect different types of data.

In another optional solution, that the generating unit 802 generates the target shared key based on the second shared key is specifically:

generating the target shared key based on the second shared key and a fifth shared key; or respectively using the second shared key and a shared key derived from the fifth shared key as target shared keys for protecting different types of data, where the fifth shared key is a shared key pre-configured between the user equipment and the network authentication device.

In another optional solution, that the obtaining unit generates the second shared key with reference to the reference information and the first shared key is specifically:

performing service authentication with the service authentication device with reference to the reference information, the first shared key, and a fifth shared key to generate the second shared key, where the fifth shared key is a shared key pre-configured between the user equipment and the network authentication device, and the service authentication device is configured to obtain the fifth shared key.

In another optional solution, that the obtaining unit generates the second shared key with reference to the reference information and the first shared key is specifically:

the obtaining unit and the service authentication device perform service authentication with reference to the reference information and the first shared key to generate the second shared key.

In another optional solution, the user equipment further includes:

a first receiving unit, configured to receive network-side information from the network authentication device forwarded by the service authentication device, where the network-side information is generated by the network authentication device based on the fifth shared key and the obtained first shared key, and the fifth shared key is a shared key pre-configured between the user equipment and the network authentication device; and that the obtaining unit generates the second shared key with reference to the reference information and the first shared key is specifically:

performing service authentication with the service authentication device with reference to a network parameter and the first shared key to generate the second shared key, where the network parameter includes the network-side information.

In another optional solution, the reference information includes at least one of a network parameter of a cellular network in which the network authentication device is located and a service parameter of a target service.

In another optional solution, when the reference information includes the service parameter, the user equipment further includes:

a second receiving unit, configured to receive the service parameter from the service authentication device forwarded by the network authentication device.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further correspondingly refer to the corresponding description of the method embodiment.

In the user equipment shown in FIG. 8, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 9:
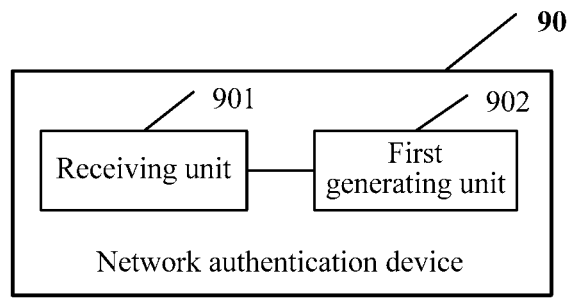
FIG. 9 is a schematic structural diagram of a network authentication device according to an embodiment of the present invention.

Referring to FIG. 9, FIG. 9 is a schematic structural diagram of a network authentication device 90 according to an embodiment of the present invention. The network authentication device 90 may include a receiving unit 901 and a first generating unit 902, where each unit is described in detail as follows:

The receiving unit 901 is configured to receive a second shared key sent by a service authentication device, where both the service authentication device and user equipment are configured to generate the second shared key with reference to a first shared key and reference information, the first shared key is a shared key pre-configured between the user equipment and the service authentication device, and the reference information includes information pre-associated with at least one of the user equipment, the network authentication device, and the service authentication device.

The first generating unit 902 is configured to generate a target shared key based on the second shared key, where the target shared key or a shared key derived from the target shared key is a shared key that protects secure data transmission and that is negotiated and agreed on by the network authentication device and the user equipment.

By running the foregoing units, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the first generating unit 902 generates the target shared key based on the second shared key is specifically:

the first generating unit and the user equipment perform network authentication based on the second shared key or based on a shared key derived from the second shared key to generate the target shared key.

In another optional implementation solution, the network authentication device further includes:

an authentication unit, configured to perform network authentication with the user equipment to generate a third shared key, where that the authentication unit and the user equipment perform network authentication based on the second shared key or based on the shared key derived from the second shared key to generate the target shared key is specifically:

the authentication unit and the user equipment perform network authentication based on the second shared key to generate a fourth shared key; and both the authentication unit and the user equipment generate the target shared key based on the third shared key and the fourth shared key.

In another optional solution, that the first generating unit 902 generates the target shared key based on the second shared key is specifically:

the first generating unit and the user equipment use the second shared key or a shared key derived from the second shared key as the target shared key.

In another optional solution, that the first generating unit 902 generates the target shared key based on the second shared key is specifically:

the first generating unit and the user equipment perform network authentication to generate a third shared key; and the first generating unit and the user equipment generate the target shared key based on the second shared key and the third shared key; or respectively use the second shared key and the third shared key as target shared keys to protect different types of data.

In another optional solution, that the first generating unit 902 generates the target shared key based on the second shared key is specifically:

the first generating unit and the user equipment generate the target shared key based on the second shared key and a fifth shared key; or respectively use the second shared key and a key derived from the fifth shared key as target shared keys for protecting different types of data, where the fifth shared key is a shared key pre-configured between the user equipment and the network authentication device.

In another optional solution, the network authentication device further includes:

an obtaining unit, configured to obtain the first shared key from the service authentication device; and a second generating unit, configured to generate network-side information based on the first shared key and the fifth shared key, where the fifth shared key is a shared key pre-configured between the user equipment and the network authentication device, where the network authentication device sends the network-side information to the service authentication device, so that the service authentication device forwards the network-side information to the user equipment, and a network parameter belongs to the reference information.

In another optional solution, the network authentication device further includes:

a sending unit, configured to send the target shared key to the service authentication device, where the target shared key or the shared key derived from the target shared key is used as a shared key that protects secure data transmission and that is negotiated and agreed on by the service authentication device and the user equipment.

In another optional solution, the reference information includes at least one of a network parameter of a cellular network in which the network authentication device is located and a service parameter of a target service.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further correspondingly refer to the corresponding description of the foregoing method embodiment.

In the network authentication device shown in FIG. 9, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 10:
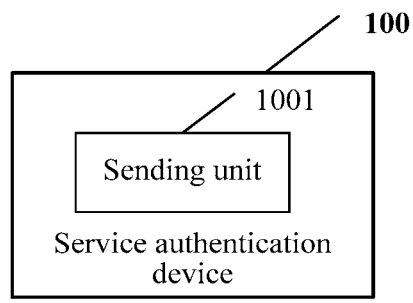
FIG. 10 is a schematic structural diagram of another service authentication device according to an embodiment of the present invention.

Referring to FIG. 10, FIG. 10 is a schematic structural diagram of a service authentication device 100 according to an embodiment of the present invention. The service authentication device 100 may include a sending unit 1001.

The sending unit 1001 is configured to send a pre-stored service parameter of a target service to a network authentication device and user equipment, so that the network authentication device and the user equipment generate a target shared key with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By running the foregoing unit, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of each unit, further correspondingly refer to the corresponding description of the foregoing method embodiment.

In the service authentication device 100 shown in FIG. 10, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 11:
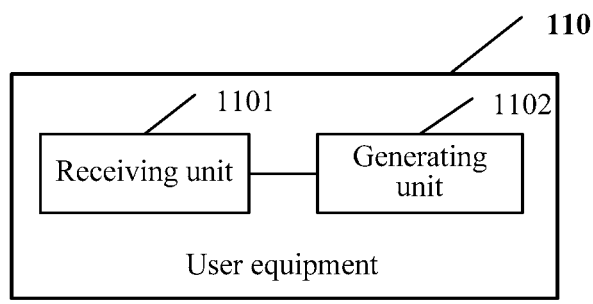
FIG. 11 is a schematic structural diagram of another user equipment according to an embodiment of the present invention.

Referring to FIG. 11, FIG. 11 is a schematic structural diagram of user equipment 110 according to an embodiment of the present invention. The user equipment 110 may include a receiving unit 1101 and a generating unit 1102, where each unit is described in detail as follows:

The receiving unit 1101 is configured to receive a pre-stored service parameter of a target service sent by a service authentication device, where the service authentication device is further configured to send the service parameter to a network authentication device.

The generating unit 1102 is configured to generate a target shared key with the network authentication device with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By running the foregoing units, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, that the generating unit 1102 and the network authentication device generate the target shared key with reference to the service parameter and the original shared key is specifically:

the generating unit and the network authentication device perform network authentication based on the service parameter and the original shared key to generate the target shared key; or the generating unit and the network authentication device generate an authentication shared key based on the service parameter and the original shared key, and perform network authentication based on the authentication shared key to generate the target shared key.

In another optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of each unit, further correspondingly refer to the corresponding description of the foregoing method embodiment.

In the user equipment 110 shown in FIG. 11, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 12:
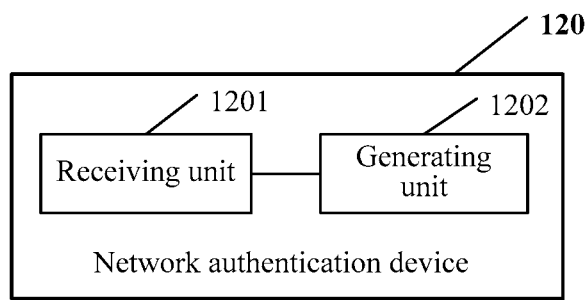
FIG. 12 is a schematic structural diagram of another network authentication device according to an embodiment of the present invention.

Referring to FIG. 12, FIG. 12 is a schematic structural diagram of a network authentication device 120 according to an embodiment of the present invention. The network authentication device 120 may include a receiving unit 1201 and a generating unit 1202, where each unit is described in detail as follows:

The receiving unit 1201 is configured to receive a pre-stored service parameter of a target service sent by a service authentication device, where the service authentication device is further configured to send the service parameter to user equipment.

The generating unit 1202 is configured to generate a target shared key with the user equipment with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By running the foregoing units, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, that the generating unit 1202 and the user equipment generate the target shared key with reference to the service parameter and the original shared key is specifically:

the generating unit and the user equipment perform network authentication based on the service parameter and the original shared key to generate the target shared key; or the generating unit and the user equipment generate an authentication shared key based on the service parameter and the original shared key, and perform network authentication based on the authentication shared key to generate the target shared key.

In another optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of each unit, further correspondingly refer to the corresponding description of the foregoing method embodiment.

In the network authentication device shown in FIG. 12, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 13:
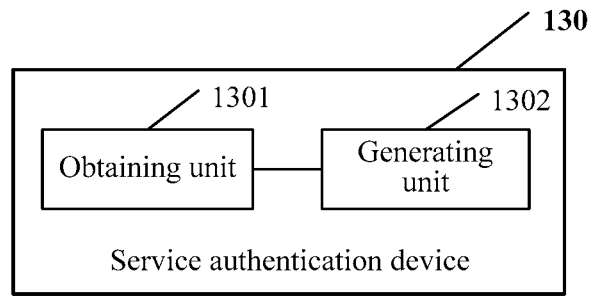
FIG. 13 is a schematic structural diagram of another service authentication device according to an embodiment of the present invention.

Referring to FIG. 13, FIG. 13 is a schematic structural diagram of a service authentication device 130 according to an embodiment of the present invention. The service authentication device 130 may include an obtaining unit 1301 and a generating unit 1302, where each unit is described in detail as follows:

The obtaining unit 1301 is configured to obtain an identity of user equipment.

The generating unit 1302 is configured to generate an identity key with reference to a service public key and a service secret key of the service authentication device and the identity, and send the identity key and the service public key to a network authentication device, where the identity key and the service public key are used by the network authentication device to generate a target shared key, and the target shared key or a shared key derived from the target shared key is a shared key that protects secure data transmission and that is negotiated and agreed on by the network authentication device and the user equipment.

In this embodiment of the present invention, for specific implementation of each unit, further correspondingly refer to the corresponding description of the foregoing method embodiment.

In the service authentication device shown in FIG. 13, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 14:
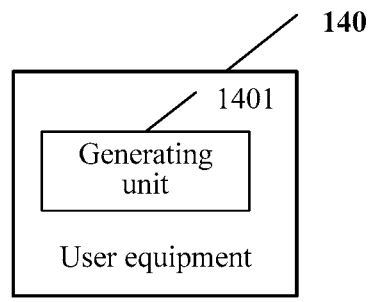
FIG. 14 is a schematic structural diagram of another user equipment according to an embodiment of the present invention.

Referring to FIG. 14, FIG. 14 is a schematic structural diagram of user equipment 140 according to an embodiment of the present invention. The user equipment 140 may include a generating unit 1401.

The generating unit 1401 is configured to perform network authentication with a network authentication device based on an authentication root key to generate a target shared key, where the Authentication root key is a key that is generated by the network authentication device based on an identity key, a service public key of a target service managed by a service authentication device, and a network parameter of a cellular network in which the network authentication device is located, and that is written to the user equipment. The identity key is generated by the service authentication device based on the service public key, a service secret key of the target service, and an obtained identity of the user equipment; the service authentication device is configured to send the service public key and the identity secret key to the network authentication device; and the target shared key or a shared key derived from the target shared key is a shared key that protects secure data transmission and that is negotiated and agreed on by the network authentication device and the user equipment.

By running the foregoing unit, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

In an optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further correspondingly refer to the corresponding description of the foregoing method embodiment.

In the user equipment shown in FIG. 14, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 15:
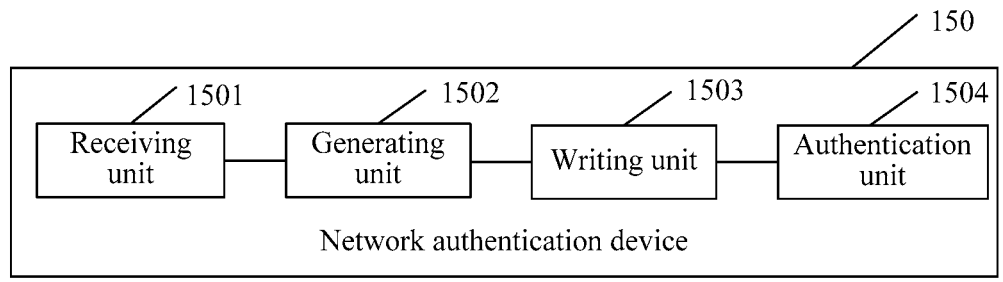
FIG. 15 is a schematic structural diagram of another network authentication device according to an embodiment of the present invention.

Referring to FIG. 15, FIG. 15 is a schematic structural diagram of a network authentication device 150 according to an embodiment of the present invention. The network authentication device 150 may include a receiving unit 1501, a generating unit 1502, a writing unit 1503, and an authentication unit 1504, where each unit is described in detail as follows:

The receiving unit 1501 is configured to receive an identity key and a service public key of a target service that is managed by a service authentication device, where the identity key is a key generated by the service authentication device based on a service secret key of the target service, the service public key, and an obtained identity of user equipment.

The generating unit 1502 is configured to generate an authentication root key with reference to the identity key, the service public key, and a network parameter of a cellular network in which the network authentication device is located.

The writing unit 1503 is configured to write the authentication root key to the user equipment.

The authentication unit 1504 is configured to perform network authentication with the user equipment based on the authentication root key to generate a target shared key, where the target shared key or a shared key derived from the target shared key is a shared key that protects secure data transmission and that is negotiated and agreed on by the network authentication device and the user equipment.

By running the foregoing units, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

In an optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further correspondingly refer to the corresponding description of the foregoing method embodiment.

In the network authentication device shown in FIG. 15, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 16:
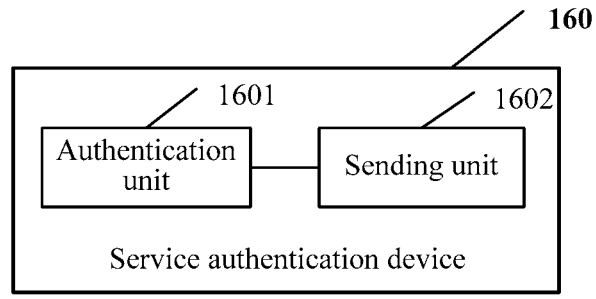
FIG. 16 is a schematic structural diagram of another service authentication device according to an embodiment of the present invention.

Referring to FIG. 16, FIG. 16 is a schematic structural diagram of a service authentication device 160 according to an embodiment of the present invention. The service authentication device 160 may include an authentication unit 1601 and a sending unit 1602, where each unit is described in detail as follows:

The authentication unit 1601 is configured to perform service authentication with the user equipment to generate a reference shared key, or the service authentication device and the user equipment pre-configure the reference shared key.

The sending unit 1602 is configured to send the reference shared key to a network authentication device, so that the network authentication device and the user equipment generate a target shared key with reference to the reference shared key, where the target shared key or a shared key derived from the target shared key is a shared key that protects secure data transmission and that is negotiated and agreed on by the network authentication device and the user equipment.

By running the foregoing units, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

In an optional solution, the service authentication device further includes:

a receiving unit, configured to receive the target shared key sent by the network authentication device; and a determining unit, configured to use the target shared key or the shared key derived from the target shared key as a shared key that protects secure data transmission and that is negotiated and agreed on by the service authentication device and the user equipment.

In this embodiment of the present invention, for specific implementation of each unit, further correspondingly refer to the corresponding description of the foregoing method embodiment.

In the service authentication device shown in FIG. 16, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 17:
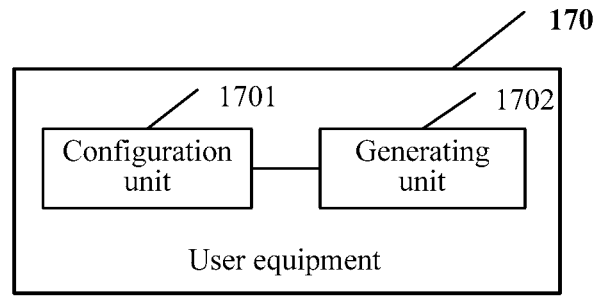
FIG. 17 is a schematic structural diagram of another user equipment according to an embodiment of the present invention.

Referring to FIG. 17, FIG. 17 is a schematic structural diagram of user equipment 170 according to an embodiment of the present invention. The user equipment 170 may include a configuration unit 1701 and a generating unit 1702, where each unit is described in detail as follows:

The configuration unit 1701 is configured to perform service authentication with the service authentication device to generate a reference shared key, or the service authentication device and the user equipment pre-configure the reference shared key, and the service authentication device is configured to send the reference shared key to a network authentication device.

The generating unit 1702 is configured to generate a target shared key with the network authentication device with reference to the reference shared key, where the target shared key or a shared key derived from the target shared key is a shared key that protects secure data transmission and that is negotiated and agreed on by the network authentication device and the user equipment.

By running the foregoing units, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

In an optional solution, the user equipment further includes:

a receiving unit, configured to receive a network parameter of a cellular network in which the network authentication device is located, where the network parameter is sent by the network authentication device; and that the generating unit and the network authentication device generate the target shared key with reference to the reference shared key is specifically:

the generating unit and the network authentication device generate an authentication shared key based on the network parameter and the reference shared key; and the generating unit and the network authentication device perform network authentication based on the authentication shared key to generate the target shared key.

In another optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of each unit, further correspondingly refer to the corresponding description of the foregoing method embodiment.

In the user equipment shown in FIG. 17, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 18:
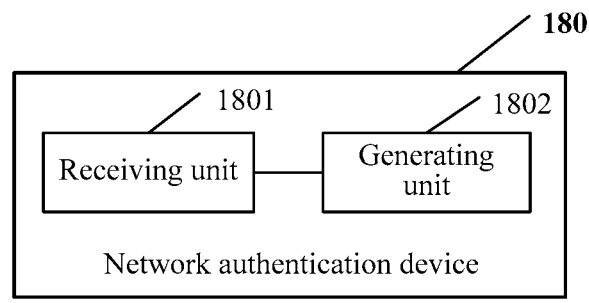
FIG. 18 is a schematic structural diagram of another network authentication device according to an embodiment of the present invention.

Referring to FIG. 18, FIG. 18 is a schematic structural diagram of a network authentication device 180 according to an embodiment of the present invention. The network authentication device 180 may include a receiving unit 1801 and a generating unit 1802, where each unit is described in detail as follows:

The receiving unit 1801 is configured to receive a reference shared key sent by a service authentication device, where the reference shared key is generated by performing service authentication by the service authentication device and user equipment or is pre-configured by the service authentication device and user equipment.

The generating unit 1802 is configured to generate a target shared key with the user equipment with reference to the reference shared key, where the target shared key or a shared key derived from the target shared key is a shared key that protects secure data transmission and that is negotiated and agreed on by the network authentication device and the user equipment.

By running the foregoing units, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

In an optional solution, the network authentication device further includes:

a first sending unit, configured to send a network parameter of a cellular network in which the network authentication device is located to the user equipment; and that the generating unit and the user equipment generate the target shared key with reference to the reference shared key is specifically:

both the generating unit and the user equipment generate the authentication shared key based on the network parameter and the reference shared key; and the generating unit and the user equipment perform network authentication based on the authentication shared key to generate the target shared key.

In another optional solution, the network parameter includes at least one of an operator identifier, an access network identifier, a service network identifier, a network type identifier, a network identifier of a local area network, a slice identifier, a bearer identifier, a quality of service identifier, and a flow identifier.

In another optional solution, the network authentication device further includes:

a second sending unit, configured to send the target shared key to the service authentication device, so that the service authentication device uses the target shared key or the shared key derived from the target shared key as a shared key that protects secure data transmission and that is negotiated and agreed on by the service authentication device and the user equipment.

In this embodiment of the present invention, for specific implementation of each unit, further correspondingly refer to the corresponding description of the foregoing method embodiment.

In the network authentication device shown in FIG. 18, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 19:
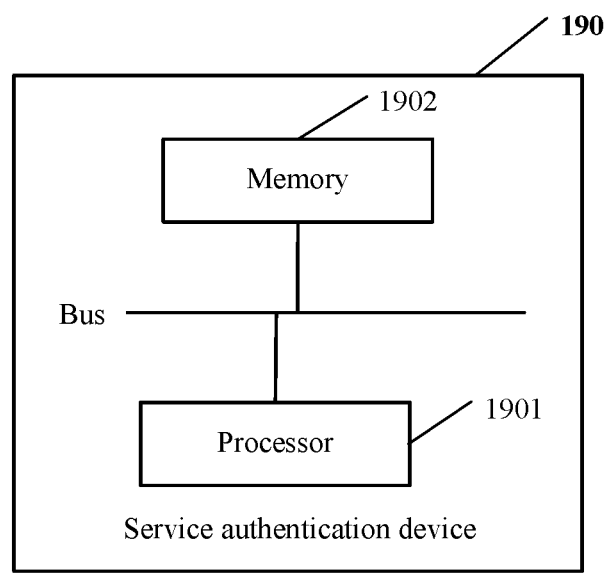
FIG. 19 is a schematic structural diagram of another service authentication device according to an embodiment of the present invention.

Referring to FIG. 19, FIG. 19 shows a service authentication device 190 according to an embodiment of the present invention. The service authentication device 190 includes a processor 1901 and a memory 1902, and the processor 1901 and the memory 1902 are connected to each other by using a bus.

The memory 1902 includes but is not limited to a random access memory (RAM), a read-only memory (ROM), an erasable programmable read-only memory (EPROM or flash memory), or a portable read-only memory (CD-ROM), and the memory 1902 is used for a related instruction and data.

The processor 1901 may be one or more central processing units (English: Central Processing Unit, CPU for short), and when the processor 1901 is one CPU, the CPU may be a single-core CPU or multi-core CPU.

The processor 1901 in the service authentication device 190 reads program code stored in the memory 1902, and is configured to perform the following operations:

obtaining reference information and generate a second shared key with reference to the reference information and a first shared key, where the first shared key is a shared key pre-configured between user equipment and the service authentication device, the user equipment is configured to obtain the reference information and generate the second shared key with reference to the reference information and the first shared key, and the reference information includes information pre-associated with at least one of the user equipment, a network authentication device, and the service authentication device; and sending the second shared key to the network authentication device, where the second shared key is used by the user equipment and the network authentication device to generate a target shared key, and the target shared key or a shared key derived from the target shared key is a shared key that protects secure data transmission and that is negotiated and agreed on by the network authentication device and the user equipment.

By performing the foregoing operations, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the processor 1901 generates the second shared key with reference to the reference information and the first shared key is specifically:

the processor and the user equipment perform service authentication with reference to the reference information and the first shared key to generate the second shared key.

In another optional solution, after sending the second shared key to the network authentication device, the processor 1901 is further configured to:

receive the target shared key sent by the network authentication device; and use the target shared key or the shared key derived from the target shared key as a shared key that protects secure data transmission and that is negotiated and agreed on by the service authentication device and the user equipment.

In another optional solution, after obtaining the reference information and generating the second shared key with reference to the reference information and the first shared key, the processor 1901 is further configured to:

use the second shared key or the shared key derived from the second shared key as a shared key that protects secure data transmission and that is negotiated and agreed on by the service authentication device and the user equipment.

In another optional solution, before generating the second shared key with reference to the reference information and the first shared key, the processor 1901 is further configured to:

obtain a fifth shared key pre-configured between the user equipment and the network authentication device; where that the processor 1901 generates the second shared key with reference to the reference information and the first shared key is specifically:

performing network authentication with reference to the reference information, the first shared key, and the fifth shared key to generate the second shared key.

In another optional solution, before generating the second shared key with reference to the reference information and the first shared key, the processor 1901 is further configured to:

receive network-side information generated by the network authentication device based on a network parameter of a cellular network in which the network authentication device is located, and forwarding the network-side information to the user equipment, where that the processor 1901 generates the second shared key with reference to the reference information and the first shared key is specifically:

performing service authentication with reference to the network parameter and the first shared key to generate the second shared key, where the network parameter includes the network-side information.

In another optional solution, the reference information includes at least one of the network parameter of the cellular network in which the network authentication device is located and a service parameter of a target service.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the service authentication device, further correspondingly refer to the corresponding description of the foregoing method embodiment. Details are not described herein again.

In the service authentication device shown in FIG. 19, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 20:
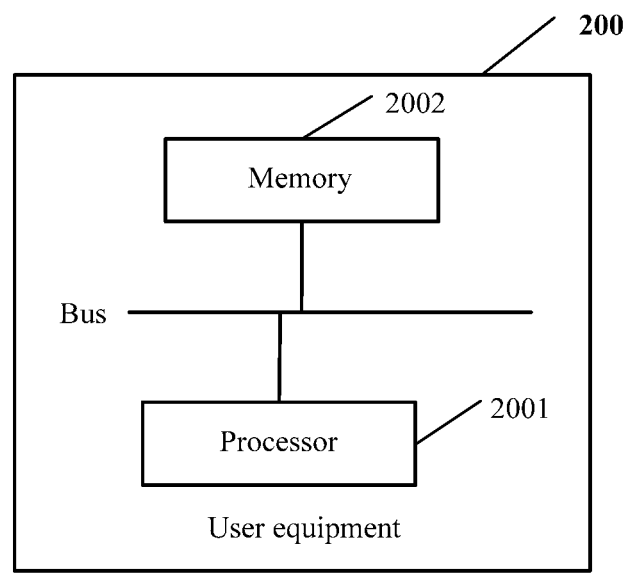
FIG. 20 is a schematic structural diagram of another user equipment according to an embodiment of the present invention.

Referring to FIG. 20, FIG. 20 shows user equipment 200 according to an embodiment of the present invention. The user equipment 200 includes a processor 2001 and a memory 2002, and the processor 2001 and the memory 2002 are connected to each other by using a bus.

The memory 2002 includes but is not limited to a random access memory (RAM), a read-only memory (ROM), an erasable programmable read-only memory (EPROM or flash memory), or a portable read-only memory (CD-ROM), and the memory 2002 is used for a related instruction and data.

The processor 2001 may be one or more central processing units (English: Central Processing Unit, CPU for short), and when the processor 2001 is one CPU, the CPU may be a single-core CPU or multi-core CPU.

The processor 2001 in the user equipment 200 reads program code stored in the memory 2002, and is configured to perform the following operations:

obtaining reference information and generating a second shared key with reference to the reference information and a first shared key, where the first shared key is a shared key pre-configured between the user equipment and a service authentication device, the service authentication device is configured to obtain the reference information and generate the second shared key with reference to the reference information and the first shared key, and the service authentication device is further configured to send the second shared key to a network authentication device; and generating a target shared key based on the second shared key, where the target shared key or a shared key derived from the target shared key is a shared key that protects secure data transmission and that is negotiated and agreed on by the network authentication device and the user equipment.

By performing the foregoing operations, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the processor 2001 generates the target shared key based on the second shared key is specifically:

using the second shared key or a shared key derived from the second shared key as the target shared key.

In another optional solution, that the processor 2001 generates the target shared key based on the second shared key is specifically:

the processor and the network authentication device perform network authentication based on the second shared key or based on a shared key derived from the second shared key to generate the target shared key.

In another optional solution, before the processor 2001 and the network authentication device perform network authentication based on the second shared key or based on the shared key derived from the second shared key to generate the target shared key, the processor 2001 is further configured to:

the processor and the network authentication device perform network authentication to generate a third shared key; and the performing, by the processor and the network authentication device, network authentication based on the second shared key or based on the shared key derived from the second shared key to generate the target shared key includes:

performing, by the processor and the network authentication device, network authentication based on the second shared key to generate a fourth shared key; and generating the target shared key based on the third shared key and the fourth shared key.

In another optional solution, that the processor 2001 generates the target shared key based on the second shared key is specifically:

the processor and the network authentication device perform network authentication to generate a third shared key; and generate the target shared key based on the second shared key and the third shared key; or respectively use the second shared key and the third shared key as target shared keys to protect different types of data.

In another optional solution, that the processor 2001 generates the target shared key based on the second shared key is specifically:

generating the target shared key based on the second shared key and a fifth shared key; or respectively using the second shared key and a shared key derived from the fifth shared key as target shared keys for protecting different types of data, where the fifth shared key is a shared key pre-configured between the user equipment and the network authentication device.

In another optional solution, that the processor 2001 generates the second shared key with reference to the reference information and the first shared key is specifically:

performing service authentication with the service authentication device with reference to the reference information, the first shared key, and a fifth shared key to generate the second shared key, where the fifth shared key is a shared key pre-configured between the user equipment and the network authentication device, and the service authentication device is configured to obtain the fifth shared key.

In another optional solution, that the processor 2001 generates the second shared key with reference to the reference information and the first shared key is specifically:

the processor and the service authentication device perform service authentication with reference to the reference information and the first shared key to generate the second shared key.

In another optional solution, before generating the second shared key with reference to the reference information and the first shared key, the processor 2001 is further configured to:

receive network-side information from the network authentication device forwarded by the service authentication device, where the network-side information is generated by the network authentication device based on the fifth shared key and the obtained first shared key, and the fifth shared key is a shared key pre-configured between the user equipment and the network authentication device; where that the processor 2001 generates the second shared key with reference to the reference information and the first shared key is specifically:

performing service authentication with the service authentication device with reference to a network parameter and the first shared key to generate the second shared key, where the network parameter includes the network-side information.

In another optional solution, the reference information includes at least one of a network parameter of a cellular network in which the network authentication device is located and a service parameter of a target service.

In another optional solution, when the reference information includes the service parameter, before generating the second shared key with reference to the reference information and the first shared key, the processor 2001 is further configured to:

receive the service parameter from the service authentication device forwarded by the network authentication device.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the user equipment, correspondingly refer to the corresponding description of the foregoing method embodiment.

In the user equipment shown in FIG. 20, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 21:
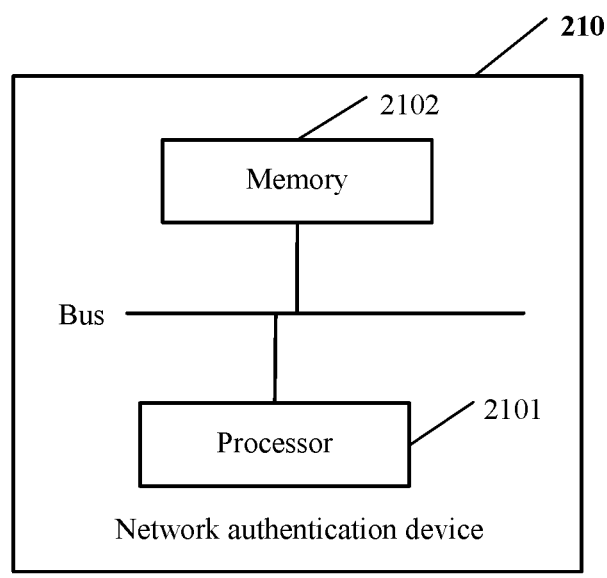
FIG. 21 is a schematic structural diagram of another network authentication device according to an embodiment of the present invention.

Referring to FIG. 21, FIG. 21 shows a network authentication device 210 according to an embodiment of the present invention. The network authentication device 210 includes a processor 2101 and a memory 2102, and the processor 2101 and the memory 2102 are connected to each other by using a bus.

The memory 2102 includes but is not limited to a random access memory (RAM), a read-only memory (ROM), an erasable programmable read-only memory (EPROM or flash memory), or a portable read-only memory (CD-ROM), and the memory 2102 is used for a related instruction and data.

The processor 2101 may be one or more central processing units (English: Central Processing Unit, CPU for short), and when the processor 2101 is one CPU, the CPU may be a single-core CPU or multi-core CPU.

The processor 2101 in the network authentication device 210 reads program code stored in the memory 2102, and is configured to perform the following operations:

receiving a second shared key sent by a service authentication device, where both the service authentication device and user equipment are configured to generate the second shared key with reference to a first shared key and reference information, the first shared key is a shared key pre-configured between the user equipment and the service authentication device, and the reference information includes information pre-associated with at least one of the user equipment, the network authentication device, and the service authentication device; and generating a target shared key based on the second shared key, where the target shared key or a shared key derived from the target shared key is a shared key that protects secure data transmission and that is negotiated and agreed on by the network authentication device and the user equipment.

By performing the foregoing operations, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

In an optional solution, that the processor 2101 generates the target shared key based on the second shared key is specifically:

the processor and the user equipment perform network authentication based on the second shared key or based on a shared key derived from the second shared key to generate the target shared key.

In another optional solution, before the processor 2101 and the user equipment perform network authentication based on the second shared key or based on the shared key derived from the second shared key to generate the target shared key, the processor 2101 is further configured to:

the processor and the user equipment perform network authentication to generate a third shared key; and the performing, by the processor and the user equipment, network authentication based on the second shared key or based on a shared key derived from the second shared key to generate the target shared key includes:

performing, by the processor and the user equipment, network authentication based on the second shared key to generate a fourth shared key; and generating, by both the processor and the user equipment, the target shared key based on the third shared key and the fourth shared key.

In another optional solution, that the processor 2101 generates the target shared key based on the second shared key is specifically:

the processor and the user equipment use the second shared key or a shared key derived from the second shared key as the target shared key.

In another optional solution, that the processor 2101 generates the target shared key based on the second shared key is specifically:

the processor and the user equipment perform network authentication to generate a third shared key; and the processor and the user equipment generate the target shared key based on the second shared key and the third shared key; or respectively use the second shared key and the third shared key as target shared keys to protect different types of data.

In another optional solution, that the processor 2101 generates the target shared key based on the second shared key is specifically:

the processor and the user equipment generate the target shared key based on the second shared key and a fifth shared key; or respectively use the second shared key and a key derived from the fifth shared key as target shared keys for protecting different types of data, where the fifth shared key is a shared key pre-configured between the user equipment and the network authentication device.

In another optional solution, the processor 2101 is further configured to:

obtain the first shared key from the service authentication device;

generate network-side information based on the first shared key and the fifth shared key, where the fifth shared key is a shared key pre-configured between the user equipment and the network authentication device; and send the network-side information to the service authentication device, so that the service authentication device forwards the network-side information to the user equipment, and a network parameter belongs to the reference information.

In another optional solution, before generating the target shared key based on the second shared key, the processor 2101 is further configured to:

send the target shared key to the service authentication device, where the target shared key or the shared key derived from the target shared key is used as a shared key that protects secure data transmission and that is negotiated and agreed on by the service authentication device and the user equipment.

In another optional solution, the reference information includes at least one of a network parameter of a cellular network in which the network authentication device is located and a service parameter of a target service.

In another optional solution, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the network authentication device 210, further refer to the corresponding description of the foregoing method embodiment.

In the network authentication device 210 in FIG. 21, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Figure 22:
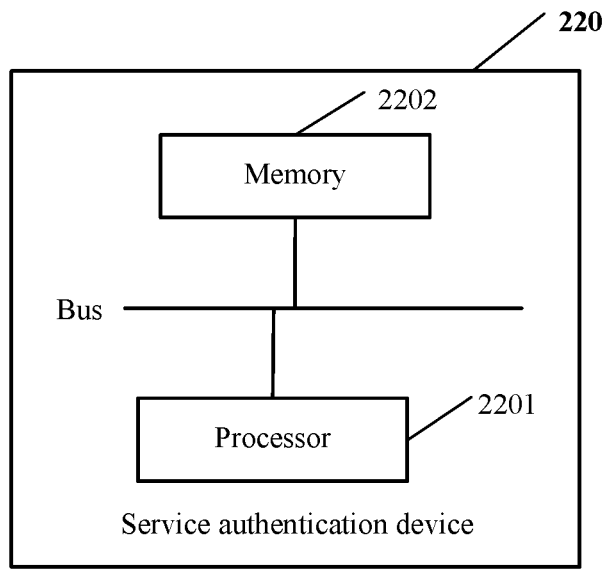
FIG. 22 is a schematic structural diagram of another service authentication device according to an embodiment of the present invention.

Referring to FIG. 22, FIG. 22 shows a service authentication device 220 according to an embodiment of the present invention. The service authentication device 220 includes a processor 2201 and a memory 2202, and the processor 2201 and the memory 2202 are connected to each other by using a bus.

The memory 2202 includes but is not limited to a random access memory (RAM), a read-only memory (ROM), an erasable programmable read-only memory (EPROM or flash memory), or a portable read-only memory (CD-ROM), and the memory 2202 is used for a related instruction and data.

The processor 2201 may be one or more central processing units (English: Central Processing Unit, CPU for short), and when the processor 2201 is one CPU, the CPU may be a single-core CPU or multi-core CPU.

The processor 2201 in the service authentication device 220 reads program code stored in the memory 2202, and is configured to perform the following operation:

sending a pre-stored service parameter of a target service to a network authentication device and user equipment, so that the network authentication device and the user equipment generate a target shared key with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By performing the foregoing operation, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of the service authentication device 220, further correspondingly refer to the corresponding description of the foregoing method embodiment.

In the service authentication device 220 shown in FIG. 22, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 23:
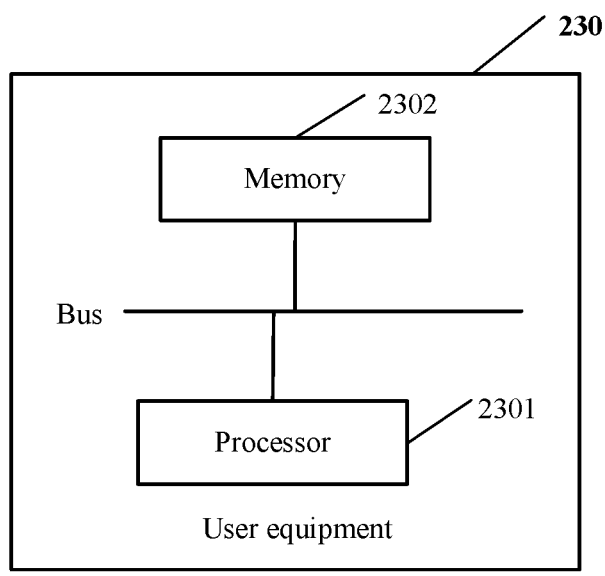
FIG. 23 is a schematic structural diagram of another user equipment according to an embodiment of the present invention.

Referring to FIG. 23, FIG. 23 shows user equipment 230 according to an embodiment of the present invention. The user equipment 230 includes a processor 2301 and a memory 2302, and the processor 2301 and the memory 2302 are connected to each other by using a bus.

The memory 2302 includes but is not limited to a random access memory (RAM), a read-only memory (ROM), an erasable programmable read-only memory (EPROM or flash memory), or a portable read-only memory (CD-ROM), and the memory 2302 is used for a related instruction and data.

The processor 2301 may be one or more central processing units (English: Central Processing Unit, CPU for short), and when the processor 2301 is one CPU, the CPU may be a single-core CPU or multi-core CPU.

The processor 2301 in the user equipment 230 reads program code stored in the memory 2302, and is configured to perform the following operations:

receiving a pre-stored service parameter of a target service sent by a service authentication device, where the service authentication device is further configured to send the service parameter to a network authentication device; and generating a target shared key with the network authentication device with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By performing the foregoing operations, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, that the processor 2301 and the network authentication device generate the target shared key with reference to the service parameter and the original shared key is specifically:

the processor and the network authentication device perform network authentication based on the service parameter and the original shared key to generate the target shared key; or the processor and the network authentication device generate an authentication shared key based on the service parameter and the original shared key, and perform network authentication based on the authentication shared key to generate the target shared key.

In another optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of the user equipment 230, further refer to the corresponding description of the foregoing method embodiment.

In the user equipment 230 shown in FIG. 23, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 24:
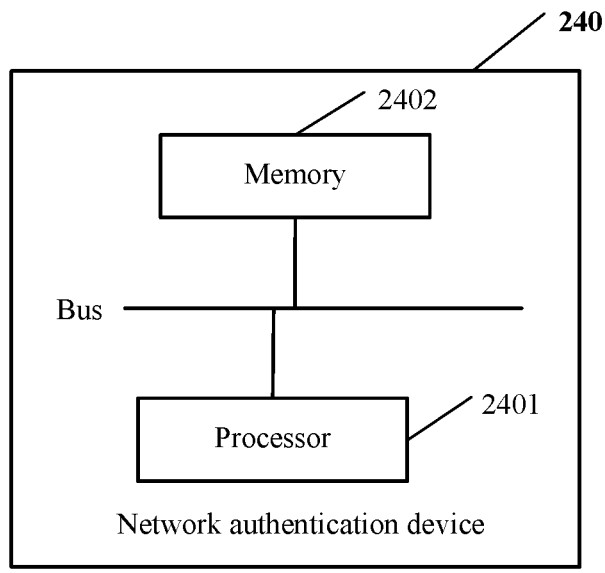
FIG. 24 is a schematic structural diagram of another network authentication device according to an embodiment of the present invention.

Referring to FIG. 24, FIG. 24 shows a network authentication device 240 according to an embodiment of the present invention. The network authentication device 240 includes a processor 2401 and a memory 2402, and the processor 2401 and the memory 2402 are connected to each other by using a bus.

The memory 2402 includes but is not limited to a random access memory (RAM), a read-only memory (ROM), an erasable programmable read-only memory (EPROM or flash memory), or a portable read-only memory (CD-ROM), and the memory 2402 is used for a related instruction and data.

The processor 2401 may be one or more central processing units (English: Central Processing Unit, CPU for short), and when the processor 2401 is one CPU, the CPU may be a single-core CPU or multi-core CPU.

The processor 2401 in the network authentication device 240 reads program code stored in the memory 2402, and is configured to perform the following operations:

receiving a pre-stored service parameter of a target service sent by a service authentication device, where the service authentication device is further configured to send the service parameter to user equipment; and generating a target shared key with the user equipment with reference to the service parameter and an original shared key, where the target shared key or a shared key derived from the target shared key is a shared key that protects secure data transmission and that is negotiated and agreed on by the network authentication device and the user equipment, and the original shared key is a shared key pre-configured between the user equipment and the network authentication device.

By performing the foregoing operations, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

In an optional solution, that the processor 2401 and the user equipment generate the target shared key with reference to the service parameter and the original shared key is specifically:

the processor and the user equipment perform network authentication based on the service parameter and the original shared key to generate the target shared key; or the processor and the user equipment generate an authentication shared key based on the service parameter and the original shared key, and perform network authentication based on the authentication shared key to generate the target shared key.

In another optional solution, the service parameter includes at least one of a service sequence number of the target service, an identifier of a key management center, a session identifier, a link identifier, an application identifier, a service identifier, a service level, a service data rate, a time delay, and a service server identifier.

In this embodiment of the present invention, for specific implementation of the network authentication device 240, further refer to the corresponding description of the foregoing method embodiment.

In the network authentication device 240 shown in FIG. 24, the service authentication device sends the service parameter to the network authentication device, and the network authentication device generates the target shared key based on the original shared key that is pre-shared by the network authentication device and the user equipment and the service parameter. That is, the generation of the target shared key is related to service related information, information related to the user equipment, and network related information, improving a security level of the target shared key.

Figure 25:
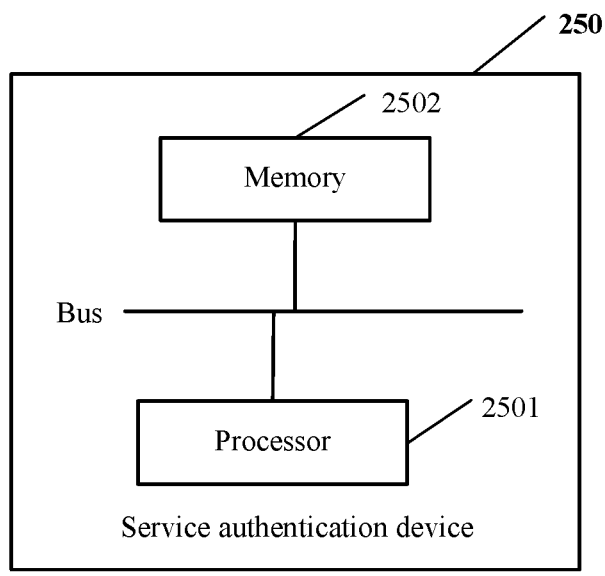
FIG. 25 is a schematic structural diagram of another service authentication device according to an embodiment of the present invention.

Referring to FIG. 25, FIG. 25 shows a service authentication device 250 according to an embodiment of the present invention. The service authentication device 250 includes a processor 2501 and a memory 2502, and the processor 2501 and the memory 2502 are connected to each other by using a bus.

The memory 2502 includes but is not limited to a random access memory (RAM), a read-only memory (ROM), an erasable programmable read-only memory (EPROM or flash memory), or a portable read-only memory (CD-ROM), and the memory 2502 is used for a related instruction and data.

The processor 2501 may be one or more central processing units (English: Central Processing Unit, CPU for short), and when the processor 2501 is one CPU, the CPU may be a single-core CPU or multi-core CPU.

The processor 2501 in the service authentication device 250 reads program code stored in the memory 2502, and is configured to perform the following operations:

obtaining an identity of user equipment; and generating an identity key with reference to a service public key and a service secret key of the service authentication device and the identity, and sending the identity key and the service public key to a network authentication device, where the identity key and the service public key are used by the network authentication device to generate a target shared key, and the target shared key or a shared key derived from the target shared key is a shared key that protects secure data transmission and that is negotiated and agreed on by the network authentication device and the user equipment.

In this embodiment of the present invention, for specific implementation of the service authentication device 250, further refer to the corresponding description of the foregoing method embodiment.

In the service authentication device 250 shown in FIG. 25, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 26:
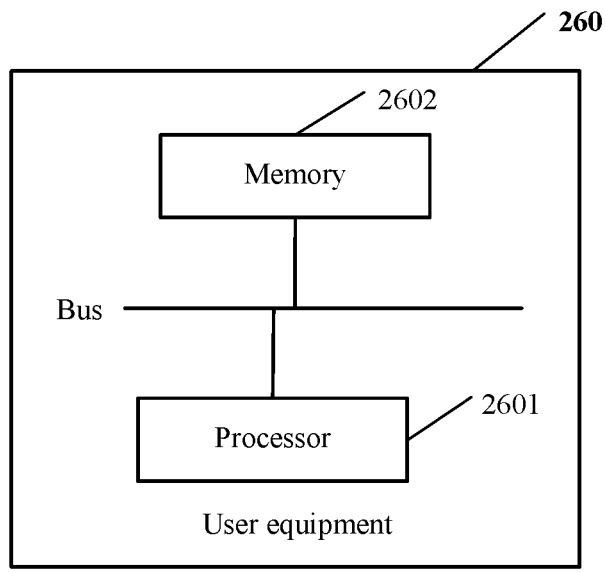
FIG. 26 is a schematic structural diagram of another user equipment according to an embodiment of the present invention.

Referring to FIG. 26, FIG. 26 shows user equipment 260 according to an embodiment of the present invention. The user equipment 260 includes a processor 2601 and a memory 2602, and the processor 2601 and the memory 2602 are connected to each other by using a bus.

The memory 2602 includes but is not limited to a random access memory (RAM), a read-only memory (ROM), an erasable programmable read-only memory (EPROM or flash memory), or a portable read-only memory (CD-ROM), and the memory 2602 is used for a related instruction and data.

The processor 2601 may be one or more central processing units (English: Central Processing Unit, CPU for short), and when the processor 2601 is one CPU, the CPU may be a single-core CPU or multi-core CPU.

The processor 2601 in the user equipment 260 reads program code stored in the memory 2602, and is configured to perform the following operation:

performing network authentication with a network authentication device based on an authentication root key to generate a target shared key, where the authentication root key is a key that is generated by the network authentication device based on an identity key, a service public key of a target service managed by a service authentication device, and a network parameter of a cellular network in which the network authentication device is located, and that is written to the user equipment, the identity key is generated by the service authentication device based on the service public key, a service secret key of the target service, and an obtained identity of the user equipment, and the service authentication device is configured to send the service public key and the identity secret key to the network authentication device; and the target shared key or a shared key derived from the target shared key is a shared key that protects secure data transmission and that is negotiated and agreed on by the network authentication device and the user equipment.

In an optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the user equipment 260, further refer to the corresponding description of the foregoing method embodiment.

In the user equipment 260 shown in FIG. 26, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 27:
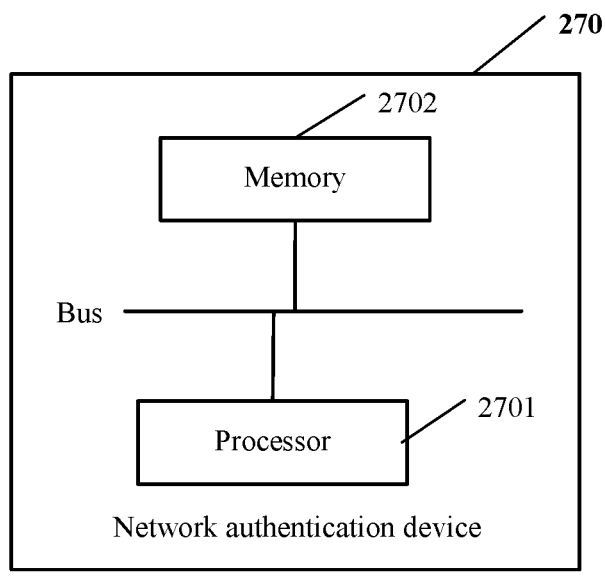
FIG. 27 is a schematic structural diagram of another network authentication device according to an embodiment of the present invention.

Referring to FIG. 27, FIG. 27 shows a network authentication device 270 according to an embodiment of the present invention. The network authentication device 270 includes a processor 2701 and a memory 2702, and the processor 2701 and the memory 2702 are connected to each other by using a bus.

The memory 2702 includes but is not limited to a random access memory (RAM), a read-only memory (ROM), an erasable programmable read-only memory (EPROM or flash memory), or a portable read-only memory (CD-ROM), and the memory 2702 is used for a related instruction and data.

The processor 2701 may be one or more central processing units (English: Central Processing Unit, CPU for short), and when the processor 2701 is one CPU, the CPU may be a single-core CPU or multi-core CPU.

The processor 2701 in the network authentication device 270 reads program code stored in the memory 2702, and is configured to perform the following operations:

receiving an identity key and a service public key of a target service that is managed by a service authentication device, where the identity key is a key generated by the service authentication device based on a service secret key of the target service, the service public key, and an obtained identity of user equipment;

generating an authentication root key with reference to the identity key, the service public key, and a network parameter of a cellular network in which the network authentication device is located;

writing the authentication root key to the user equipment; and performing network authentication with the user equipment based on the authentication root key to generate a target shared key, where the target shared key or a shared key derived from the target shared key is a shared key that protects secure data transmission and that is negotiated and agreed on by the network authentication device and the user equipment.

In an optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the network authentication device 270, further refer to the corresponding description of the foregoing method embodiment.

In the network authentication device 270 shown in FIG. 27, the service authentication device sends the service public key and the identity key to the network authentication device, the network authentication device generates the authentication root key based on information about the network in which the network authentication device is located, the identity key, and the service public key, and the network authentication device and the user equipment further perform network authentication based on the authentication root key to generate the target shared key. That is, the generation of the target shared key is related to service related information, information related to the user equipment, and network related information, improving a security level of the target shared key.

Figure 28:
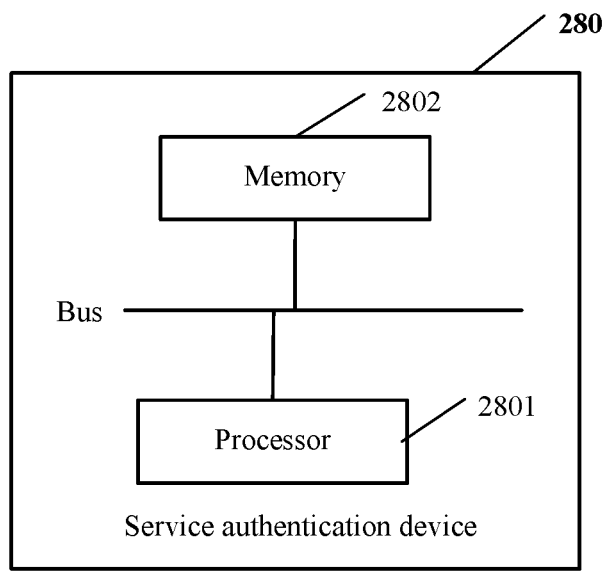
FIG. 28 is a schematic structural diagram of another service authentication device according to an embodiment of the present invention.

Referring to FIG. 28, FIG. 28 shows a service authentication device 280 according to an embodiment of the present invention. The service authentication device 280 includes a processor 2801 and a memory 2802, and the processor 2801 and the memory 2802 are connected to each other by using a bus.

The memory 2802 includes but is not limited to a random access memory (RAM), a read-only memory (ROM), an erasable programmable read-only memory (EPROM or flash memory), or a portable read-only memory (CD-ROM), and the memory 2802 is used for a related instruction and data.

The processor 2801 may be one or more central processing units (English: Central Processing Unit, CPU for short), and when the processor 2801 is one CPU, the CPU may be a single-core CPU or multi-core CPU.

The processor 2801 in the service authentication device 280 reads program code stored in the memory 2802, and is configured to perform the following operations:

performing service authentication with the user equipment to generate a reference shared key, or the service authentication device and the user equipment pre-configure the reference shared key; and sending the reference shared key to a network authentication device, so that the network authentication device and the user equipment generate a target shared key with reference to the reference shared key, where the target shared key or a shared key derived from the target shared key is a shared key that protects secure data transmission and that is negotiated and agreed on by the network authentication device and the user equipment.

In an optional solution, the processor 2801 is further configured to:

receive the target shared key sent by the network authentication device; and use the target shared key or the shared key derived from the target shared key as a shared key that protects secure data transmission and that is negotiated and agreed on by the service authentication device and the user equipment.

In this embodiment of the present invention, for specific implementation of the service authentication device 280, further refer to the corresponding description of the foregoing method embodiment.

In the service authentication device 280 shown in FIG. 28, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 29:
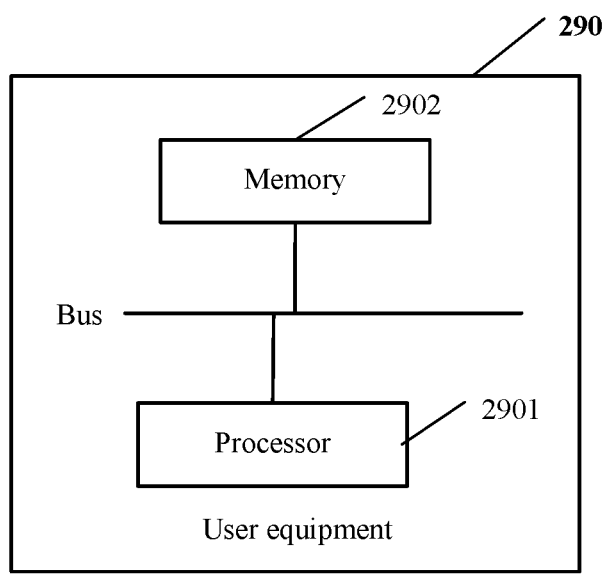
FIG. 29 is a schematic structural diagram of another user equipment according to an embodiment of the present invention.

Referring to FIG. 29, FIG. 29 shows user equipment 290 according to an embodiment of the present invention. The user equipment 290 includes a processor 2901 and a memory 2902, and the processor 2901 and the memory 2902 are connected to each other by using a bus.

The memory 2902 includes but is not limited to a random access memory (RAM), a read-only memory (ROM), an erasable programmable read-only memory (EPROM or flash memory), or a portable read-only memory (CD-ROM), and the memory 2902 is used for a related instruction and data.

The processor 2901 may be one or more central processing units (English: Central Processing Unit, CPU for short), and when the processor 2901 is one CPU, the CPU may be a single-core CPU or multi-core CPU.

The processor 2901 in the user equipment 290 reads program code stored in the memory 2902, and is configured to perform the following operations:

performing service authentication with the service authentication device to generate a reference shared key, or the service authentication device and the user equipment pre-configure the reference shared key, and the service authentication device is configured to send the reference shared key to a network authentication device; and generating a target shared key with the network authentication device with reference to the reference shared key, where the target shared key or a shared key derived from the target shared key is a shared key that protects secure data transmission and that is negotiated and agreed on by the network authentication device and the user equipment.

In an optional solution, before the processor 2901 and the network authentication device generate the target shared key with reference to the reference shared key, the processor 2901 is further configured to:

receive a network parameter of a cellular network in which the network authentication device is located, where the network parameter is sent by the network authentication device; and the generating a target shared key with the network authentication device with reference to the reference shared key includes:

generating, by the processor and the network authentication device, the authentication shared key based on the network parameter and the reference shared key; and performing, by the processor and the network authentication device, network authentication based on the authentication shared key to generate the target shared key.

In an optional solution, the network parameter includes at least one of an operator identifier, an access network identifier, a service network identifier, a network type identifier, a network identifier of a local area network, a slice identifier, a bearer identifier, a quality of service identifier, and a flow identifier.

In this embodiment of the present invention, for specific implementation of the user equipment 290, further refer to the corresponding description of the foregoing method embodiment.

In the user equipment 290 shown in FIG. 29, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Figure 30:
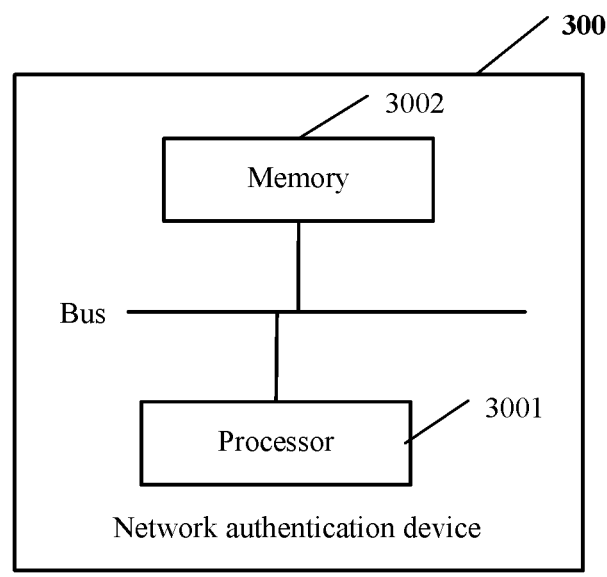
FIG. 30 is a schematic structural diagram of another network authentication device according to an embodiment of the present invention.
Figure 31:
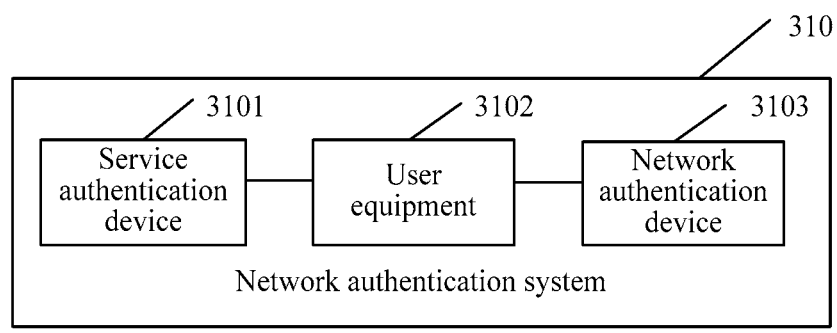
FIG. 31 is a schematic structural diagram of a network authentication system according to an embodiment of the present invention.

Referring to FIG. 30, FIG. 30 shows a network authentication device 300 according to an embodiment of the present invention. The network authentication device 300 includes a processor 3001 and a memory 3002, and the processor 3001 and the memory 3002 are connected to each other by using a bus.

The memory 3002 includes but is not limited to a random access memory (RAM), a read-only memory (ROM), an erasable programmable read-only memory (EPROM or flash memory), or a portable read-only memory (CD-ROM), and the memory 3002 is used for a related instruction and data.

The processor 3001 may be one or more central processing units (English: Central Processing Unit, CPU for short), and when the processor 3001 is one CPU, the CPU may be a single-core CPU or multi-core CPU.

The processor 3001 in the network authentication device 300 reads program code stored in the memory 3002, and is configured to perform the following operations:

receiving a reference shared key sent by a service authentication device, where the reference shared key is generated by performing service authentication by the service authentication device and user equipment or is pre-configured by the service authentication device and user equipment; and generating a target shared key with the user equipment with reference to the reference shared key, where the target shared key or a shared key derived from the target shared key is a shared key that protects secure data transmission and that is negotiated and agreed on by the network authentication device and the user equipment.

In an optional solution, before the processor 3001 and the user equipment generate the target shared key with reference to the reference shared key, the processor 3001 is further configured to:

send a network parameter of a cellular network in which the network authentication device is located to the user equipment; and the generating a target shared key with the user equipment with reference to the reference shared key includes:

generating, by both the processor and the user equipment, the authentication shared key based on the network parameter and the reference shared key; and performing, by the processor and the user equipment, network authentication based on the authentication shared key to generate the target shared key.

In another optional solution, the network parameter includes at least one of an operator identifier, an access network identifier, a service network identifier, a network type identifier, a network identifier of a local area network, a slice identifier, a bearer identifier, a quality of service identifier, and a flow identifier.

In another optional solution, the processor 3001 is further configured to:

send the target shared key to the service authentication device, so that the service authentication device uses the target shared key or the shared key derived from the target shared key as a shared key that protects secure data transmission and that is negotiated and agreed on by the service authentication device and the user equipment.

In this embodiment of the present invention, for specific implementation of the network authentication device 300, further refer to the corresponding description of the foregoing method embodiment.

In the network authentication device 300 shown in FIG. 30, the service authentication device and the user equipment perform service authentication to generate the reference shared key, and then the network authentication device sends the reference shared key to the network authentication device and forwards a network parameter from the network authentication device to the user equipment; and both the network authentication device and the user equipment generate an authentication shared key based on the reference shared key and the network parameter, and perform network authentication based on the authentication shared key to generate the target shared key. That is, the generation of the target shared key is related to service related information, information related to the user equipment, and network related information, improving a security level of the target shared key.

Methods and apparatuses of the embodiments of the present invention are described in detail above. For convenience of better implementing the foregoing solutions of the embodiments of the present invention, correspondingly, a related system of the embodiments of the present invention is provided below.

Referring to FIG. 3I, FIG. 3I is a schematic structural diagram of a network authentication system 310 according to an embodiment of the present invention. The system includes a service authentication device 3101, user equipment 3102, and a network authentication device 3103.

In an optional solution, the service authentication device 3101 is the service authentication device 70 shown in FIG. 7 or the service authentication device 190 shown in FIG. 19; the user equipment 3102 is the user equipment 80 shown in FIG. 8 or the user equipment 200 shown in FIG. 20; and the network authentication device 3103 is the network authentication device 90 shown in FIG. 9 or the network authentication device 210 shown in FIG. 21.

In another optional solution, the service authentication device 3101 is the service authentication device 100 shown in FIG. 10 or the service authentication device 220 shown in FIG. 22; the user equipment 3102 is the user equipment 110 shown in FIG. 11 or the user equipment 230 shown in FIG. 23; and the network authentication device 3103 is the network authentication device 120 shown in FIG. 12 or the network authentication device 240 shown in FIG. 24.

In another optional solution, the service authentication device 3101 is the service authentication device 130 shown in FIG. 13 or the service authentication device 250 shown in FIG. 25; the user equipment 3102 is the user equipment 140 shown in FIG. 14 or the user equipment 260 shown in FIG. 26; and the network authentication device 3103 is the network authentication device 150 shown in FIG. 15 or the network authentication device 270 shown in FIG. 27.

In another optional solution, the service authentication device 3101 is the service authentication device 160 shown in FIG. 16 or the service authentication device 280 shown in FIG. 28; the user equipment 3102 is the user equipment 170 shown in FIG. 17 or the user equipment 290 shown in FIG. 29; and the network authentication device 3103 is the network authentication device 180 shown in FIG. 18 or the network authentication device 300 shown in FIG. 30.

The network authentication system shown in FIG. 1 includes the network authentication device, the service authentication device, and the user equipment. In an optional solution, the devices collaborate with each another to perform the following steps.

Step S3101: The network authentication device generates an access token encrypted by using an initial shared key, where the initial shared key is a key pre-shared by the network authentication device and the service authentication device. The network authentication device includes a generating unit, specifically the network authentication device performs step S3101 by using the generating unit, and the generating unit may implement step S3101 based on a processor of the network authentication device.

Step S3102: The network authentication device sends the access token to the user equipment. The network authentication device includes a sending unit, the network authentication device specifically performs step S3102 by using the sending unit, and the sending unit may implement step S3102 based on a transceiver of the network authentication device.

Step S3103: The user equipment receives the access token and sends the access token to the service authentication device. The user equipment includes a transceiver unit, the user equipment specifically performs step S3103 by using the transceiver unit, and the transceiver unit may implement step S3103 based on a transceiver of the user equipment.

Step S3104: The service authentication device receives the access token and verifies correctness of the access token by using the initial shared key. The service authentication device includes a receiving unit, the service authentication device specifically performs step S3104 by using the receiving unit, and the receiving unit may implement step S3104 based on a transceiver of the service authentication device.

Step S3105: The service authentication device sends a verification success message to the user equipment when the service authentication device verifies that the access token is correct, so as to notify the user equipment that service authentication is successfully completed between the service authentication device and the user equipment. The service authentication device includes a sending unit, the service authentication device specifically performs step S3105 by using the sending unit, and the sending unit may implement step S3105 based on the transceiver of the service authentication device.

In an optional solution, the access token includes a target shared key, and the user equipment and the service authentication device are configured to: when service authentication is successfully completed between the user equipment and the service authentication device, use the target shared key in the access token or a shared key derived from the target shared key as a shared key that protects secure data transmission and that is negotiated and agreed on by the service authentication device and the user equipment. In some embodiments, the target shared key is a shared key obtained by performing network authentication by the network authentication device and the user equipment.

In another optional solution, the access token includes at least one of a network parameter, a service parameter, an identity of the user equipment, and a fresh parameter nonce. In some embodiments, the service parameter includes at least one of a service sequence number of the target service, an identifier of a key management center, a session identifier, a link identifier, an application identifier, a service identifier, a service level, a service data rate, a time delay, and a service server identifier; and the network parameter includes at least one of an operator identifier, an access network identifier, a service network identifier, a network type identifier, a network identifier of a local area network, a slice identifier, a bearer identifier, a quality of service identifier, and a flow identifier.

Further, the access token may further include a message authentication code that is directed to at least one of the network parameter, the service parameter, the identity of the user equipment, and the fresh parameter nonce and that is generated by using the initial shared key. When the access token includes the message authentication code, in step S3104, correctness of the message authentication code further needs to be verified based on the initial shared key, and in step S3105, that the service authentication device sends a verification success message to the user equipment when the service authentication device verifies that the access token is correct is specifically: The service authentication device sends a verification success message to the user equipment when the service authentication device verifies that the access token is correct and verifies that the message authentication code is correct. For the network authentication system described herein, further refer to the corresponding description in the embodiments corresponding to FIG. 6D and FIG. 6E.

The network authentication system shown in FIG. 1 includes the network authentication device, the service authentication device, and the user equipment. In an optional solution, the devices collaborate with each another to perform the following steps.

Step S3201: The user equipment UE and the network authentication device perform network authentication. Each of the user equipment and the network authentication device includes an authentication unit, the user equipment and the network authentication device specifically perform step S3201 by using the authentication unit, and the authentication unit may implement step S3201 based on a processor of the user equipment and a processor of the network authentication device.

Step S3202: The network authentication device generates an authentication token and expiration information of the token after network authentication succeeds, where the expiration information is used to indicate when the token expires; and may further generate range information, where the range information is used to indicate which service authentication device may use the token; or the range information is used to indicate which user equipment may use the token. The network authentication device includes a generating unit, the network authentication device specifically performs step S3202 by using the generating unit, and the generating unit may implement step S3202 based on a processor of the network authentication device.

Step S3203: The network authentication device sends the token to the UE; and may further send related information about the network authentication device, where the related information about the network authentication device is used to indicate that the token is from the network authentication device. The network authentication device includes a sending unit, the network authentication device specifically performs step S3203 by using the sending unit, and the sending unit may implement step S3203 based on a transceiver of the network authentication device.

Step S3204: The user equipment sends the token to the service authentication device and the related information about the network authentication device. The user equipment includes a sending unit, the user equipment specifically performs step S3204 by using the sending unit, and the sending unit may implement step S3204 based on a transceiver of the user equipment.

Step S3205: The service authentication device receives the token and the related information about the network authentication device, and sends the token to the network authentication device based on the related information about the network authentication device, where a sent message may further include at least one of a UE ID and related information about the service authentication device. The service authentication device includes a receiving unit, the service authentication device specifically performs step S3205 by using the receiving unit, and the receiving unit may implement step S3205 based on a transceiver of the service authentication device.

Step S3206: The network authentication device receives the token, determines whether the token is a token generated by the network authentication device, and further determines whether the token expires based on the expiration information if the token is a token generated by the network authentication device, where if the token does not expire, it indicates that the token is verified successfully. In some embodiments, when the network authentication device generates range information, the network authentication device further needs to determine, based on the range information, whether the service authentication device sending the token is a service authentication device allowed in the range information, where if the service authentication device sending the token is an allowed service authentication device and the token does not expire, it indicates that the token is verified successfully. In some embodiments, when the range information is used to indicate which user equipment may use the token, the network authentication device further needs to determine, based on the range information, whether the user equipment is user equipment allowed in the range information, where if the user equipment is allowed user equipment, the service authentication device is an allowed service authentication device, and the token does not expire, it indicates that the token is verified successfully. The network authentication device includes a judging unit, the network authentication device specifically performs step S3206 by using the judging unit, and the judging unit may implement step S3206 based on a processor of the network authentication device.

In some embodiments, the related information about the service authentication device is not included in step S3205, and the network authentication device may determine the related information about the service authentication device based on a source from which the token is received.

In some embodiments, the user equipment may send, to the service authentication device, related information about the user equipment used when whether the user equipment is user equipment allowed in the range information is determined, and then the service authentication device sends the related information about the user equipment and the token together to the network authentication device in step S3205.

Step S3207: If the token is verified successfully, the network authentication device sends a message to the service authentication device to notify the service authentication device that the token is verified successfully. The network authentication device includes a sending unit, the network authentication device specifically performs step S3207 by using the sending unit, and the sending unit may implement step S3207 based on a transceiver of the network authentication device.

Step S3208: The service authentication device sends a message to the UE to notify the UE that the token is verified successfully. Both the service authentication device and the UE learn that the token is verified successfully, it indicates that authentication between the service authentication device and the UE succeeds. The service authentication device includes a sending unit, the service authentication device specifically performs step S3208 by using the sending unit, and the sending unit may implement step S3208 based on the transceiver of the service authentication device.

The network authentication system shown in FIG. 1 includes the network authentication device, the service authentication device, and the user equipment. In an optional solution, the devices collaborate with each another to perform the following steps.

Step S3301: The user equipment UE and the network authentication device perform network authentication, where a shared key generated based on network authentication is a network shared key K1; and each of the user equipment and the network authentication device includes an authentication unit, the user equipment and the network authentication device specifically perform step S3301 by using the authentication unit, and the authentication unit may implement step S3301 based on a processor of the network authentication device and a processor of the user equipment.

Step S3302: The UE generates an access token based on at least one of a network parameter, a service parameter, an identity of the user equipment, and a fresh parameter nonce, and encrypts the access token by using the network shared key K1. In some embodiments, token=Enc_K1_(K2, basic information, MAC), that is, the access token is generated by encrypting K2, the basic information, and MAC by using K1, where K2 is determined by the UE and may be subsequently used as a shared key for protecting data transmission between the user equipment and the service authentication device, the basic information includes at least one of the network parameter, the service parameter, the identity of the user equipment, and the fresh parameter nonce. In some embodiments, the user equipment may pre-obtain, from the network authentication device and the service authentication device, information that needs to be used; and MAC=MAC_K1_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated based on the network shared key K1. The user equipment includes a generating unit, the user equipment specifically performs step S3302 by using the generating unit, and the generating unit may implement step S3302 based on the processor of the user equipment.

It should be noted that, if the fresh parameter nonce is used in the foregoing derivation formula, the UE further needs to send the used fresh parameter to the service authentication device, the service authentication device forwards the fresh parameter to the network authentication device, and subsequently the network authentication device may verify freshness of the token by using the fresh parameter.

Further, a shared key K2 may be a configured random parameter, may be the network shared key K1, or may be a shared key derived from the network shared key K1. For example, K2=KDF(K1, basic information), that is, the shared key K2 is calculated based on the network shared key K1 and the basic information by using a preset algorithm.

Step S3303: The UE sends the token to the service authentication device. The user equipment includes a sending unit, the user equipment specifically performs step S3303 by using the sending unit, and the sending unit may implement step S3303 based on a transceiver of the user equipment.

Step S3304: The service authentication device receives the token sent by the UE and forwards the token the network authentication device, and the service authentication device may further send related information (which includes but is not limited to the UE ID) of the UE to the network authentication device, where the related information may be sent by the UE to the service authentication device, and the related information may be used to distinguish between the UE and another device within a range. The service authentication device includes a receiving unit, the service authentication device specifically performs step S3304 by using the receiving unit, and the receiving unit may implement step S3304 based on a transceiver of the service authentication device.

Step S3305: The network authentication device receives the token and the related information about the UE; finds, based on the related information about the UE, the network shared key K1 generated by performing network authentication with the UE, and decrypts the token by using K1 to obtain the shared key K2, the basic information, and the message authentication code MAC; and then verifies correctness of MAC based on K1, where if MAC is verified correctly, it indicates that the token is verified successfully. The network authentication device includes a receiving unit, the network authentication device specifically performs step S3305 by using the receiving unit, and the receiving unit may implement step S3305 based on a transceiver of the network authentication device.

Step S3306: If the token is verified successfully, the network authentication device sends a message to the service authentication device to notify the service authentication device that the token is verified successfully, where the notification message further includes the shared key K2 obtained from the token. The network authentication device includes a sending unit, the network authentication device specifically performs step S3306 by using the sending unit, and the sending unit may implement step S3306 based on a transceiver of the network authentication device.

Step S3307: The service authentication device sends a message to the UE to notify the UE that the token is verified successfully. Both the service authentication device and the UE learn that the token is verified successfully, it indicates that authentication between the service authentication device and the UE succeeds. The service authentication device includes a sending unit, the service authentication device specifically performs step S3307 by using the sending unit, and the sending unit may implement step S3307 based on the transceiver of the service authentication device.

Step S3308: The UE and the service authentication device use K2 as a shared key used to protect secure data transmission between the UE and the service authentication device. Each of the user equipment and the service authentication device includes a sharing unit, the user equipment and the service authentication device specifically perform step S3308 by using the sharing unit, and the sharing unit may implement step S3308 based on the processor of the user equipment and a processor of the service authentication device.

In some embodiments, the UE and the service authentication device further derive a shared key K3 based on K2. For example, K3=KDF(K2, basic information), that is, K3 is calculated based on K2 and the basic information by using a preset algorithm, and K3 is used to protect secure data transmission between the UE and the service authentication device.

The network authentication system shown in FIG. 1 includes the network authentication device, the service authentication device, and the user equipment. In an optional solution, the devices collaborate with each another to perform the following steps.

Step S3401: The user equipment UE and the network authentication device perform network authentication, where a shared key generated based on network authentication is a network shared key K1; and each of the network authentication device and the user equipment includes an authentication unit, the network authentication device and the user equipment specifically perform step S3401 by using the authentication unit, and the authentication unit may implement step S3401 based on a processor of the network authentication device and a processor of the user equipment.

Step S3402: The UE generates an access token based on at least one of a network parameter, a service parameter, an identity of the user equipment, and a fresh parameter nonce. In some embodiments, the token is a message authentication code MAC, and MAC=MAC_K1_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated based on the network shared key K1. The user equipment includes a generating unit, the user equipment specifically performs step S3402 by using the generating unit, and the generating unit may implement step S3402 based on the processor of the user equipment.

It should be noted that, if the fresh parameter nonce is used in the foregoing derivation formula, the UE further needs to send the used fresh parameter to the service authentication device, the service authentication device sends the fresh parameter to the network authentication device, and subsequently the network authentication device may verify freshness of the token by using the fresh parameter.

Step S3403: The UE sends the token to the service authentication device. The user equipment includes a sending unit, the user equipment specifically performs step S3403 by using the sending unit, and the sending unit may implement step S3403 based on a transceiver of the user equipment.

Step S3404: The service authentication device receives the token sent by the UE and forwards the token the network authentication device, and the service authentication device may further send related information about the UE to the network authentication device, where the related information may be sent by the UE to the service authentication device, and the related information may be used to distinguish between the UE and another device within a range. For example, the related information about the user equipment may be the identity (UEID) of the user equipment. The service authentication device includes a transceiver unit, the service authentication device specifically performs step S3404 by using the transceiver unit, and the transceiver unit may implement step S3404 based on a transceiver of the service authentication device.

Step S3405: The network authentication device receives the token and the related information about the UE; and finds, based on the related information about the UE, the network shared key K1 generated by performing network authentication with the UE, and verifies correctness of MAC based on K1, where if MAC is verified correctly, it indicates that the token is verified successfully. The network authentication device includes a receiving unit, the network authentication device specifically performs step S3405 by using the receiving unit, and the receiving unit may implement step S3405 based on a transceiver of the network authentication device.

Step S3406: If the token is verified successfully, the network authentication device sends a message to the service authentication device to notify the service authentication device that the token is verified successfully. The network authentication device includes a sending unit, the network authentication device specifically performs step S3406 by using the sending unit, and the sending unit may implement step S3406 based on a transceiver of the network authentication device.

Step S3407: The service authentication device sends a message to the UE to notify the UE that the token is verified successfully. Both the service authentication device and the UE learn that the token is verified successfully, it indicates that authentication between the service authentication device and the UE succeeds. The service authentication device includes a transceiver unit, the service authentication device specifically performs step S3407 by using the transceiver unit, and the transceiver unit may implement step S3407 based on a transceiver of the service authentication device.

It should be noted that, the following solution may further be derived readily based on the foregoing solution. That is, UE first establishes bidirectional authentication with a service authentication device, and the UE or the service authentication device generates a token; and after the UE sends the token to a network authentication device, the network authentication device may verify correctness of the token, or may send the token to the service authentication device, and the service authentication device verifies correctness of the token, and sends a verification result to the network authentication device. This is equivalent to that the service authentication device and the network authentication device related to FIG. 6C and FIG. 6H are interchanged. Additionally, the token includes but is not limited to the following two situations. Situation 1: token=Enc_K0_(K2, basic information, MAC_K0_(basic information and/or nonce)), and situation 2: token=MAC_K0_(basic information and/or nonce). For understanding of the two situations, refer to the above description. Details are not described herein again.

For convenience of understanding, an example in which a token is generated by a service authentication device is described below. A situation in which a token is generated by UE may be deduced by analogy.

The network authentication system shown in FIG. 1 includes the network authentication device, the service authentication device, and the user equipment. In an optional solution, the devices collaborate with each another to perform the following steps.

Step S3501: User equipment UE and the service authentication device perform service authentication, where a generated shared key is a service shared key K1; and the UE may send related information about a network authentication device to the service authentication device before, after, or during service authentication, so as to indicate that the UE needs to perform authentication with the network authentication device. Each of the user equipment and the service authentication device includes an authentication unit, the user equipment and the service authentication device specifically perform step S3501 by using the authentication unit, and the authentication unit may implement step S3501 based on the processor of the user equipment and a processor of the service authentication device.

Step S3502 The service authentication device determines, based on the related information about the network authentication device, an initial shared key K0 pre-shared by the network authentication device and the service authentication device; and generates an access token based on at least one of a network parameter, a service parameter, an identity of the user equipment, and a fresh parameter nonce. In some embodiments, token=Enc_K0_(K2, basic information, MAC), that is, the access token is generated by encrypting K2, the basic information, and MAC by using the initial shared key K0, where K2 is determined by the service authentication device and may be used as a shared key for protecting data transmission between the user equipment and the network authentication device, the basic information includes at least one of the network parameter, the service parameter, the identity of the user equipment, and the fresh parameter nonce, and MAC=MAC_K0_(fresh parameter and/or basic information). That is, MAC is a message authentication code of the basic information, a message authentication code of the fresh parameter (the fresh parameter here may be the same as or different from a fresh parameter in the basic information), or a message authentication code of the basic information and the fresh parameter; and the message authentication code MAC is generated by using the initial shared key K0. The service authentication device includes a determining unit, the service authentication device specifically performs step S3502 by using the determining unit, and the determining unit may implement step S3502 based on the processor of the service authentication device.

It should be noted that, if the fresh parameter nonce is used in the foregoing derivation formula, the service authentication device further needs to send the used fresh parameter to the UE, the UE sends the used fresh parameter to the network authentication device, and subsequently the network authentication device may verify freshness of the token by using the fresh parameter.

Further, a shared key K2 may be a configured random parameter, may be the service shared key K1, or may be a shared key derived from the service shared key K1. For example, K2=KDF(K1, basic information), that is, the shared key K2 is calculated based on the service shared key K1 and the basic information by using a preset algorithm.

Further, the related information about the network authentication device is information that can be used to distinguish between the network authentication device and another device within a range, for example, may be an IP address of the network authentication device.

Step S3503: The service authentication device sends K2 and the token to the UE, and may further send related information about the service authentication device, where the related information about the service authentication device may include the service parameter. The service authentication device includes a sending unit, the service authentication device specifically performs step S3503 by using the sending unit, and the sending unit may implement step S3503 based on the transceiver of the service authentication device.

Step S3504: The UE receives K2 and the token and sends the token and the related information about the service authentication device to the network authentication device. The UE may generate the related information about the service authentication device, or may receive, when, before, or after the UE and the service authentication device perform service authentication, the related information about the service authentication device sent by the service authentication device. Preferably, the UE receives, in step S3503, the related information about the service authentication device sent by the service authentication device. The user equipment includes a transceiver unit, the user equipment specifically performs step S3504 by using the transceiver unit, and the transceiver unit may implement step S3504 based on a transceiver of the user equipment.

Step S3505: The network authentication device receives the token and the related information about the service authentication device, determines, based on the related information about the service authentication device, the initial shared key K0 pre-shared by the service authentication device and the service authentication device, and decrypts the token by using K0 to obtain the shared key K2, the basic information, and the message authentication code MAC; and then verifies correctness of MAC based on K0, where after MAC is verified successfully, it indicates that the network authentication device verifies the token successfully. Therefore, the network authentication device uses K2 as a shared key used to protect data transmission between the network authentication device and the UE. The network authentication device includes a receiving unit, the network authentication device specifically performs step S3505 by using the receiving unit, and the receiving unit may implement step S3505 based on a transceiver of the network authentication device.

Step S3506: The network authentication device sends a message to the UE to notify the UE that the token is verified successfully, and correspondingly, the UE receives the message. The network authentication device includes a sending unit, the network authentication device specifically performs step S3506 by using the sending unit, and the sending unit may implement step S3506 based on a transceiver of the network authentication device.

Step S3507: The network authentication device and the UE use the shared key K2 as a shared key used to protect secure data transmission between the UE and the network authentication device. Each of the network authentication device and the user equipment includes a sharing unit, the network authentication device and the user equipment specifically perform step S3507 by using the sharing unit, and the sharing unit may implement step S3507 based on a processor of the network authentication device and a processor of the user equipment.

In some embodiments, the UE and the network authentication device further derive a shared key K3 based on K2. For example, K3=KDF(K2, basic information), that is, K3 is calculated based on K2 and the basic information by using a preset algorithm, and K3 is used to protect secure data transmission between the UE and the network authentication device.

In some embodiments, a shared key for encrypting the token is K1 other than K0, and after receiving the token, the network authentication device forwards the token and related information about the UE to the service authentication device based on the related information about the service authentication device; and the service authentication device determines, based on the related information about the UE, the shared key K1 generated based on authentication with the UE, then decrypts the token based on K1, and verifies correctness of MAC in the token. If MAC is verified successfully, it indicates that authentication between the UE and the network authentication device succeeds. Therefore, K2 is sent to the network authentication device, so that the UE and the network authentication device use K2 as a shared key that protects secure data transmission. In some embodiments, the related information about the UE may be sent by the UE to the service authentication device, and the related information about the UE may be the identity of the UE.

It should be noted that, the foregoing network authentication system may further be correspondingly expanded to obtain a new network authentication system, and an expansion idea is as follows:

K1 is a shared key between the UE and the network authentication device, and includes but is not limited to at least one Kasme, a cipher key (English: cipher key, CK for short), and an integrity key (English: integrity key, IK for short).

Additionally, a token may also be calculated by using a form of an asymmetric password. For example, token=Enc_PK_service_(K2, (nonce1, basic information), signature=MAC_SK_network_(nonce2, basic information)). PK_service indicates a public key parameter of a service provided by the service authentication device, and SK_network indicates a secret key parameter of an operator network in which the network authentication device is located. In this case, the service authentication device may perform decryption based on a secret key SK_service of the service authentication device to decipher the token; and verify correctness of a signature in the token by using a public key PK_network of the operator network in which the network authentication device is located. In this case, the token is verified more flexibly, and verification may be completed without need of performing network authentication and interaction with the network authentication device. Additionally, an encryption and signature algorithm herein may be an asymmetric password technology based on public key infrastructure (English: Public key infrastructure, PKI for short) or the like, or may be an identity-based password technology.

In this embodiment of the present invention, there are a plurality of manners in which the network authentication device and the user equipment perform network authentication based on the second shared key to generate the target shared key.

In an optional solution, the network authentication device may include a CP-AU, and that the network authentication device and the user equipment perform network authentication based on the second shared key to generate the target shared key is specifically:

Step S4201: The UE sends a network access request message to the CP-AU, where the network access request message includes an identity UEID of the UE and a service identifier related to a target service, the network access request message may trigger a network authentication process, and the target service is a service currently performed by the UE.

Step S4202: The CP-AU receives the network access request message, processes the UEID and the service identifier by using a preset rule or algorithm or negotiates and interacts with another network element to obtain a second shared key Kser, and sends a subscription data request message to a subscriber repository (Subscriber Repository), where the subscriber repository stores subscription information of the UE, for example, a SIM card number of the UE.

Step S4203: The subscriber repository receives the subscription data request message, determines, based on the UEID, a preset key K (in some embodiments, K is the SIM card number) pre-shared by the subscriber repository and the UE, and then calculates an authentication vector AV based on the preset key K, where the authentication vector includes information such as a random number RAND, a network-side authentication token (English: Authentication Token, AUTN for short), an expected response (English: Expected Response, XRES for short), and a base key $K_{-NG}$ (for example, $K_{-NG}$ is an access security management entity key ($K_{ASME}$)), and $K_{-NG}$ is generated based on the preset key K and a related network parameter. For convenience of distinguishing, the expected response in the AV may be referred to as an initial expected response, the network-side authentication token includes a message authentication code, and the message authentication code may be referred to as an initial network-side message authentication code MAC.

Step S4204: The subscriber repository sends the authentication vector to the CP-AU.

Step S4205: The CP-AU receives the authentication vector sent by the subscriber repository, and calculates a service reference message authentication code MAC' based on the second shared key Kser and the initial network-side message authentication code MAC by using a preset message authentication code algorithm. For example, the service reference message authentication code MAC'=MAC(Kser, MAC, (at least one of nonce1, RAND, SQN, NAS COUNT, and UE ID)). That is, two factors: Kser and MAC need to be considered when MAC' is generated. In addition, parameters such as a fresh parameter nonce1, RAND, a sequence number (English: Sequence Number, SQN for short), NAS COUNT, and UEID may further be considered. If generating of MAC' includes the fresh parameter nonce1 selected by the CP-AU, nonce1 may be sent by the CP-AU to the UE. The message authentication code algorithm may be HMACsha-256 or the like.

Step S4206: The CP-AU sends an authentication request message to the UE, where the authentication request message includes the random number RAND, a key index $KSI_{NG}$ of $K_{-NG}$, a new network-side authentication token AUTN'. Herein, AUTN'=SQN xor (XOR) AK∥AMF∥MAC', and in the foregoing, AUTN=SQN xor (XOR) AK∥AMF∥MAC. That is, the CP-AU replaces the MAC in the AUTN sent by the subscriber repository with the service reference message authentication code MAC', and then sends the new network-side authentication token AUTN' formed after replacement to the UE. The CP-AU further needs to calculate a reference expected response XRES' based on XRES and Kser by using the preset response algorithm, and a moment at which the CP-AU calculates the reference expected response XRES' is not limited herein. For example, the moment may be after step S4206 and before step S4207; for another example, the moment is after step S4210 and before step S4211; and other possibilities may further exist. Examples are not listed one by one herein.

Step S4207: The UE receives the authentication request message (which may also be referred to as a "user authentication request"), and then calculates information such as a user-side authentication token $AUTN_{UE}$ and a response (English: Response, RES for short) based on information in the authentication request message by using an Authentication and Key Agreement (English: Authentication and Key Agreement, AKA for short) protocol key deduction algorithm, where a message authentication code in the user-side authentication token may be referred to as an initial user-side message authentication code, and the user-side response may be referred to as an initial response.

Step S4208: The UE calculates a user-side reference message authentication code MAC" based on the second shared key Kser and the initial user-side message authentication code MAC by using the foregoing preset message authentication code algorithm, and then determines whether the service reference message authentication code MAC' is the same as the user-side reference message authentication code MAC", where if the service reference message authentication code MAC' is the same as the user-side reference message authentication code MAC", the UE successfully authenticates the CP-AU. Because information used in an authentication process is related to a service and related to a network, it may be considered that the UE successfully authenticates the network and the target service. It should be noted that, the UE pre-calculates the second shared key Kser based on an existing UEID in the UE and the service identifier, or the UE pre-stores the second shared key Kser.

Step S4209: If the UE successfully authenticates the CP-AU, the UE calculates a reference response RES' based on RES and Kser by using the preset response algorithm, for example, RES'=MAC(Kser, RES, (at least one of nonce1, nonce2, RAND, SQN, NAS COUNT, and UE ID)), that is, Kser and RES need to be considered to calculate RES'. In addition, information such as nonce1, nonce2, RAND, SQN, NAS COUNT, and UE ID may further be considered; and then, the UE sends RES' to the CP-AU. If generating of RES' includes the fresh parameter nonce 2 selected by the UE, nonce2 may be sent by the UE to the CP-AU.

Step S4210: The CP-AU receives RES'.

Step S4211: The CP-AU determines whether the reference expected response XRES' calculated by the CP-AU is the same as the reference response RES' sent by the UE, where if the reference expected response XRES' calculated by the CP-AU is the same as the reference response RES' sent by the UE, the CP-AU successfully authenticates the UE, that is, the network and the service successfully authenticate the UE. In some embodiments, if the reference expected response XRES' calculated by the CP-AU is not the same as the reference response RES' sent by the UE, service authentication performed by the CP-AU on the UE does not succeed. In this case, the CP-AU may send an authentication reject message to the UE, and the authentication reject message indicates that the service authentication does not succeed.

Step S4212: After the UE successfully authenticates the CP-AU, and the CP-AU successfully authenticates the UE, the UE and the CP-AU perform calculation based on $K_{-NG}$ and Kser by using a same key generating algorithm to generate a key, where the generated key is a target shared key generated based on bidirectional authentication between the UE and the CP-AU. The key generating algorithm that is used by the UE and the CP-AU is temporarily not limited herein. It may be understood that, the UE may obtain $K_{\_NG}$ by using an index $KSI_{\_NG}$ of $K_{\_NG}$. Additionally, the UE may generate the target shared key after the CP-AU is authenticated successfully, and the CP-AU may generate the target shared key after the UE is authenticated successfully.

Figure 32:
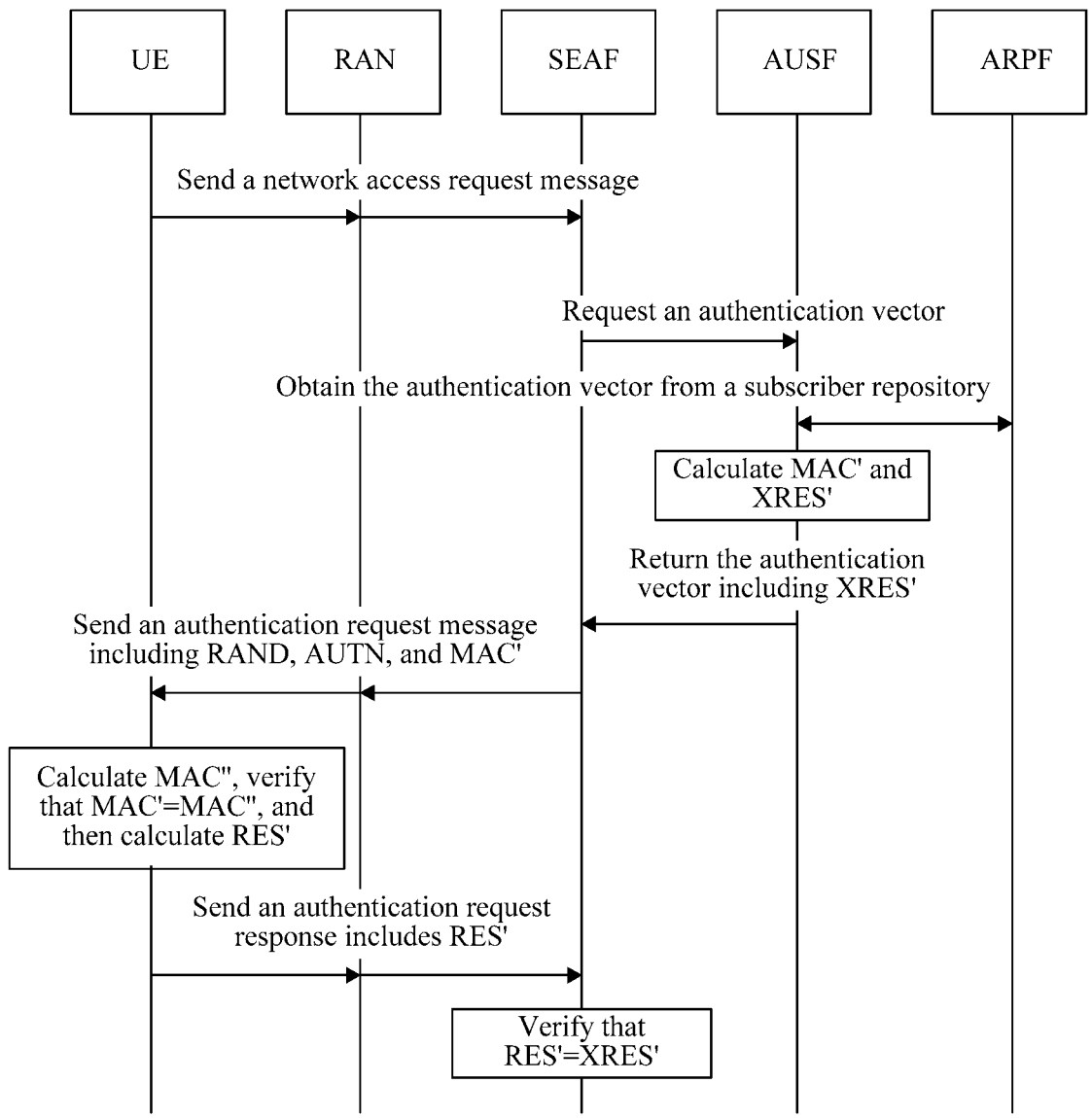
FIG. 32 is a schematic flowchart of another network authentication method according to an embodiment of the present invention.

Referring to FIG. 32, FIG. 32 is a schematic flowchart of another network authentication method according to an embodiment of the present invention. A process is a possible representation form of steps S4201 to S4212. In the possible representation form, information exchanged between UE and a CP-AU may pass through a radio access network (English: Radio Access Network, RAN for short), and the CP-AU may further be divided into a plurality of smaller network elements. It can be learned from the above description that, functions undertaken by the CP-AU include operations such as obtaining an authentication vector from a subscriber repository, generating MAC' and XRES' based on the authentication vector fed back by the subscriber repository, feeding back an authentication request message to the UE, and verifying RES' and XRES', and these operations may be separately undertaken by the plurality of network elements into which the CP-AU is divided. For example, the CP-AU may be divided into a security anchor function (English: Security Anchor Function, SEAF for short), (English: Authentication Server Function, AUSF for short), and the like. The obtaining an authentication vector from a subscriber repository and the generating MAC' and XRES' based on the authentication vector fed back by the subscriber repository are undertaken by the AUSF, and the feeding back an authentication request message to the UE and the verifying RES' and XRES' are undertaken by the SEAF. In a process in which the SEAF and the AUSF undertake respective operations, some negotiation may further need to be performed between the SEAF and the AUSF. Additionally, the subscriber repository may be an authentication credential repository and processing function (English: Authentication Credential Repository and Processing Function, ARPF for short).

In another optional solution, the network authentication device may include a CP-AU, and that the network authentication device and the user equipment perform network authentication based on the second shared key to generate the target shared key is specifically:

Step S4301: The UE sends a network access request message to the CP-AU, where the network access request message includes an identity UEID of the UE and a service identifier of a target service, and the target service is a service currently performed by the UE.

Step S4302: The CP-AU receives the network access request message, obtains the second shared key Kser based on the UEID and the service identifier, and sends a subscription data request message to a subscriber repository (Subscriber Repository), where the subscriber repository stores subscription information of the UE, for example, stores a SIM card number of the UE.

Step S4303: The subscriber repository receives the subscription data request message, determines, based on the UEID, a preset key K (in some embodiments, K is the SIM card number) pre-shared by the subscriber repository and the UE, and then calculates an authentication vector AV based on the preset key K, where the authentication vector includes information such as a random number RAND, a network-side authentication token (English: Authentication Token, AUTN for short), an expected response (English: Expected Response, XRES for short), and a base key $K_{\_NG}$ (for example, an access security management entity key (English: Key Access Security Management Entity, $K_{ASME}$ for short)), and $K_{\_NG}$ is generated based on the preset key K and a related network parameter. For convenience of distinguishing, the expected response in the AV may be referred to as an initial expected response, the network-side authentication token includes a message authentication code, and the message authentication code may be referred to as an initial network-side message authentication code MAC.

Step S4304: The subscriber repository sends the authentication vector to the CP-AU.

Step S4305: The CP-AU receives the authentication vector sent by the subscriber repository, and calculates an additional network-side message authentication code MAC1 based on information such as RAND and the second shared key Kser by using a preset first message authentication code algorithm. For example, the additional network-side message authentication code MAC1=MAC(Kser, RAND, (at least one of nonce1, MACSQN, NAS COUNT, and UE ID)). That is, Kser and RAND need to be considered when MAC1 is generated. In addition, parameters such as the initial network-side message authentication code, a fresh parameter nonce1, MAC, a sequence number (English: Sequence Number, SQN for short), NAS COUNT, and UEID may further be considered. If generating of MAC1 includes the fresh parameter nonce1 selected by the CP-AU, nonce1 may be sent by the CP-AU to the UE. The message authentication code algorithm may be HMACsha-256 or the like.

Step S4306: The CP-AU sends an authentication request message (or referred to as a "user authentication request") to the UE, where the authentication request message includes information such as the random number RAND, a key index $KSI_{\_NG}$ of $K_{\_NG}$, the initial network-side message authentication code MAC, and the additional network-side message authentication code MAC1. MAC and MAC1 may exist in the network-side authentication token AUTN, and when MAC and MAC1 exist in the network-side authentication token AUTN, AUTN=SQN xor (XOR) AK||AMF-||MAC||MAC1. Alternatively, MAC1 may be not stored in the AUTN.

Step S4307: The UE receives the authentication request message, and then calculates information such as a user-side authentication token $AUTN_{UE}$ and a response (English: Response, RES for short) based on information in the authentication request message by using an Authentication and Key Agreement (English: Authentication and Key Agreement, AKA for short) protocol key deduction algorithm, where a message authentication code in the user-side authentication token may be referred to as an initial user-side message authentication code, and the response in the user-side authentication token may be referred to as an initial response.

Step S4308: The UE calculates an additional user-side message authentication code MAC1' based on RAND, the second shared key Kser, and MAC likewise by using the foregoing preset first message authentication code algorithm, and then determines whether the additional network-side message authentication code MAC1 is the same as the additional user-side message authentication code MAC1' and whether the initial user-side message authentication code is the same as the initial network-side message authentication code, where if the additional network-side message authentication code MAC1 is the same as the additional user-side message authentication code MAC1' and the initial user-side message authentication code is the same as the initial network-side message authentication code, the UE successfully authenticates the CP-AU. It should be noted that, the UE pre-calculates the second shared key Kser based on the UEID existing in the UE and the service identifier. Because information used in an authentication process is related to a service and related to a network, it may be considered that the UE successfully authenticates the network and the target service. It may be understood that, when the initial network-side message authentication code is used at the time of generating the additional network-side message authentication code, the UE needs to first determine whether the initial network-side message authentication code is the same as the initial user-side message authentication code, and then determines, if the initial network-side message authentication code is the same as the initial user-side message authentication code, whether the additional network-side message authentication code is the same as the additional user-side message authentication code.

Step S4309: If the UE successfully authenticates the CP-AU, the UE calculates a user-side response message authentication code MAC2 based on Kser and RAND by using a preset second message authentication code algorithm, for example, MAC2=MAC(Kser, RES, (at least one of nonce1, nonce2, SQN, NAS COUNT, and UE ID)), that is, Kser and RAND need to be considered to calculate MAC2. In addition, parameters such as RES, nonce1, nonce2, SQN, NAS COUNT, and UE ID may further be considered; and then, the UE sends the initial response RES and the user-side response message authentication code MAC2 to the CP-AU. If generating of MAC2 includes the fresh parameter nonce 2 selected by the UE, nonce2 may be sent by the UE to the CP-AU.

Step S4310: The CP-AU receives RES and MAC2, and then calculates a network-side response message authentication code MAC2' based on Kser likewise by using the preset second message authentication code algorithm.

Step S4311: The CP-AU determines whether the initial expected response XRES is the same as the initial response RES sent by the UE and whether the network-side response message authentication code MAC2' is the same as the user-side response message authentication code MAC2; and if the initial expected response XRES is the same as the initial response RES sent by the UE and the network-side response message authentication code MAC2' is the same as the user-side response message authentication code MAC2, the CP-AU successfully authenticates the UE, that is, the network successfully authenticates the UE. In some embodiments, if the initial expected response XRES is not the same as the initial response RES sent by the UE and/or the network-side response message authentication code MAC2' is not the same as the user-side response message authentication code MAC2, the CP-AU unsuccessfully authenticates the UE. In this case, the CP-AU may send an authentication reject message to the UE, and the authentication reject message is used to correspondingly indicate that the network or the service unsuccessfully authenticates the UE. It may be understood that, when the initial response RES used at the time of calculating the user-side response message authentication code, the CP-AU needs to first determine whether the initial response RES is the same as the initial expected response, and then determines, if the initial response RES is the same as the initial expected response, whether the network-side response message authentication code is the same as the user-side response message authentication code.

Step S4312: After the UE successfully authenticates the CP-AU, and the CP-AU successfully authenticates the UE, the UE and the CP-AU perform calculation based on $K_{ASME}$ and Kser by using a same key generating algorithm to generate a key, where the generated key is a target shared key generated based on bidirectional authentication between the UE and the CP-AU. The key generating algorithm that is used by the UE and the CP-AU is temporarily not limited herein. It may be understood that, the UE may obtain $K_{\_NG}$ by using an index $KSI_{\_NG}$ of $K_{\_NG}$. Additionally, the UE may generate the target shared key after the CP-AU is authenticated successfully, and the CP-AU may generate the target shared key after the UE is authenticated successfully.

Figure 33:
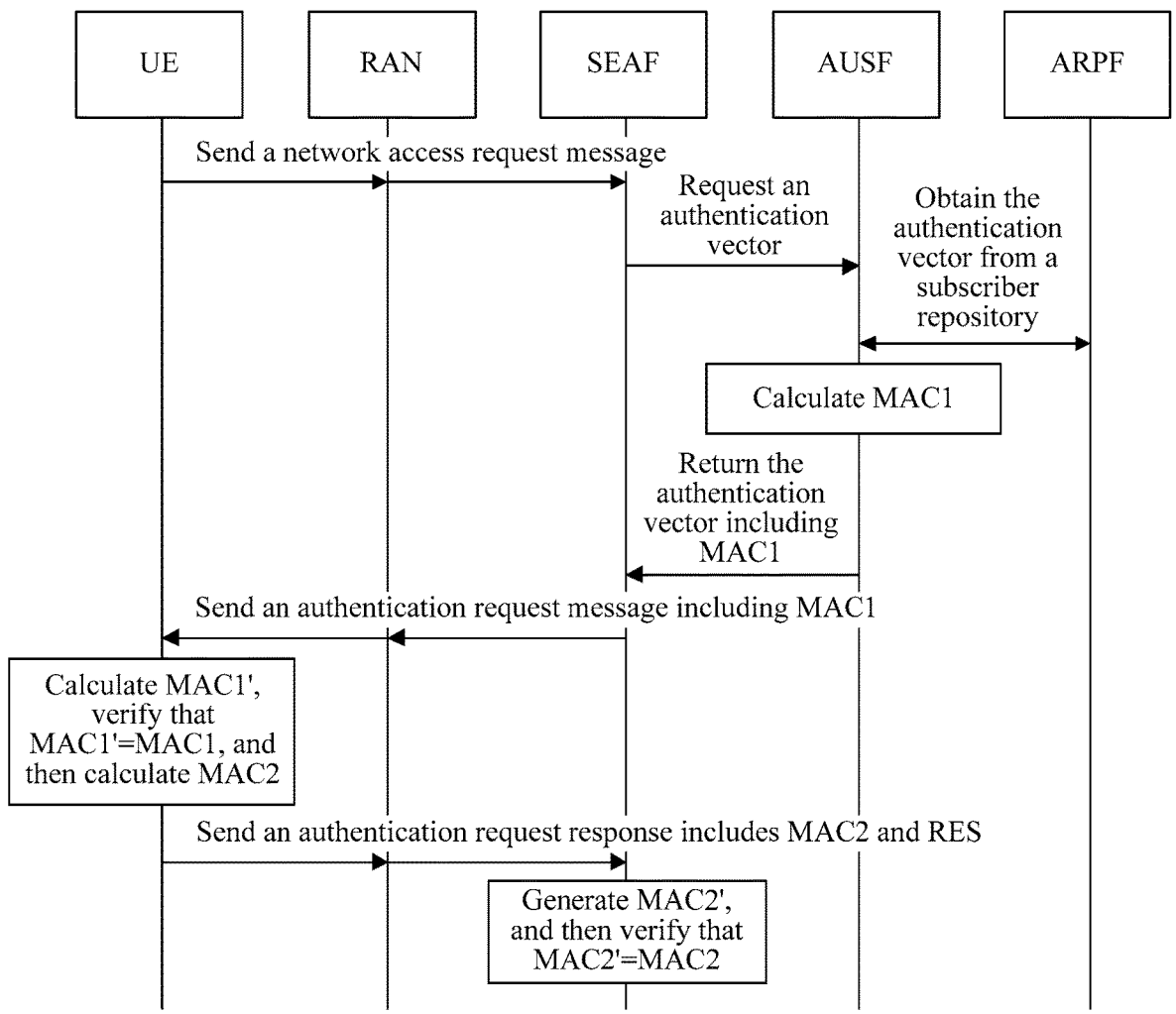
FIG. 33 is a schematic flowchart of another network authentication method according to an embodiment of the present invention.

Referring to FIG. 33, FIG. 33 is a schematic flowchart of another network authentication method according to an embodiment of the present invention. The process is a possible representation form of steps S4301 to S4312. In the possible representation form, information exchanged between UE and a CP-AU may pass through an RAN, and the CP-AU may further be divided into a plurality of smaller network elements. It can be learned from the above description that, functions undertaken by the CP-AU include operations such as obtaining an authentication vector from a subscriber repository, generating MAC1 based on the authentication vector fed back by the subscriber repository, feeding back an authentication request message to the UE, generating MAC2', and verifying MAC2 and MAC2', and these operations may be separately undertaken by the plurality of network elements into which the CP-AU is divided. For example, the CP-AU may be divided into an SEAF, an AUSF, and the like. The obtaining an authentication vector from a subscriber repository and the generating MAC1 based on the authentication vector fed back by the subscriber repository are undertaken by the AUSF, and the feeding back an authentication request message to the UE, generating MAC2', and the verifying MAC2' and MAC2 are undertaken by the SEAF. In a process in which the SEAF and the AUSF undertake respective operations, some negotiation may further need to be performed between the SEAF and the AUSF. Additionally, the subscriber repository may be an ARPF.

It should be noted that, a sequence of steps listed in the foregoing embodiments is not limited herein, and whether some steps are earlier performed or later performed does not essentially affect the implementation on the embodiments. Therefore, based on the sequence of the steps listed above, a solution formed by adjusting the sequence of performing the steps still falls within the protection scope of the present invention.

To sum up, by implementing the embodiments of the present invention, the user equipment and the service authentication device generate the second shared key based on an obtained reference parameter and the first shared key that is pre-shared, and then the service authentication device sends the second shared key to the network authentication device, so that the network authentication device obtains the target shared key based on the second shared key. That is, service related information and network related information are considered when the target shared key is generate, and this improves a security level of the target shared key.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A network authentication system, wherein the network authentication system comprises user equipment, a network authentication device, and a service authentication device, wherein the service authentication device is configured to obtain reference information and generate a second shared key based on the reference information and a first shared key, wherein the first shared key is a shared key pre-configured between the user equipment and the service authentication device, and the reference information comprises information associated with at least one of the user equipment, the network authentication device, and the service authentication device;

the user equipment is configured to obtain the reference information and generate the second shared key with reference to the reference information and the first shared key;

the service authentication device is configured to send the second shared key to the network authentication device; and the network authentication device is configured to receive the second shared key, wherein the second shared key is used by the user equipment and the network authentication device to generate a target shared key, and the target shared key is a shared key that protects secure data transmission and that is negotiated and agreed on by the network authentication device and the user equipment.

2. The system according to claim 1, wherein
the network authentication device and the user equipment are configured to perform network authentication to generate the target shared key based on the second shared key.

3. The system according to claim 2, wherein
the network authentication device and the user equipment are configured to perform network authentication to generate a third shared key; and, wherein
performing network authentication to generate the target shared key based on the second shared key by the network authentication device and the user equipment comprises:
performing network authentication based on the second shared key to generate a fourth shared key by the network authentication device and the user equipment; and
generating the target shared key based on the third shared key and the fourth shared key by both the network authentication device and the user equipment.

4. The system according to claim 1, wherein the generating a second shared key with reference to the reference information and a first shared key comprises:
performing, by the service authentication device and the user equipment, service authentication with reference to the reference information and the first shared key to generate the second shared key; and
the network authentication device and the user equipment are configured to use the second shared key or a shared key derived from the second shared key as the target shared key.

5. The system according to claim 4, wherein
the network authentication device is further configured to send the target shared key to the service authentication device;
the service authentication device is configured to receive the target shared key; and the service authentication device and the user equipment are configured to use the target shared key or the shared key derived from the target shared key as a shared key that protects secure data transmission and that is negotiated and agreed on by the service authentication device and the user equipment.

6. The system according to claim 1, wherein
the network authentication device and the user equipment are configured to perform network authentication to generate a third shared key; and
generating a second shared key with reference to the reference information and a first shared key comprises:
performing, by the service authentication device and the user equipment, service authentication with reference to the reference information and the first shared key to generate the second shared key; and
generating, by both the network authentication device and the user equipment, the target shared key based on the second shared key and the third shared key.

7. The system according to claim 1, wherein
both the network authentication device and the user equipment are configured to:
generate the target shared key based on the second shared key and a fifth shared key.

8. The system according to claim 1, wherein
the reference information comprises a network parameter of a cellular network in which the network authentication device is located; and, wherein
generating a second shared key with reference to the reference information and a first shared key comprises:
performing service authentication based on the reference information and the first shared key to generate the second shared key; and
the service authentication device is further configured to use the second shared key as the target shared key.

9. The system according to claim 1, wherein the reference information comprises at least one of a network parameter of the cellular network in which the network authentication device is located and a service parameter of a target service.

10. The system according to claim 9, wherein the service parameter comprises at least one of a service sequence number of the target service, an identifier of a key management center, a session identifier, a link identifier, an application identifier, a service identifier, a service level, a service data rate, a time delay, and a service server identifier; and the network parameter comprises at least one of an operator identifier, an access network identifier, a service network identifier, a network type identifier, a network identifier of a local area network, a slice identifier, a bearer identifier, a quality of service identifier, and a flow identifier.

11. User equipment, comprising:
an obtaining unit, configured to obtain reference information and generate a second shared key with reference to the reference information and a first shared key, wherein the first shared key is a shared key pre-configured between the user equipment and a service authentication device, the service authentication device is configured to obtain the reference information and generate the second shared key based on the reference information and the first shared key, and the service authentication device is further configured to send the second shared key to a network authentication device; and
a generating unit, configured to generate a target shared key based on the second shared key, wherein the target shared key or a shared key derived from the target shared key is a shared key that protects secure data transmission and that is negotiated and agreed on by the network authentication device and the user equipment.

12. The user equipment according to claim 11, wherein that the obtaining unit generates the target shared key based on the second shared key is specifically:
using the second shared key or a shared key derived from the second shared key as the target shared key.

13. The user equipment according to claim 11, wherein that the obtaining unit generates the target shared key based on the second shared key is specifically:
the obtaining unit and the network authentication device perform network authentication based on the second shared key or based on a shared key derived from the second shared key to generate the target shared key.

14. The user equipment according to claim 11, further comprising:
an authentication unit, configured to perform network authentication with the network authentication device to generate a third shared key, wherein
that the obtaining unit and the network authentication device perform network authentication based on the second shared key or based on the shared key derived from the second shared key to generate the target shared key is specifically:
the obtaining unit and the network authentication device perform network authentication based on the second shared key to generate a fourth shared key; and
generate the target shared key based on the third shared key and the fourth shared key.

15. The user equipment according to claim 11, wherein that the generating unit generates the target shared key based on the second shared key is specifically:
the generating unit and the network authentication device perform network authentication to generate a third shared key; and
generate the target shared key based on the second shared key and the third shared key; or
respectively use the second shared key and the third shared key as target shared keys to protect different types of data.

16. The user equipment according to claim 11, wherein that the generating unit generates the target shared key based on the second shared key is specifically:
generating the target shared key based on the second shared key and a fifth shared key; or
respectively using the second shared key and a shared key derived from the fifth shared key as target shared keys for protecting different types of data, wherein the fifth shared key is a shared key pre-configured between the user equipment and the network authentication device.

17. The user equipment according to claim 11, wherein that the obtaining unit generates the second shared key with reference to the reference information and the first shared key is specifically:
performing service authentication with the service authentication device with reference to the reference information, the first shared key, and a fifth shared key to generate the second shared key, wherein the fifth shared key is a shared key pre-configured between the user equipment and the network authentication device, and the service authentication device is configured to obtain the fifth shared key.

18. The user equipment according to claim 11, wherein that the obtaining unit generates the second shared key with reference to the reference information and the first shared key is specifically:
the obtaining unit and the service authentication device perform service authentication with reference to the reference information and the first shared key to generate the second shared key.

19. The user equipment according to claim 11, further comprising:
a first receiving unit, configured to receive network-side information from the network authentication device forwarded by the service authentication device, wherein the network-side information is generated by the network authentication device based on the fifth shared key and the obtained first shared key, and the fifth shared key is a shared key pre-configured between the user equipment and the network authentication device; and
that the obtaining unit generates the second shared key with reference to the reference information and the first shared key is specifically:
performing service authentication with the service authentication device with reference to a network parameter and the first shared key to generate the second shared key, wherein the network parameter comprises the network-side information.

20. The user equipment according to claim 11, wherein the reference information comprises at least one of a network parameter of the cellular network in which the network authentication device is located and a service parameter of a target service and the service parameter comprises at least one of a service sequence number of the target service, an identifier of a key management center, a session identifier, a link identifier, an application identifier, a service identifier, a service level, a service data rate, a time delay, and a service server identifier; and the network parameter comprises at least one of an operator identifier, an access network identifier, a service network identifier, a network type identifier, a network identifier of a local area network, a slice identifier, a bearer identifier, a quality of service identifier, and a flow identifier.

* * * * *